United States Patent [19]

Motamed et al.

[11] Patent Number: 5,687,303
[45] Date of Patent: Nov. 11, 1997

[54] PRINTER CONTROLLER FOR OBJECT OPTIMIZED PRINTING

[75] Inventors: Margaret Motamed, Redondo Beach; Matthew Tucker, San Francisco; David E. Rumph, Pasadena, all of Calif.; Robert R. Buckley, Rochester, N.Y.; Charles M. Hains, Altadena; L. Dale Green, Sierra Madre, both of Calif.

[73] Assignee: Xerox Corporation, Stamford, Conn.

[21] Appl. No.: 473,895

[22] Filed: Jun. 7, 1995

Related U.S. Application Data

[62] Division of Ser. No. 245,320, May 18, 1994, abandoned.

[51] Int. Cl.$^6$ .................................................. G06F 15/00
[52] U.S. Cl. ................................... 395/117; 395/133
[58] Field of Search ........................... 395/101, 114, 395/115, 117, 131, 133, 275, 112, 335, 501, 502, 503, 505, 506, 508, 523, 709; 358/518, 530, 448, 444, 450, 453, 462; 382/176, 266, 276, 277, 294, 304

[56] References Cited

U.S. PATENT DOCUMENTS

| | | | |
|---|---|---|---|
| 4,320,653 | 3/1982 | Takahashi et al. | 73/40 |
| 4,353,653 | 10/1982 | Zimmerman | 400/70 |
| 4,371,932 | 2/1983 | Dinwiddie, Jr. et al. | 395/841 |
| 4,381,553 | 4/1983 | Ferguson | 395/475 |

(List continued on next page.)

FOREIGN PATENT DOCUMENTS

| | | | |
|---|---|---|---|
| 0 320 014 A2 | 6/1989 | European Pat. Off. | G06F 15/73 |
| 0344976 | 12/1989 | European Pat. Off. | H04N 1/387 |
| 0 475 601 A2 | 3/1992 | European Pat. Off. | G06F 15/72 |
| 0 597 571 A2 | 5/1994 | European Pat. Off. | G06F 15/72 |
| 59-171252 | 9/1984 | Japan . | |
| 62-43261 | 2/1987 | Japan . | |
| 63-211972 | 9/1988 | Japan . | |
| 1189690 | 7/1989 | Japan . | |
| 2-295351 | 12/1990 | Japan . | |
| 1166091 | 10/1969 | United Kingdom . | |

OTHER PUBLICATIONS

"Adaptive Coding for Text and Dithered Continuous–Tone Images", Yoshida Okada et al., Fujitsu Sci. Tech. J. 23.2, Jun. 1987, pp. 101–110.
ANSI IT8.4–198x, "Device Exchange Format for the On–Line Transfer of Color Proofs from Electronic Prepress to Direct Digital Color Proofing Systems"; May, 1989.
"Integrating Image Into Computers for Publishing", Global Telecommunications Conference 1987, Conference Record vol. 2 of 3, p. 19.6.1–4, Nov. 15–18, 1987, Tokyo, Japan.

*Primary Examiner*—Joseph Mancuso
*Assistant Examiner*—Gabriel I. Garcia
*Attorney, Agent, or Firm*—Oliff & Berridge

[57] ABSTRACT

An object optimized printed system includes an image output terminal controller. The system inputs a print file defining a plurality of pages in a page description language and locates the plurality of objects forming each page and their object types. Based on the determine object types and any explicit rendering commands in the PDL file, the system automatically generates rendering tags for each of the objects. The rendering tags are used to control the image output terminal to optimize the printing by the IOT on an object-by-object basis. Based on the objects and the generated rendering tags, the system generates the differing types of data and the command instructions on a scanline-by-scanline basis. The generated command instructions and data are output to the IOT controller scanline-by-scanline. The data output to the IOT controller includes metabit data which is generated from the rendering tags. The metabit data output to the IOT controller is used to control various subsystems of the IOT controller and the IOT to optimize the printing characteristics of the IOT for each differing object on each scanline. The metabits can optimize such processing subsystems as halftone generation, halftone screen size and angle, color space transformation, tone reproduction curve, IOT output correction, and the like. Using this system, each page output by the IOT has the printing characteristics for each object within the page optimized to the object's types.

26 Claims, 37 Drawing Sheets

U.S. PATENT DOCUMENTS

| | | | |
|---|---|---|---|
| 4,620,288 | 10/1986 | Welmers | 395/107 |
| 4,646,261 | 2/1987 | Ng | 395/164 |
| 4,803,643 | 2/1989 | Hickey | 395/147 |
| 4,831,409 | 5/1989 | Tatara et al. | 364/526 |
| 4,887,163 | 12/1989 | Maeshima | 358/443 |
| 4,897,812 | 1/1990 | Lessard et al. | 395/164 |
| 4,949,188 | 8/1990 | Sato | 358/448 |
| 4,958,219 | 9/1990 | Kadowaki | 358/530 |
| 4,959,868 | 9/1990 | Tanioka | 382/176 |
| 4,963,898 | 10/1990 | Kadowaki et al. | 347/119 |
| 5,001,576 | 3/1991 | Tanaka et al. | 358/462 |
| 5,091,971 | 2/1992 | Ward et al. | 382/266 |
| 5,113,492 | 5/1992 | Ariki et al. | 395/147 |
| 5,140,675 | 8/1992 | Ohada | 395/114 |
| 5,185,853 | 2/1993 | Cheng et al. | 395/115 |
| 5,208,911 | 5/1993 | Newman | 358/500 |
| 5,225,911 | 7/1993 | Buckley et al. | 358/296 |
| 5,311,303 | 5/1994 | Mitsuhashi | 348/32 |

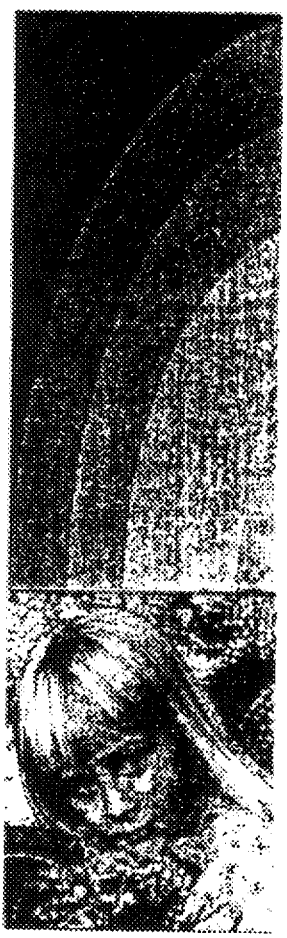
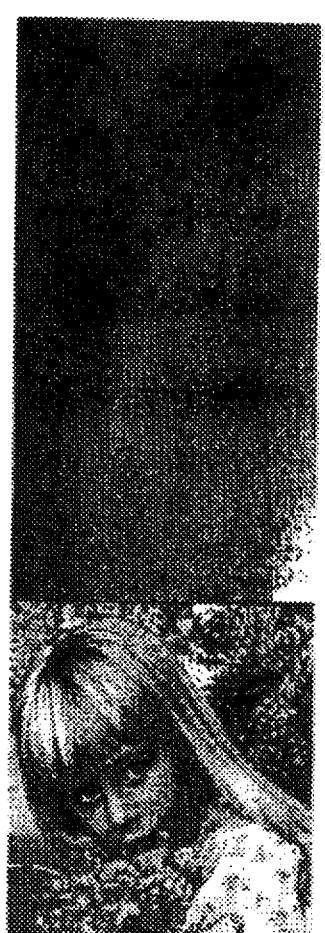
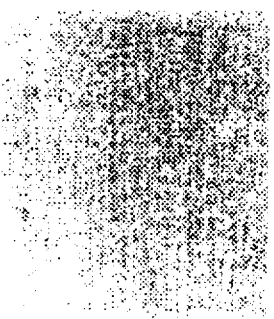
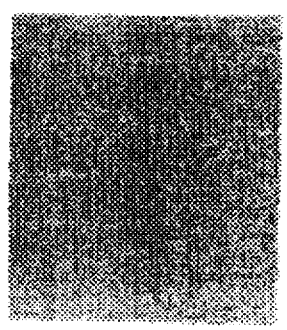
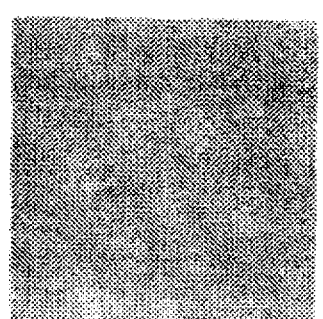
FIG. 1A
PRIOR ART
FIG. 1B
PRIOR ART
FIG. 1C
PRIOR ART

PRINTER CONTROLLER FOR OBJECT OPTIMIZED PRINTING

This is a Division of application Ser. No. 08/245,320, filed May 18, 1994, now abandoned.

BACKGROUND OF THE INVENTION

This application includes an appendix containing a list of computer code which performs object optimized printing.

1. Field of the Invention

This invention relates generally to apparatus and methods for object optimized rendering of computer generated page images into scan line raster data for driving a print engine.

2. Related Art

Prior to the advent of high quality computer-generated page images, page images such as those found in newspapers, newsletters, magazines and the like were formed by graphic artists composing the page images by hand. Thus, each different type of object on a page image, including text, photographs, constant color areas or graphs such as pie charts, and sampled or continuously changing images such as sweeps, was optimally formed, independently of any other type of object.

Because these page images, comprising one or more of these types of objects, were composed by hand, each type of object was inherently treated independently of the other objects. Thus, the optimal halftone screen design for photographs, which differs from the optimal halftone screen designs for constant color areas and text, could be optimally selected and the screen arranged to an optimal angle. Likewise, such optimal treatment of each type of object can be obtained.

With the advent of digital color workstations, copiers and printers, creators of page images who would previously have had to rely on graphic artists to compose and print their page images could instead create, compose, and print them on their own using a computer connected to the digital color copier/printer.

However, such prior art digital systems for creating a page image, for decomposing the page image into print engine instructions, and for controlling the print engine treated a page image as a single, unitary image. Thus, in the page image shown in FIG. 1A (which is optimized for text), when a high frequency halftone screen is used, the text portion of the page image is quite sharp. However, the large square constant color portion of the page image contains an obvious mottling from printer noise. In addition, the sampled color portion and the sweep portion of the page image show obvious contouring due to the lack of sufficient gray levels available with the high frequency screen.

In the page image shown in FIG. 1B (which is optimized for the large constant color portion), a halftone screen specifically designed to hide printer instabilities produces a high-quality, text- and artifact-free constant color area. However, the sharpness of the text is decreased and the gray values for each tint are not well-related, so that the sampled color portion and the sweep portion are unacceptable. The sweep portion demonstrates that the gray levels do not step smoothly from one to the next, because each dot level is designed separately without relation to the other levels.

In the page image shown in FIG. 1C (which is optimized for sampled color and sweep portions), the sweep portion and the sampled color portion show higher quality because a low frequency halftone screen is used, with more gray levels available. However, the text is shown in low quality and the constant color portion shows an obvious texturing.

Accordingly, as shown in FIGS. 1A–1C, in the prior art systems, which treated each page image as a single bitmap or bytemap image, optimizing the image for any one type of object required the image quality of the other types of objects to be compromised. This is also shown in FIGS. 1D and 1E, which show a radial sweep with text superimposed on top of the radial sweep. In FIG. 1D, both the text and the background sweep are printed using a high frequency halftone screen. While the text in FIG. 1D is shown in high quality, the background sweep has an obvious contouring artifact due to the low number of gray levels. In FIG. 1E, both the background sweep and the text are printed using a low frequency screen. While the background sweep is shown in high quality and without the contouring visible in FIG. 1D, the text is shown in very low quality and is essentially unreadable.

Accordingly, there is a need in the art for a digital color copier/printer and method for creating, decomposing and outputting a page image to a print engine which allows for the printing characteristics of individual objects to be optimized, as in the hand-composing graphic arts field, while simultaneously retaining the benefits and efficiencies available when creating a page image using a microcomputer.

Such page images are created using Page Description Languages (PDLs) such as PostScript™, interpress™, Graphical Display Interfaces (GDIs), such as the one used with Windows™, Printer Command Languages (PCLs) for controlling a print engine, such as the Hewlett-Packard Printer Command Language (PCL-5)™, or the like.

SUMMARY OF THE INVENTION

Thus, this invention provides a printer controller apparatus and method for converting a page image defined using a PDL or the like into print data and printer control commands such that each type of object in the page image is optimally printed.

This invention also provides for a printer controller apparatus and method for processing the page image such that the objects of the page image are processed optimally based on their object type, including using optimal compression and decompression techniques for each object type.

This invention also provides for an object optimized printer control device and method which generates a plurality of "metabit" information (i.e., information about how best to render each byte of print data) based on the object type of the various objects forming the page image and passes the metabit data to the image output terminal (IOT).

This invention further provides for an object optimized printer control device and a method which automatically determines the object type for each independent object of the page image.

This invention also provides for an object-optimized printer control system and method which allows a creator of a page image using a page description language to explicitly override or adjust the automatically determined object types.

This invention also provides for an intermediate format file structure containing information for each object on the page that may be stored for later editing, transmission, and printing by an object optimized printer control device and method.

This invention also provides for a different intermediate format file containing a plurality of data channels and a metabit information channel that each have been optimally compressed, that may be decompressed and printed in real time by an object optimized printer device such that each type of object in the page image is optimally printed.

This invention also provides for an object optimized IOT which can receive metabit information and use it to select from a plurality of simultaneous inputs, such as a synchronized input from the printer's input scanner, so that a page image can be constructed in real time from multiple inputs as it is being printed.

This invention also provides for an object optimized printer control device and method which can receive input from a plurality of sources other than the PDL source and use metabit information to mix it in real time while outputting the mixed data to the IOT.

This invention also provides for an editing method for processing the page image which keeps object information so that it may be edited object by object at the printer, without the need to create a modified PDL and re-convert it. The edits thus made at the printer may further be recorded so that at a later time they may be made a permanent part of the document on the digital workstation which created the document.

This invention also provides for the ability to use special hardware and software modules to provide different object optimized rendering and compression techniques, with each resource module controlled by metabit information controlling the selection of the rendering or compression method, and with the resource modules either distributed through the printing system or concentrated in a single location. The rendering modules can include, but are not limited to, modules which do object optimized color space transformations, object optimized spatial filtering, object optimized tone reproduction curves, object optimized choking or spreading, object optimized halftoning, and object optimized engine artifact suppression.

Finally, this invention also provides for an object optimized print measurement apparatus and method which can use metabit information and measured print data to provide a plurality of adjustments to the page processing apparatus so that each type of object in the page image continues to be optimally printed in a stable manner.

In a first embodiment of this invention, a page image described using a page description language (PDL) and stored as a series of commands in the PDL is input to an object optimizing electronic subsystem (OOESS). A PDL decomposition means decomposes the page image described in the PDL into a data structure representing the page image. In the data structure, information relating to independent image objects is retained, including the information relating to object types and other individual characteristics such as color, optimal color space, layer information, and the like.

Once the PDL decomposition means converts the page image described using the page description language, the copier/printer, or more generally the image output terminal (IOT), command instruction generating means converts the data structure into a series of command instructions, color designations, and metabit rendering instructions for each scan line of the page image. The metabits are either automatically generated by a metabit generating means which analyzes each object to determine its type, or are explicitly set by the page image creator during the creation of the PDL description of the page image. Once all of the command instructions, the color designations, and the metabits are generated for each scan line of the page image, they are output to the IOT controller.

The IOT controller receives the command instructions, the color instructions and the metabits generated during the decomposition process. The IOT controller combines the constant color and sampled color data and sends it with the metabit data to the IOT.

In a first embodiment of the IOT, the IOT includes a pair of halftoned screen generators and a color space transformation circuit. The byte-wide color data and the metabits output from the IOT controller are input to the IOT. The metabits are used to determine which halftone screen generator will be used on the color data and which color transformation will be applied by the color space transformation circuit. Once the IOT has generated the raster data from the color data and the metabits, the raster data is output to the marking subsystem for forming the page image on an output sheet.

In a second embodiment of the IOT controller, the sample color data compression/decompression circuit, mask data compression/decompression circuit, constant color compression/decompression circuit, and command data compression/decompression circuit are incorporated into the IOT controller between the bus interface and the integrated combiner. The compression/decompression circuits allow the various types of data in the data structure to be optimally compressed for transfer on the system bus to the IOT controller. In addition, in the second preferred embodiment of the IOT controller, a color space transformer is incorporated into the IOT controller. By incorporating the color space transformer onto the IOT controller, the color space transformation for different objects of the page image can be performed just before printing, yet can be optimized based on the object type. In addition, incorporating the color space transformer onto the IOT controller widens the range of IOTs which can be used with the system of this invention.

In a third preferred embodiment of the controller, an alternate form for the compressor/decompressor circuits is used.

In a fourth preferred embodiment of the IOT controller, two color space transformers are used to generate the color data to be output to the IOT. In this way, four bytes of data, representing each of the four color layer separations C, Y, M, K can be output simultaneously. By outputting the color data for all four color layer separations simultaneously, higher page output for the IOT can be accomplished and a wider range of IOTs can be used with the system of this invention.

These and other features and advantages of the invention are described in or are apparent from the following detailed description of the preferred embodiments.

BRIEF DESCRIPTION OF THE DRAWINGS

The preferred embodiments are described in reference to the drawings, in which:

FIGS. 1A–1F show various outputs available in the prior art systems and the system of this invention;

DETAILED DESCRIPTION OF THE PREFERRED EMBODIMENTS

As described above and shown in FIGS. 1A–1E, the conventional process for decomposing a page image described in a page description language (PDL) requires compromises to be made when printing the bitmap or bytemap generated by decomposing the page image described using the PDL unless the creator explicitly inserts printer-dependent halftones throughout the page image. It should be appreciated that although the following description refers only to PDLs, any of the above described systems, which are equivalent to PDLs, can also be used with the object optimizing rendering system and method described below.

That is, as described above, in the conventional systems for decomposing and printing a page image described using a PDL, the various objects comprising the page image are converted from the PDL coordinates to the device coordinates, the strokes are thickened, the objects are polygonized by converting curved lines to straight lines, the objects are each converted to a series of boxes corresponding to the location of the objects on the scan lines, and the boxes are loaded into a bytemap (or a bitmap if the image is black/white). By writing the boxes formed by decomposing the objects of the page image onto the bytemap, all distinctions between differing types of objects are lost.

In contrast, in the present invention, the page image described by the PDL is decomposed such that the distinctions between differing types of objects comprising the page image are maintained. By maintaining the object type of different objects within the page image, the processing of the differing object types can be optimized to that type of object, as shown in FIG. 1F.

Figure 1D:
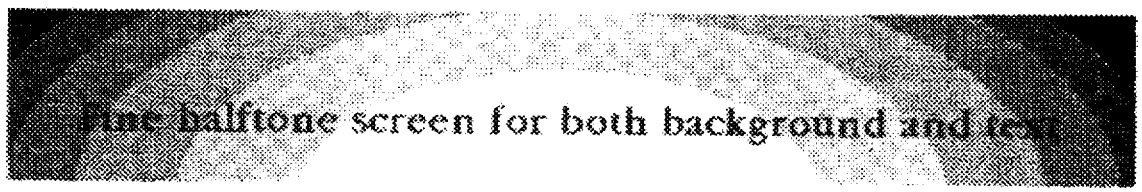
Figure 1E:
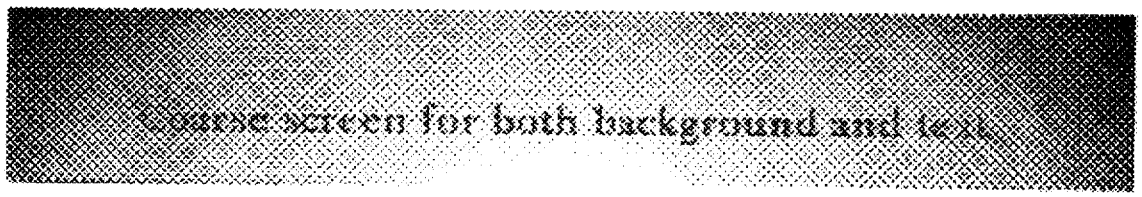
Figure 1F:
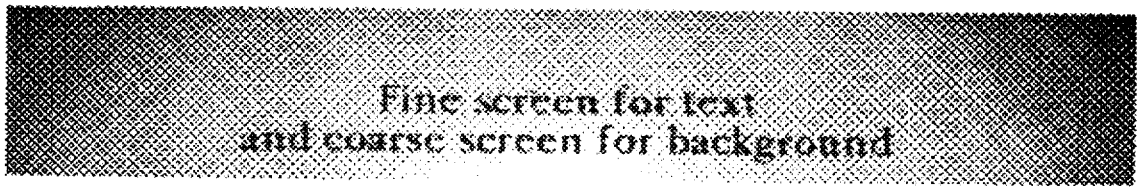

In the black and white image shown in FIG. 1F, a coarse screen halftone generation process was used to form the continuously varying density background. At the same time, a fine halftone screen generation process was used to form the sharp-edged text image. By using the optimal halftone generation process for each type of object, the continuously varying optical density of the background can be maintained, as shown in FIGS. 1E and 1F. At the same time, the optimal halftone generating process for maintaining the sharp edges of the text image can be maintained, as shown in FIGS. 1D and 1F.

Thus, for the images shown in FIGS. 1A–1C, the high frequency halftone screen could be used to form the text images optimized in FIG. 1A, while the tint-specific halftone screen set could be used to optimize the block of constant color optimized in FIG. 1B, while the low frequency halftone screen could be used to optimize the sampled color image and sweep optimized in FIG. 1C.

By maintaining the object type of the various objects comprising the page image, other features of the objects can be optimized as well, such as the color space transformation for the object from the color space used by the page description language to the cyan (C), magenta (M), yellow (Y), and black (K) color space used in the IOT. In fact, each step of the color-transformation process can be optimized, such as the undercolor removal process and the tone reproduction curve process. Likewise, the compression process can be optimized by object type, which minimizes the storage resources consumed and transmission loads for the decomposed page image.

Further, depending on the degree of optimization required, different levels of distinction in object type can be provided for. That is, in some instances it may be sufficient to indicate an object is colored with constant color, and optimize all processing functions, such as halftone screen and color space transform, at this level. In other instances, additional levels of distinction may be required, in order to specify one of a number of possible color space transforms or one of a number of halftone screen frequencies or angles, all of which are otherwise appropriate for a constant color object.

Figure 2:
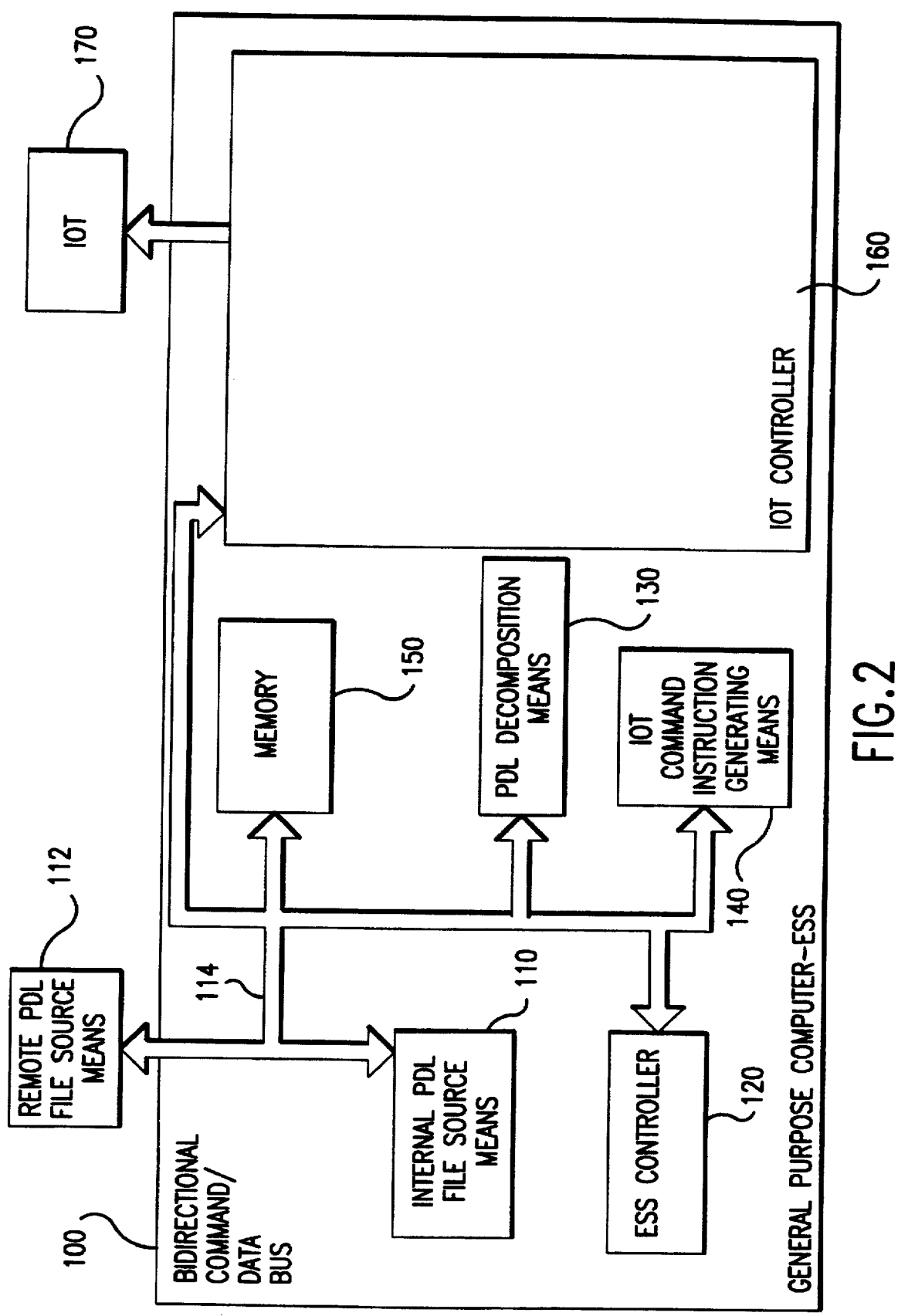
FIG. 2 shows a block diagram of the object optimizing electronic subsystem.

As shown in FIG. 2, the object optimizing electronic subsystem (OOESS) 100 for converting the PDL form of the page image into raster data usable by the image output terminal (IOT) 170 is preferably provided by using a general purpose computer such as a personal computer, an engineering workstation, such as a SunSparc station produced by Sun Microsystems, Inc., of Mountain View, Calif., a mini computer or the like. The OOESS 100 can include an internal PDL file source means 110, such as a program for generating PDL representations of page images, such as programs which generate PostScript or InterPress compatible documents, programs which generate GDI representations of page images, or programs which generate graphical command set representations of the page image. One type of graphical command set is the Hewlett-Packard PCL-5 command set which is used to operate laser printers and/or ink jet printers. Accordingly, it should be understood that the term "PDL" should be interpreted to encompass any type of representation which describes the page image instead of generating bit/bytemaps of the page image.

Alternately, the PDL representation of the page image, rather than being created and directly decomposed, can be received from some remote PDL file source means 112, such as a non-volatile memory or a remote general purpose computer connected to the OOESS 100 through a local area network or modem. Accordingly, it should be understood that the PDL file representing the page image can come from any conventional source.

Once the PDL file representing the page image is input to the OOESS 100, it is transferred through bus 114 into the memory 150. The PDL file is then decomposed by the PDL decomposition means 130. The PDL decomposition means 130 reads the PDL file stored in the memory 150 and decomposes it to form the data structure shown in FIGS. 29–32. The data structures shown in FIG. 30 includes lists of objects and rendering tags indicating the object types. The operation of the PDL decomposition means will be described in detail below.

Figure 32:
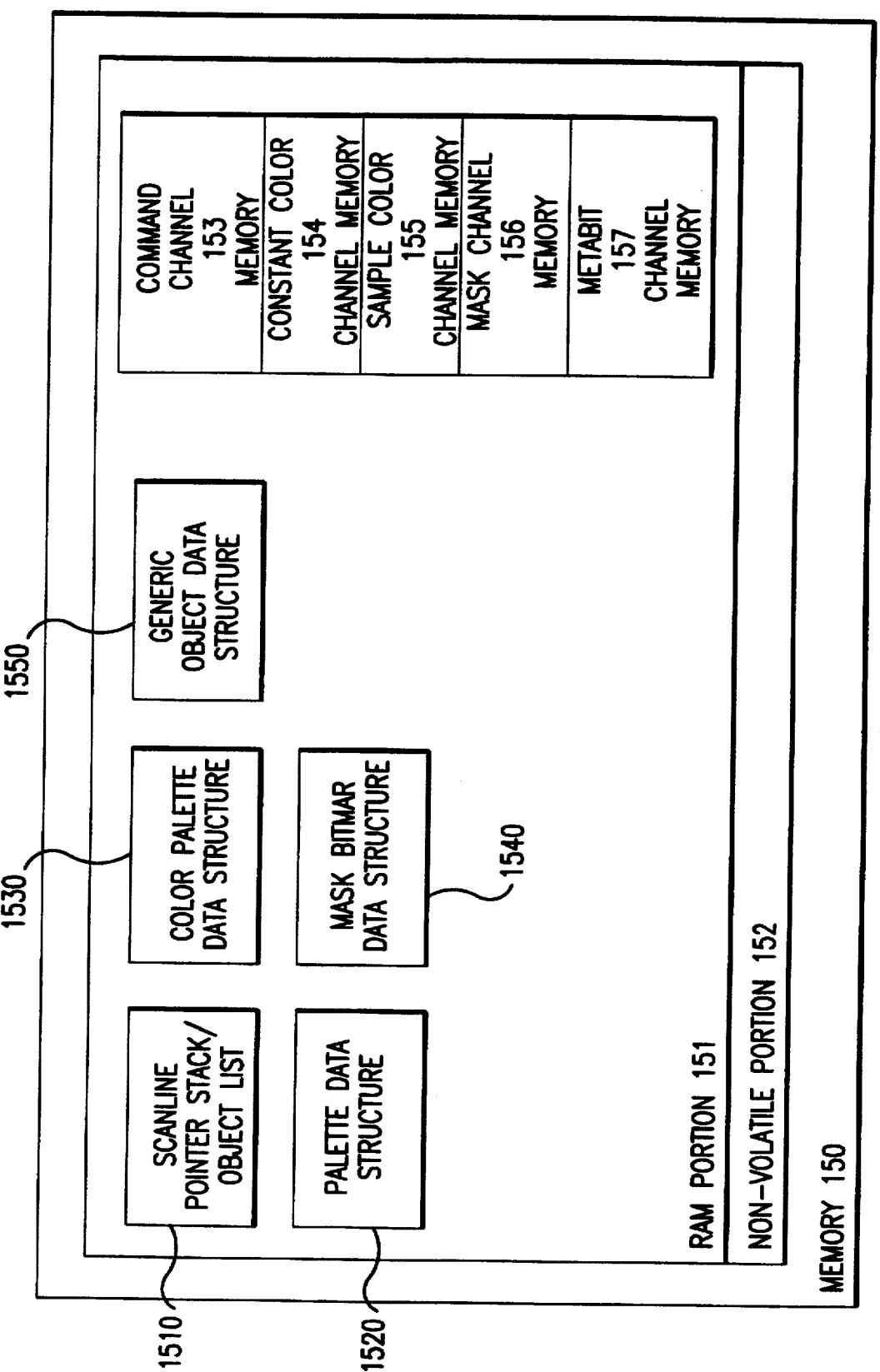
FIG. 32 shows the generic channel data structure.

Once the PDL decomposition means 130 has generated the data structures in memory 150 storing the various objects of the page image generated from the PDL representation, the data structure stored in memory 150 is read by the command instruction generating means 140. The command instruction generating means 140 converts the data structure stored in memory 150 into a series of command instructions, corresponding color data, bit mask data and metabit data on a scan line-by-scan line basis. These command instructions, color data, bit mask data and metabit data are stored in the memory 150 as shown in FIG. 32.

Figure 3:
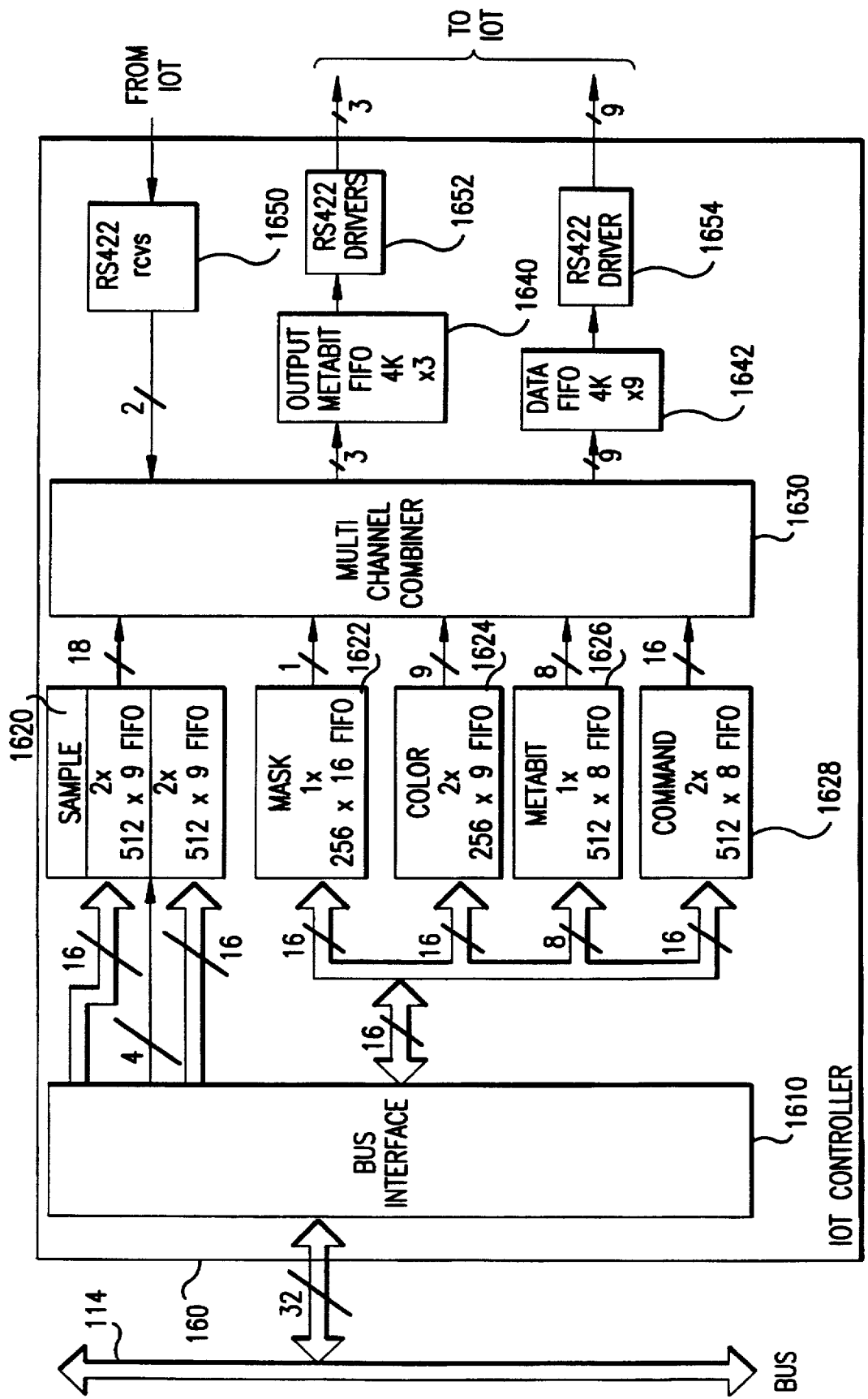
FIG. 3 shows a block diagram of a first embodiment of the IOT controller.

As shown in FIG. 3, in a first preferred embodiment of the IOT controller 160, the IOT controller 160 is connected to the bus 114 through a bus interface 1610. In the preferred embodiment of the OOESS 100, a SunSparc workstation is used. Thus the bus 114 is an SBus, and the bus interface 1610 is designed to work with the SBus 114. However, it should be appreciated that the bus interface 1610 can be designed to work with the particular bus 114 which may be used in any of the conventional personal computers, engineering workstations such as the SunSparc, minicomputers or the like.

As shown in FIG. 3, the bus interface 1610 provides a 32-bit connection to the bus 114. Thus, the bus interface 1610 can input a 4-byte word during each clock cycle. In the preferred embodiment, the bus interface 1610 can also read in a 64-byte burst by sequentially reading in sixteen 4-byte words in consecutive clock cycles. Further, the bus interface 1610 in the preferred embodiment provides direct memory access (DMA) to the memory 150 through the bus 114.

After the bus interface 1610 receives a 4-byte portion of data from the memory 150, the data is distributed to one of five sets of first-in, first-out (FIFO) data registers. These five FIFOs include the sample color channel FIFO 1620, the mask data channel FIFO 1622, the constant color channel FIFO 1624, the metabit channel FIFO 1626 and the command instruction channel FIFO 1628.

As shown in FIG. 3, the sample color channel FIFO 1620 comprises two banks of FIFOs, each bank of FIFOs comprising two 512 address by 9-bit wide FIFOs. Each FIFO of each bank of FIFOs thus receives one byte of the 4-byte word received by the bus interface 1610. In addition, the bus interface 1610 generates four additional bits of data, one of the additional bits of data being stored to each of the four FIFOs as the 9th bit. Each of these extra bits is used to flag whether its associated byte of data is valid or invalid data. Since the DMA data fetches are done on word boundaries only, it may sometimes happen that the actual data for a sampled image starts within a word. In this case, the bytes in the word that precede the start of actual data are flagged as invalid so that they may be discarded rather than printed.

The mask data channel FIFO 1622 comprises a single 256 address by 16-bit wide FIFO data register. The constant color channel FIFO 1624 comprises 1 bank of two FIFOs, each FIFO of the bank comprising a 256 address by 9-bit wide FIFO data register. Since each of the mask FIFOs 1622 and the color FIFO 1624 is capable of storing two bytes per write cycle, it is possible to use a single 4-byte transfer of data input to the bus interface 1610 to provide data successively to both the mask FIFO 1622 and the constant color FIFO 1624. Since only a 16-bit wide internal bus connects the bus interface 1610 to the mask FIFO 1622, the constant color FIFO 1624 and the command FIFO 1628, and only an 8-bit bus connects the bus interface 1610 to the metabit FIFO 1626, two clock cycles are used to write one 4-byte transfer out to the mask FIFO 1622, the color FIFO 1624 and the command FIFO 1628, and four clock cycles are needed to write a 4-byte transfer to the metabit FIFO 1626.

The metabit FIFO 1626 comprises a single 512 address by 8-bit wide FIFO data register. The command instruction FIFO 1628 comprises a single bank of paired 512 address by 8-bit wide FIFO data registers.

The outputs of each of the FIFOs 1620–1628 are connected to the multichannel combiner 1630. The output from the mask FIFO 1622 is serialized. Thus, only a single bit connection is provided from the mask FIFO 1622 to the multichannel combiner 1630. Likewise, the sample color FIFO 1620 and the constant color FIFO 1624 are 2-to-1 multiplexed. Thus, for the sample color FIFO 1620, only an 18 line internal connection is provided to the multichannel combiner. Each bank of paired 9-bit wide FIFOs outputs its data alternately. Likewise, only a 9-bit wide connection is provided between the constant color FIFO 1624 and the multichannel combiner 1630. Each 9-bit wide FIFO of the constant color FIFO 1624 alternately outputs its data to the multichannel combiner.

In contrast to the FIFOs 1620–1624, the metabit FIFO 1626 and the command FIFO 1628 are each provided with a full-width connection to the multichannel combiner 1630, as shown in FIG. 3.

The multichannel combiner 1630, which is described in more complete detail below with respect to FIG. 4, combines the data from the sample color channel 1620 and the constant color channel 1624 into a single stream of output to the data FIFO 1642, based on the instructions received from the command instruction FIFO 1628 and the bitmap data received from the mask FIFO 1622.

The data FIFO 1642 comprises a 4-K address by 9-bit wide FIFO data register. Since the multichannel combiner outputs data to the data FIFO 1642 in 8-bit wide bytes, the 9th bit of the data FIFO 1642 is used to store the first (1st) bit from the metabit FIFO 1626. The multichannel combiner 1630 is also connected to the output metabit FIFO 1640. The output metabit FIFO 1640 comprises a 4-K address by 3-bit wide FIFO data register. The multichannel combiner 1630 divides each 8-bit metabit byte into at least two 4-bit wide metabit nibbles. When the 1st bit of each 4-bit nibble is output to the data FIFO 1642, the 2nd-4th bits of each 4-bit nibble are output to the output metabit FIFO 1640. In practice, the number of metabits output from the multichannel combiner can be 1, 2, 4, or 8, depending on the number of types of objects to be distinguished and the number of levels of each type of object to be implemented.

As will be described below, each command instruction relates to only a single scan line, and defines a variable amount of the scan line. Accordingly, as it is not possible to a priori synchronize the output of the multichannel combiner to the page and line of the IOT, a parallel input port 1650 receives and inputs to the multichannel combiner 1638 a page sync signal, a line sync signal and an IOT clock signal.

The output FIFOs 1640 and 1642 are connected to the parallel output port drivers 1652 and 1634, respectively. The outputs from these parallel ports 1652 and 1654 are connected to the input ports of the IOT 170.

Figure 34:
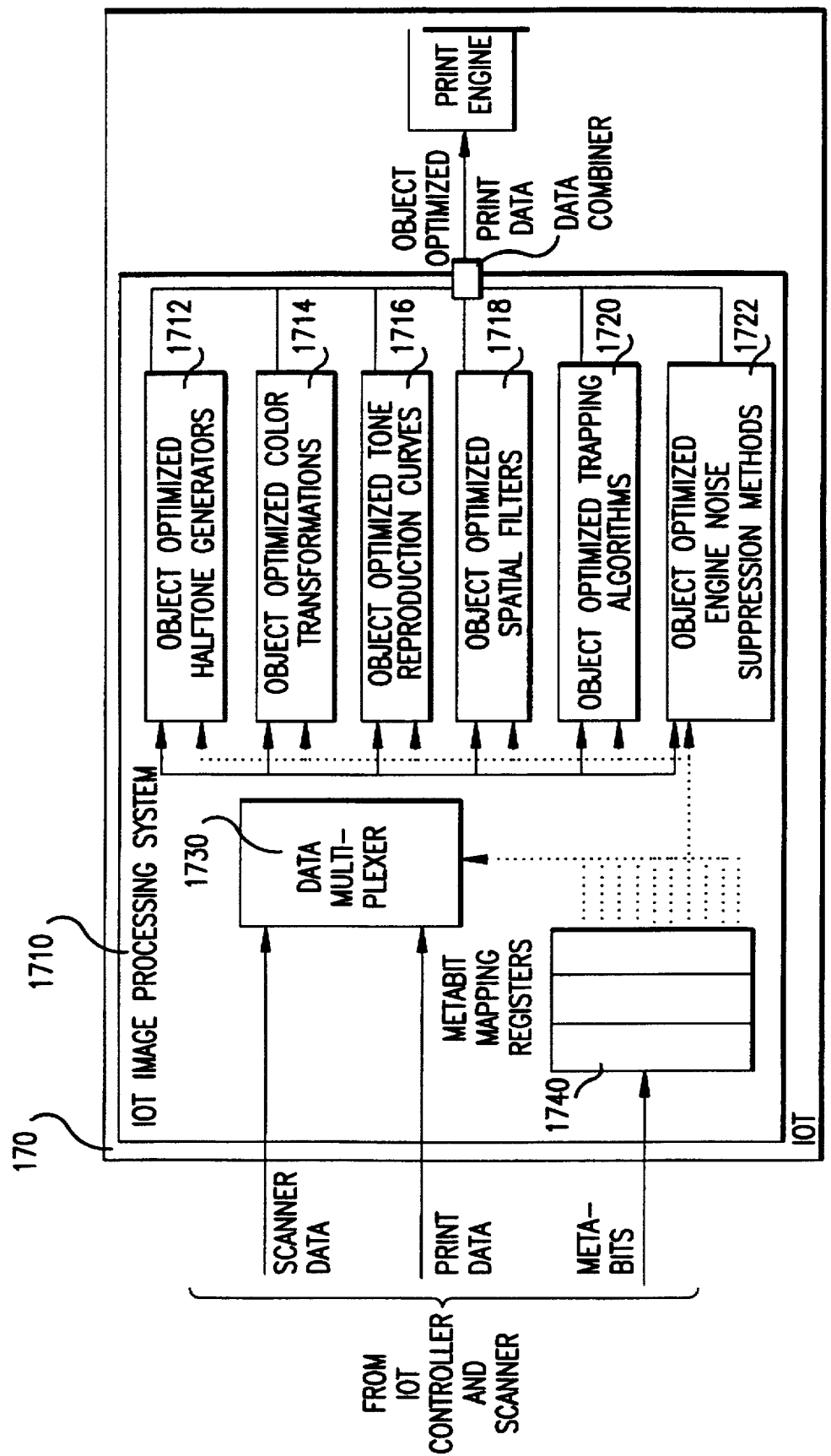
FIG. 34 shows a block diagram of a first preferred embodiment of the image processing system within the IOT.

It will be well understood that the output of data FIFO 1642 is received by the IOT 170 as data to be processed for printing. However, this invention further provides that each byte of print data from data FIFO 1642 will also be synchronously accompanied by 1, 2, 4 or 8 metabits from output metabit FIFO 1640. These metabits specify the processing to be done to each data byte before being printed. This optimal processing, as has been explained, varies with each data byte depending upon the object from which each data byte was extracted. As shown in FIG. 34, in the preferred embodiment of the IOT controller 160, the IOT 170 has an image processing system 1710 which contains a multitude of object optimized subsystems that are selectively controlled by the metabit data sent to IOT 170. Thus the metabit channel causes each byte of print data to be processed differently depending on the object it came from.

For example, the metabits may select among multiple halftone generators 1712. One halftone generator may be used with data bytes tagged as coming from objects such as colored text which should use a high-spatial frequency halftone generator. Another may be a lower spatial frequency, high color resolution halftone generator used with data bytes obtained from pictures, and so on. It should be appreciated that finer control over halftone generation, such as controlling halftone screen angles for each object, is also metabit selectable. In addition to halftone selections, many additional image processing subsystems may be controlled by metabits in the image processing system 1710 to produce variable results depending on the object, such as object optimized color transformation subsystems 1714, object optimized tone reproduction curve modifying subsystems 1716, object optimized spatial filter subsystems 1718, object optimized trapping subsystems 1720, which deal with problems due to interactions of various objects with each other at their edges, object optimized engine noise suppression subsystems 1722, which attempt to control various printing system problems that show up differently in different objects, and other object optimized image processing subsystems. In addition, if the printing system has other synchronous data sources 180, such as an input scanner, the metabit channel can be used prior to printing to mix those data streams with the print data coming from the IOT controller 160 through data multiplexer 1730. A comparable arrangement can be used to perform the mixing in the IOT controller 160.

In the preferred embodiment, the metabits control the plurality of image processing subsystems 1712-1738 on an object by object basis by selecting among a set of metabit mapping registers 1740, whose outputs have been previously loaded, to select a specific subset of enable lines in each of the object optimized image processing modules and print multiplexer 1712-1730. For example, if 4 metabits are implemented, they may be used to select from a set of 16 registers. These registers, in turn, may be of any size required to be able to each fully control and select from a subset of image processing subsystems and the print multiplexer 1712-1730. Thus, the meaning of each metabit value is completely programmable and may be changed simply by changing the contents of the register which it selects. That register, in turn, may select from the entire set of image processing subsystems and the print multiplexer 1712-1730 to implement the best possible rendering for a particular type of object which is tagged by that metabit.

It should be appreciated that the various image processing subsystems and the print multiplexer 1712-1730 may, in other embodiments, appear at many other points throughout the object optimized printing system. For example, it is possible to locate some or all of the object optimized image processing subsystems and the print multiplexer 1712-1730 within the object optimizing ESS 100 at any time after the object type has been determined, such as within the PDL decomposition means 130, within the IOT command instruction generating means 140, as part of the IOT controller 160, or in the IOT 170 as shown. It is also possible to distribute these subsystems throughout the system. Furthermore, it should be appreciated that these object optimized image processing subsystems and the print multiplexer 1712-1730 may be performed in hardware or software or a combination of the two. In all cases, the subsystems are selecting different procedures and data based on the type of object they are processing, and therefore produce different processing results for different object types.

Figure 35:
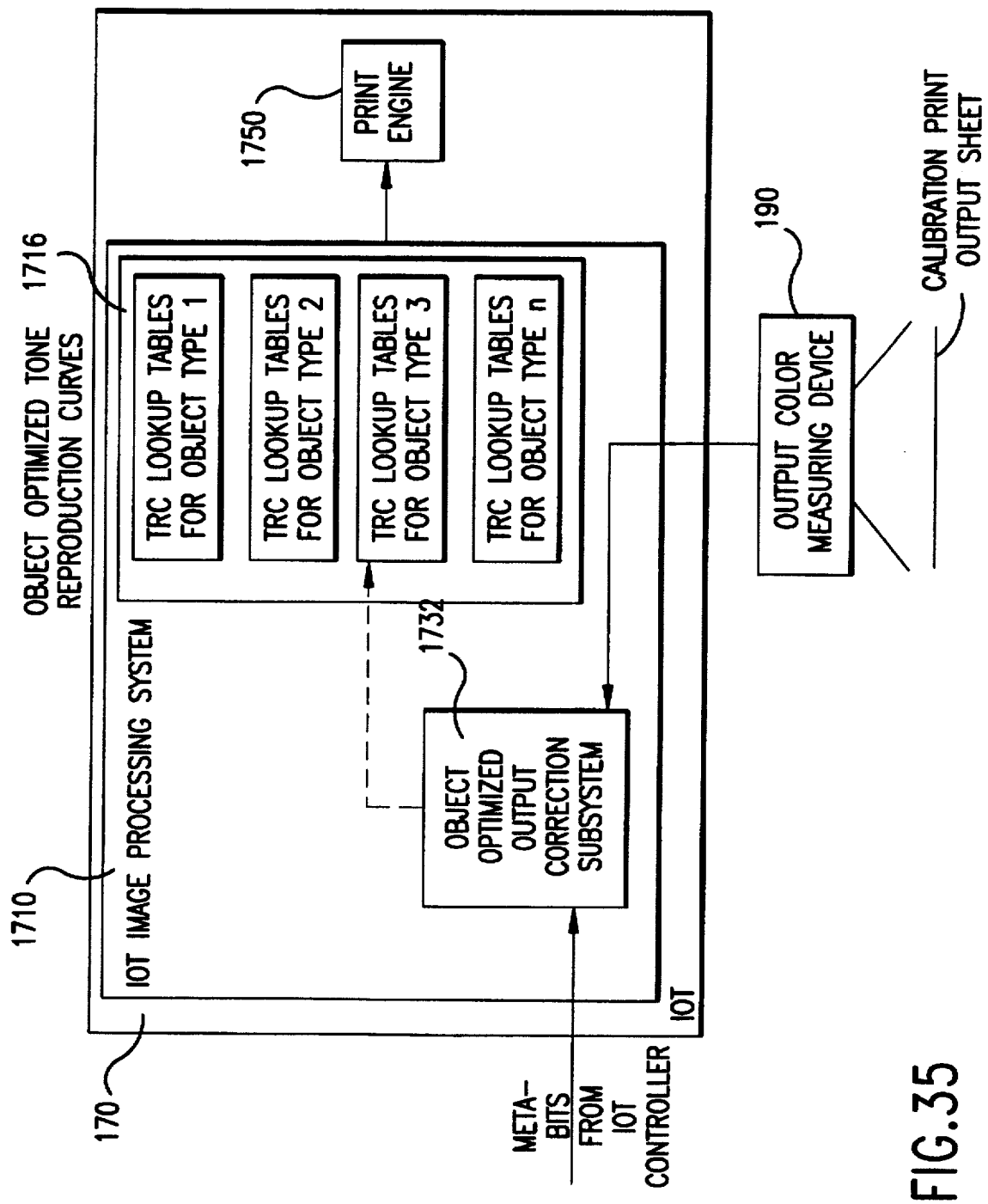
FIG. 35 shows a block diagram of a first embodiment of an object optimized print measurement and adjustment system.

It should also be appreciated that the color measuring device 190 is able to use metabit information coupled with measuring calibration prints to automatically adjust and stabilize image processing subsystems 1712-1722 on an object optimized basis. For example, as shown in FIG. 35, the output color measuring device 190, which measures a calibration print, outputs a signal indicating the actual state of the calibration print. Based on metabit information and the output signal from the output color measuring device, the object optimized output correction subsystem 1732 adjusts one tone reproduction curve (TRC) lookup tableout of the entire set in the object optimized tone reproduction curve subsystem 1716. The corrections made to the image processing system functions are different for different objects because the object optimized output correction subsystem 1732 is controlled by tags encoded in the metabit channel.

Figure 4:
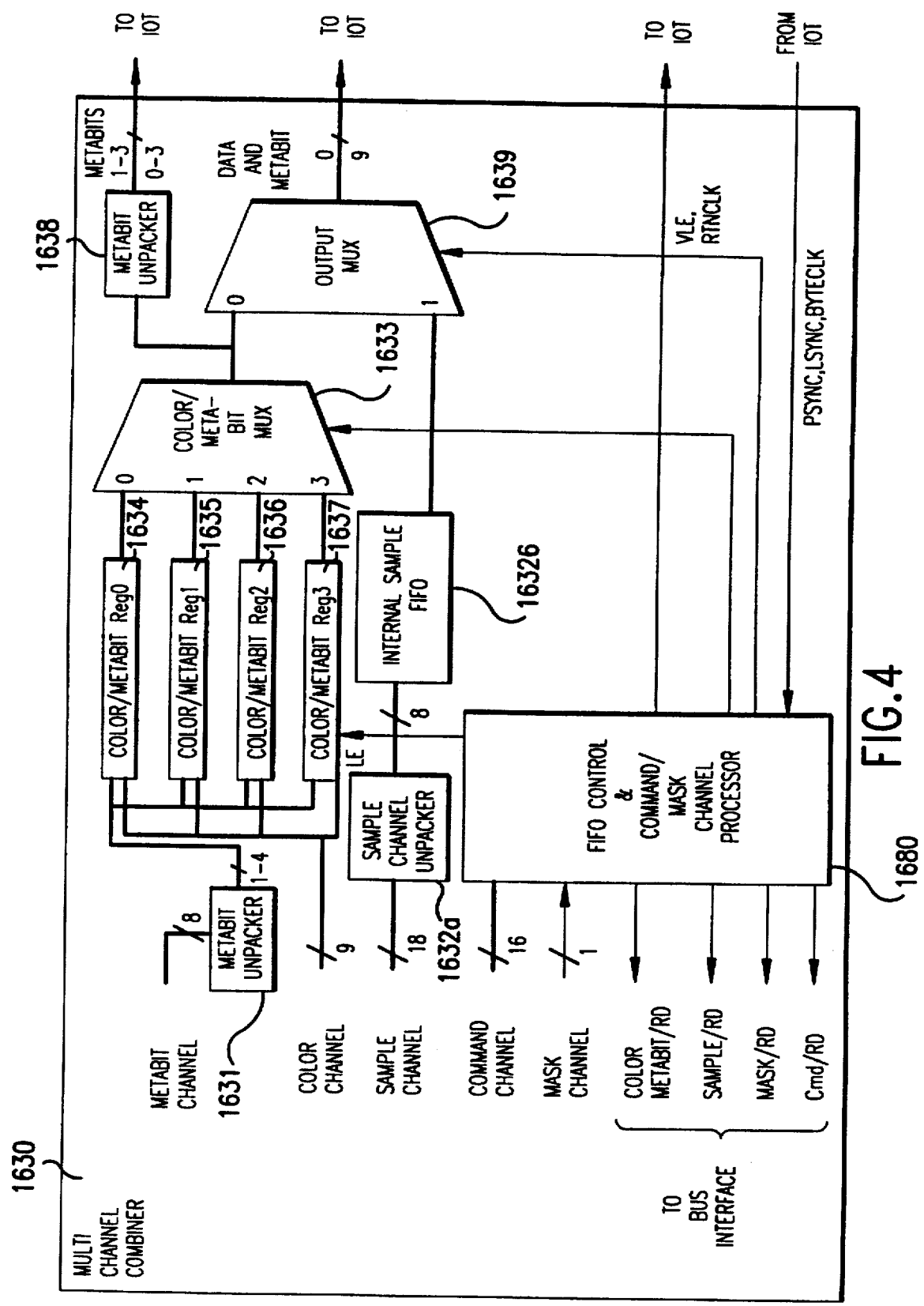
FIG. 4 shows a first embodiment of the multichannel combiner.

FIG. 4 shows the first preferred embodiment of the multichannel combiner 1630. As shown in FIG. 4, the metabit FIFO 1626 is connected to the metabit unpacker 1631, which converts the 8-bit wide metabit word into at least two 4-bit wide metabit nibbles. The output from the metabit unpacker 1631 is connected to each of four color/metabit registers 1634-1637. The output from the metabit unpacker 1631 is loaded into one of the color/metabit registers 1634-1637 depending on the load enable (LE)

signal output by the FIFO control and command/mask channel processor 1680. Likewise, the data input from the constant color channel FIFO 1624 is also provided to the four color/metabit register 1634–1637 and is loaded into one of the color/metabit registers based on the load enable signal.

The 18-bit wide input data from the sample channel FIFO 1620 is input to the sample channel unpacker 1632A, which converts the 2-byte wide sample color data and 2-bit "valid-byte" data into 2 single byte outputs, which are successively output to the internal sample FIFO 1632B or discarded if their corresponding "valid-byte" bit indicates this byte is invalid.

The 2-byte wide output from the command instruction FIFO 1628 and the 1-bit wide output from the mask FIFO 1622 are input directly to the command/mask channel processor 1680. Also input to the command/mask channel processor 1680 are the page sync, line sync and IOT clock received from the IOT through the parallel input port 1650. The command/mask channel processor 1680 outputs control signals to the color/metabit multiplexer 1633, the output multiplexer 1639 and four read signals to the FIFOs 1620–1628. The four read signals comprise a color/metabit read signal, a sample read signal, a mask read signal and a command instruction read signal. Whenever the corresponding FIFO(s) 1620–1628 receives one of these read signals from the command/mask channel processor 1680, the corresponding FIFO(s) reads the next data onto the corresponding channel. The FIFO(s) 1620–1628 are prevented from running dry by the bus interface 1610, which fills them according to a calculated priority with data read from the channel data structure (shown in FIG. 35) stored in the memory 150.

Based on the command instructions received from the command channel FIFO 1628, the command/mask channel processor 1680 generates the load enable signal LE for the appropriate one of color/metabit registers 1634–1637. When one of the color/meta registers 1634–1637 is enabled, it simultaneously loads the 9-bit wide constant color data from the constant color FIFO 1624 and up to 4-bits of metabit data from the metabit unpacker 1631. In another embodiment, the color data is loaded independently of the metabit data with a separate command. In the present embodiment, the color/metabit registers 1634–1637 are separate registers, but are always referenced together because they are always loaded simultaneously.

The command/mask channel processor 1680 also generates the control signals for the color/metabit multiplexer 1633 to select one of the color/metabit registers 1634–1637 to be output to the output multiplexer 1639 and the metabit register 1638. The command/mask channel processor 1680 further generates the control signals for the output multiplexer 1639 to select between the output from the color/metabit multiplexer 1633 and the output from the internal sample color FIFO 1632B. The output multiplexer 1639 outputs the 8-bit wide color data and the 1st bit of the metabit data output by the color/metabit multiplexer 1633. This is output to the data FIFO 1642. At the same time, the metabit register 1638 stores the 2nd–4th metabits and outputs them to the output metabit FIFO 1640. It should be appreciated that it is not necessary to include all of the 4-bit wide metabit nibbles as in the preferred embodiment. Alternatively the number of metabits provided to the ITO can be 1,2 or 4, or even 8. Thus, the first preferred embodiment shown in FIGS. 3 and 4 should not be construed as limiting the number of metabits provided to the IOT to 4.

Figure 5:
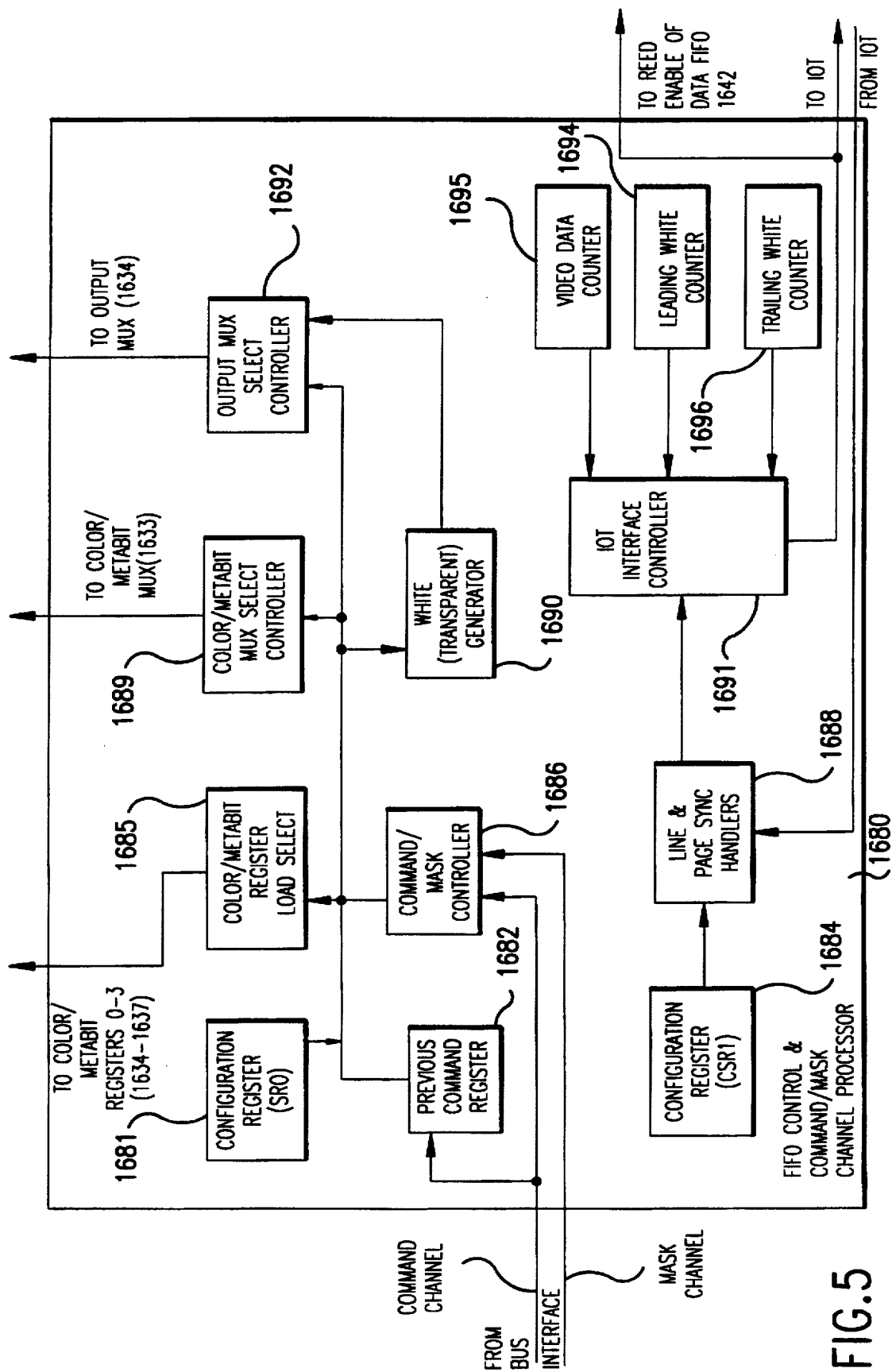
FIG. 5 shows a first embodiment of the FIFO control and command/mask channel processor.

FIG. 5 shows the internal functional blocks of the command/mask channel processor 1680. In FIG. 5, only the control lines are shown, except for the command channel and mask data channel lines connected to the command/mask controller 1686. In the first preferred embodiment of the command/mask channel processor 1680, two configuration registers 1681 and 1684, registers CSR0 and CSR1, respectively, are provided. The first configuration register 1681 provides control of the features shown in Table 1.

TABLE 1

| BIT | HIGH | LOW |
| --- | --- | --- |
| 8 | Reserved for future use | Reserved for future use |
| 7 | White = FF | White = 00 |
| 6 | Normal Mode | Diagnostic Mode |
| 5 | Read Registers | Read FIFOs |
| 4 | Register to FIFO Mode On | Register to FIFO Mode Off |
| 3 | Use Metabit FIFO | Use Color FIFO 9th Bit |
| 2 | Metabit Unpack 1 On | Metabit Unpack 1 Off |
| 1 | Metabit Unpack 0 On | Metabit Unpack 0 Off |

Bit assignment for Configuration/Status Register 0(CSR0)

Bits 1 and 2 of the first configuration register 1681 define the two (or three or four, if needed) metabit unpacking schemes used by the metabit unpacker to unpack the metabit. That is, if additional ways are needed to determine how the byte of metabit data is broken up into metabit packets, the first and second bits can be used together to provide up to four types of metabit unpacking.

Bit 3 of the first configuration register 1681 is used to disable the metabit FIFO when only a 1-bit wide metabit channel is provided to the IOT. Bits 4 and 5 of the first configuration register 1681 are used in a diagnostic mode to read data out of the FIFOs and the internal registers. Bit 6 of the first configuration register 1681 is used to indicate whether the multichannel combiner is in the normal mode or is in a diagnostic mode. Bit 7 of the first configuration register 1681 is used to indicate whether white (i.e., the natural background color of the paper) is provided by data bytes comprising all 0's or data bytes comprising all 1's. The 8th bit of the first configuration register 1681 is not implemented.

When bit 6 of the first configuration register is low, the multichannel combiner 1630 is in diagnostic mode. In diagnostic mode, any of the internal registers of the multichannel combiner 1630 may be examined. For example, it is possible to examine the contents of the color/metabit registers 1634–1637 and sample FIFO 1632b in real time. By setting the diagnostic SEL lines shown in Table 2 to values 0–4, the SEL lines are able to force the values in the selected registers to be sent to the data FIFO 1642. Values 5–14 of the SEL line as shown in Table 2 are used to read and write other registers in the multichannel combiner 1630 for further diagnostic information.

TABLE 2

| SEL | Register Accessed |
| --- | --- |
| 0 | Color/Meta Reg. 0 to video FIFO |
| 1 | Color/Meta Reg. 1 to video FIFO |
| 2 | Color/Meta Reg. 2 to video FIFO |
| 3 | Color/Meta Reg. 3 to video FIFO |
| 4 | Sample Reg. to video FIFO |
| 5 | SR0 put on readback bus |
| 6 | SR1 put on readback bus |
| 7 | CSR0 put on readback bus or written to |
| 8 | CSR1 put on readback bus or written to |
| 9 | Metabit Output Reg. put on readback bus |
| 10 | Video Data Counter Lo [0:7] put on readback bus or written to |
| 11 | Video Data Counter Hi [8:12] put on readback bus or written to |
| 12 | Leading White Counter [0:7] put on readback bus or written to |

TABLE 2-continued

| SEL | Register Accessed |
|---|---|
| 13 | Trailing White Counter [0:7] put on readback bus or written to |
| 14 | Full Flag Reg. put on readback bus |
| 15 | Reserved for future use |

When bit 6 of the first configuration register is high (i.e., normal mode), the multichannel combiner 1630 will generate the normal print data and send it to the data FIFO 1642.

Table 3 shows the bit assignments for the second configuration register 1682. Bits 7 and 8 provide flexibility in the IOT interface by determining the polarity of the IOT interface signals. Bits 5 and 6 provide diagnostic support. Bits 1, 2, 3 and 4 are not implemented in this first preferred embodiment.

TABLE 3

| BIT | HIGH | LOW |
|---|---|---|
| 8 | Start on PSync Fall | Start on PSync Rise |
| 7 | Start on LSync Fall | Start on LSync Rise |
| 6 | Fake PSync On | Fake PSync Off |
| 5 | Fake LSync On | Fake LSync Off |
| 4 | Reserved For Future Use | Reserved For Future Use |
| 3 | Reserved For Future Use | Reserved For Future Use |
| 2 | Reserved For Future Use | Reserved For Future Use |
| 1 | Reserved For Future Use | Reserved For Future Use |

Bit assignment for Configuration/Status Register 1 (CSR1) tab

TABLE 4

| Command Bit | Field Descriptor |
|---|---|
| 0 | RepCnt0 |
| 1 | RepCnt1 |
| 2 | RepCnt2 |
| 3 | RepCnt3 |
| 4 | RepCnt4 |
| 5 | RepCnt5 |
| 6 | SCRes0 |
| 7 | SCRes1 |
| 8 | SrcB0 |
| 9 | SrcB1 |
| 10 | SrcA0 |
| 11 | SrcA1 |
| 12 | Cntrl0 |
| 13 | Cntrl1 |
| 14 | LdColor |
| 15 | Repeat/Normal |

Normal Mode (Bit 15 = 0)

TABLE 5

| LdColor | Command |
|---|---|
| 0 | Don't load color |
| 1 | load SrcB CC/Meta Reg from FIFOs Note: 1) if in Use Metabit Mode, metabit will be loaded from unpacker 2) Color/Meta Reg will only be loaded if this is first clock cycle of this command for Color/Meta Reg 0–2, or any clock cycle of this command for Color/Meta Reg 3. |

TABLE 5-continued

| Cntrl1 | Cntrl0 | Command |
|---|---|---|
| 0 | 0 | Always SrcB |
| 0 | 1 | Always SrcA |
| 1 | 0 | Mask selects between SrcA and SrcB |
| 1 | 1 | Mask selects between SrcB and SrcA |
| SrcA1 | SrcA0 | Command |
| 0 | 0 | SrcA selects Color/Meta Reg 0 |
| 0 | 1 | SrcA selects Color/Meta Reg 1 |
| 1 | 0 | SrcA selects Color/Meta Reg 2 |
| 1 | 1 | SrcA selects Sample |
| SrcB1 | SrcB0 | Command |
| 0 | 0 | SrcB selects Color/Meta Reg 0 |
| 0 | 1 | SrcB selects Color/Meta Reg 1 |
| 1 | 0 | SrcB selects Color/Meta Reg 2 |
| 1 | 1 | SrcB selects Color/Meta Reg 3 |
| SCRes1 | SCRes0 | Command |
| 0 | 0 | divide sample clock by 4 |
| 0 | 1 | divide sample clock by 3 |
| 1 | 0 | divide sample clock by 2 |
| 1 | 1 | divide sample clock by 1 |
| RepCnt0–5 | | Command |
| | | Normal Command Repeat Count |

Normal Command Decode Table

Referring again to FIG. 5, the command/mask controller 1686 receives a 16-bit command instruction and a 1-bit mask channel input. Tables 4 and 5 show the bit assignments for the 16-bit command instruction when the normal/repeat mode bit is set to normal (i.e., bit 15 is set to 0). In the normal mode as shown in Table 4, bits 0–5 represent the 6-bit count value. The count value indicates how many successive pixels this command will be valid for. Bits 6 and 7 represent the 2-bit value for the sample clock resolution conversion. Depending on the values for bits 6 and 7, the sample clock will be divided by 1, 2, 3, or 4. By dividing the sample clock, the resolution of the output image can be altered by causing the current color in the internal sample FIFO 1632B to be output repeatedly. That is, if the values of bits 6 and 7 are both 0, such that the "divide sample clock by 4" command is selected, the color contained in the internal sample FIFO 1632B would be repeatedly output four times for each clock cycle. Therefore, a printer with, for example, 400 spot per inch (spi) resolution would be able to print sample maps at 400 spi, 200 spi, 133 spi, and 100 spi without any additional processing required.

Bits 8 and 9 represent the color register select B value, while bits 10 and 11 represent the color register select A value. Both the color register select A value and the color register select B value indicate which one of the color/metabit registers 1634–1637 (or internal sample FIFO 1632B) should be passed by the combiner to the data FIFO 1642. The color register select A value selects between color/metabit registers 1634, 1635 and 1636 or the internal sample FIFO 1632B, while the color register select B value selects between the color/metabit registers 1634–1637. There are two select values, A and B, so that the 1-bit mask channel can be used to switch between them. This mode is specified by bits 12 and 13, and is used to rapidly switch between the two color registers specified by the A and B values without any additional instruction overhead.

Bits 12 and 13 represent a 2-bit combiner control value. The combiner control value indicates the color data to be output by the multichannel combiner 1630 to the data FIFO 1642 for the next n pixels indicated by the 6-bit count value. The combiner control value indicates whether the color to be output comes from the register selected by the color register select A value, the color register select B value, or a combination of the two as further controlled by the mask channel.

Finally, bit 14 indicates whether or not the next color data to be output from the color channel FIFO 1624 should be loaded into the one of the color/metabit registers 1634–1637 indicated by the color register select B value.

In operation, when a new normal mode command is input from the command channel FIFO 1628, the load color bit 14 is decoded to determine if the next 8-bit color data byte stored in the color channel FIFO 1624 should be loaded into the color/meta register 1634–1637 indicated by the color register select B bits 8 and 9. It is important to note that if the color register select B bits 8 and 9 indicate color/metabit registers 1634–1636 (color meta registers 0–2, then a color will be loaded in from the color channel FIFO 1624 only on the first clock cycle of the command.

However, if the color register select B bits 8 and 9 indicate color/metabit register 1637 (color/meta register 3) then a new constant color data word will be loaded into the color/metabit register 1637 from the color channel FIFO 1624 for every clock cycle of this command. In this way, the constant color channel can be used, in effect, as a low-speed sample channel. Because in some highly complex images, the constant color data in a scan line may change rapidly (i.e., change every 1–8 pixels), the processing overhead necessary to generate, store, transmit and decode a new command word for each new color is excessive and results in negative compression relative to bytemap representation.

This effective negative compression can be avoided by providing the string of constant colors to the constant color channel FIFO 1624 and reading one constant color byte of a string of constant colors from the color FIFO 1624 every clock cycle and loading it into the color/metabit register 1637. Since the constant color channel FIFO 1624 can only be loaded two bytes at a time, rather than four bytes at a time, as in the sampled data channel FIFO 1620, using the constant color channel FIFO 1624 in this way results in the throughput of the constant color channel being lower than the throughput of the sample data channel. However, this "slow sample" method avoids the overhead required when generating the DMA pointers which are used in the regular sample data channel (described in more detail below). Thus, this "slow sample" channel is most useful for short stretches of rapidly changing constant colors, but is not used for large images.

Next, the combiner control bits 12 and 13 are decoded to determine which color select register bank, A or B, will be used to determine which color/metabit register 1634–1637 (or the internal sample FIFO 1632B) will be used as the source for the color data, and whether the mask data from the mask channel will be used to further control the data flow from the multichannel combiner 1630 to the data FIFO 1642. Of course, if the load color bit 14 and the color select register B bits 8 and 9 indicate using the color/metabit register 1637 as the "slow-sample" color channel, the control bits 12 and 13 must indicate using the color register select B bank. On the other hand, if the command bits 12 and 13 indicate using color register select bank A to indicate the source for the color data, the load color bit 14 and the color register select bank B bits 8 and 9 can be used to preload the next color data word to be output from the constant color channel FIFO 1624 into one of the color/metabit registers 1634–1637 other than the one indicated by the color register select A bits 10 and 11. In this way, the next constant color data word can be preloaded into one of the color/metabit registers.

Next, depending on which register select bank, A or B, is indicated by the combiner control bits 13 and 14, the color register select A bits 10 and 11 or color register select B bits 8 and 9 are decoded to determine which one of the color/metabit registers 1634–1637 (or the internal sample FIFO 1632B) is indicated as the source of the color data to be output. Then, if the combiner control bits 12 and 13 indicate color register select bank A, and color register select A bits 10 and 11 indicate using the data stored in the internal sample FIFO 1632B, sampled color resolution bits 6 and 7 are decoded to determine the factor to divide the sample clock by. Next, if combiner control bits 12 and 13 indicate using the 1-bit mask channel to further control the output color, the output to data FIFO 1642 will be switched between the color register (or sample FIFO) selected by select A bits and 11 and the color register selected by select B bits and 9. Finally, the repeat count bits 0–5 are decoded to determine for how many pixels the current command instruction will be in effect.

Accordingly, as shown in FIG. 5, the color/metabit register load select 1685 is controlled by the load color bit 14 and the value of the color register select B bits 8 and 9. Likewise, the color/metabit multiplexer select controller 1689 and the output multiplexer select controller 1692 are controlled by the combination of command control bits 12 and 13, color register select B bits 8 and 9, color register select A bits 10 and 11, and the mask channel, as detailed above.

TABLE 6

| Command Bit | Field Descriptor |
|---|---|
| 0 | RepCnt0 |
| 1 | RepCnt1 |
| 2 | RepCnt2 |
| 3 | RepCnt3 |
| 4 | RepCnt4 |
| 5 | RepCnt5 |
| 6 | RepCnt6 |
| 7 | RepCnt7 |
| 8 | RepCnt8 |
| 9 | RepCnt9 |
| 10 | RepCnt10 |
| 11 | RepCnt11 |
| 12 | RepCnt12/Mask Scanline Disable |
| 13 | RepType0 |
| 14 | RepType1 |
| 15 | Repeat/Normal |

Repeat Mode (Bit 15 = 1)

TABLE 7

| RepType1 | RepType0 | Command |
|---|---|---|
| 0 | 0 | Repeat last normal command |
| 0 | 1 | Output White: |
| | | Used for leading edge white data. Note that repeat count should equal 0. |

TABLE 7-continued

| | | |
|---|---|---|
| 1 | 0 | End of Line: |
| | | Used for trailing edge white data. Note that repeat count should equal 0. |
| 1 | 1 | End of Page |
| | Rep12 | Command |
| | 0 | Note: |
| | | if End of Line is decoded from this command, Rep12 acts as Mask Channel Scanline Disable. If this bit is low, the Mask Channel is enabled for the next scanline. |
| | 1 | if End of Line, Mask Channel disabled for the next scanline. |
| | RepCnt0–12 | Command |
| | | Repeat Command Repeat Count. |

Repeat Command Decode Table

However, if repeat mode bit 15 is set high, indicating the repeat mode, the command bits of the command instruction take the form indicated in Tables 6 and 7. As shown in Tables 6 and 7, command bits 0–12 represent the repeat count. Since the repeat count in the repeat mode provides 128 times the range of the repeat count in the normal mode, the repeat mode is used when very wide structures of a scan line have the same color data or object, such as a scanned image or large constant color area.

Finally, bits 13 and 14 represent the repeat type of the repeat mode command instruction. If the repeat type is normal, the previous command is repeated for the additional number of pixels indicated by the repeat count bits 0–11. In this case, the previous command register 1682 shown in FIG. 5 is used. If the repeat command type indicates either leading white data or end of line trailing white data, a single white byte is loaded into the data FIFO 1642 by the white (transparent) generator 1690. This white (transparent) generator 1690 is set to the correct value of white by configuration register 1681. If the repeat command type indicates end of page, this command stops execution of further commands until the circuit is reset.

It should be appreciated that only when the repeat type bits 13 and 14 indicate the end of line type is bit 12 redefined to be the mask scan line enable/disable bit, which is used to either turn on or turn off the mask channel for the next scan line. This allows only those scan lines with pertinent mask data to be placed in the mask channel, which compresses the data needed for the mask channel. This is shown in Table 7.

It should also be appreciated that when the repeat type bits 13 and 14 indicate either the output white type or end of line type, the repeat count is not used. Instead, white space at the beginning and end of a line is a special case of video data generation that can be taken advantage of to increase the amount of time available to generate the actual page data. To generate leading and trailing edge white (transparent) data, three counters are attached to IOT interface controller 1691 and are preloaded with the correct data at the beginning of each color separation. The leading white counter 1694 is used to count the beginning margin on each scanline. It begins counting when the line and page sync handler 1688 receives a new line sync signal from the IOT. While the leading white counter 1694 is counting, the IOT interface controller 1691 disables the read enable of data FIFO 1642 to repeatedly output the single white byte placed in the data FIFO 1642 by the leading white repeat command. The white byte is read repeatedly by the IOT 170. When the leading white counter 1694 reaches 0, the video data counter 1695 begins counting and the IOT interface controller 1691 enables the data FIFO 1642 and the output metabit FIFO 1640 to stream their data to the IOT 170 under synchronization from the IOT controller 1691. When the video data counter 1695 reaches zero, the trailing white counter 1696 begins to count, and the IOT interface controller 1691 causes the single white byte placed in the data FIFO 1642 to be read repeatedly by the IOT 170.

The IOT interface controller 1691 operates independently of the parts of the FIFO control and command/mask channel processor 1680 which cause the data and output metabit FIFOs 1642 and 1640 to be filled. The IOT interface controller 1691 receives a clock signal, a page sync signal, and a line sync signal from the IOT 170 through the line and page sync handler 1688, and provides a return clock signal and a read data signal back to the IOT 170. As long as the data FIFO 1642 and the output metabit FIFO 1640 have valid data as filled by the multichannel combiner 1630, the IOT interface controller 1691 is used to synchronize the reading of that data at the correct time by the IOT.

Figure 6:
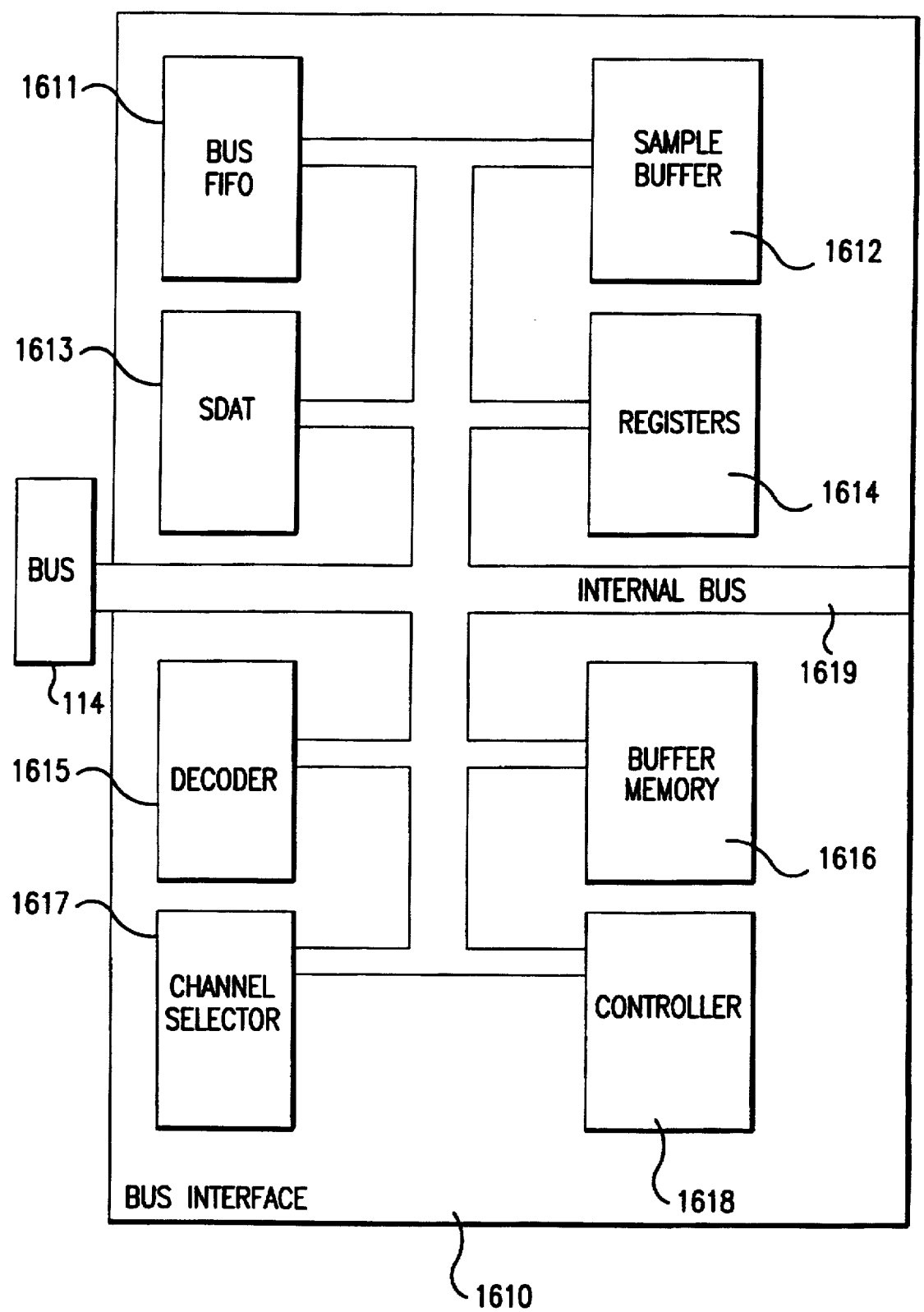
FIG. 6 shows a first preferred embodiment of the bus interface of the IOT controller.

As shown in FIG. 6, the bus interface 1610 comprises a burst FIFO 1611, a sample channel control 1612, a slow channel control 1613, registers 1614, a decoder 1615, a buffer memory 1616, channel arbitration logic 1617, and a card controller 1618.

The basic operation of the bus interface 1610 is to retrieve packets over the bus using Direct Memory Access (DMA) and write them into one of the five FIFO channels 1620–1628. The bus interface 1610 is programmed once before each page, and then operates independently to fill the FIFO channels 1620–1628. The channel arbitration logic 1617 is used to decide on the priority with which each FIFO channel 1620–1628 is filled. This is based on signals from each FIFO channel generated when they are almost empty, as well as on programmable "weights" for each channel and an interleave option for three of the channels. The weights indicate the number of times in a row that a channel remains as the current highest priority. The arbitration scheme in the first embodiment of the bus interface 1610 is based on three subsets of priorities. Priority subset 1 is always the highest priority and includes fetching new sample and mask channel pointers, described in more detail below. Priority subsets 2 and 3 alternate in priority. Priority subset 2 includes fetching sample channel data, and priority subset 3 is a round robin fetch command, fetching, in turn, mask, color, meta and command channel data.

The reasoning behind the arbitration scheme is the following: pointers (subset 1) are small, infrequent, but important fetches, as will be described below. Sample channel data (subset 2) is raw bytes that has the potential to demand the greatest bandwidth through the system. The other channels are called "slow channels" because their channel FIFOs 1622–1628 have fewer than 32 bits of width. When fetching them, it is necessary to write the fetched words into the burst FIFO 1611 so that they can be unpacked in parallel by the slow channel control 1613 onto their individual FIFO channels 1622–1628. While this is happening, another burst fetch may occur in parallel for the sample channel FIFO 1620.

It is possible to control the burst transfer size of fetches for each channel. One of the registers 1614 stores the burst size for each channel. There is also a set of registers of the registers 1614 that store the addresses in memory 150 where the data for each channel begins. The mask channel and the sample channel, in order to save memory size, use one level of indirection in fetching data. Instead of using a single address pointer register, the mask and sample color channel each have three registers. The first points to an address in memory 150 where a table is stored. This table contains a list of address/size pairs, each of which specify a part of memory 150 where the next sample map or bitmap section will be found. The sample channel control 1612 fetches the next address into a sample address register of registers 1614, and fetches the size of that block of sample data into a sample size register of registers 1614. The bus interface 1610 is then able to fetch from that part of the memory 150 until the correct amount of data has been fetched, after which it fetches the next address/size pair in the sample data table. The mask channel is handled similarly.

Since fetches always happen on word boundaries, it is possible in the case of sample data that the actual first valid byte of data may occur within a word. Thus, the sample channel control 1612 must also be able to compare the byte address in memory 150 that it has attempted to fetch with the word address in memory 150 that was actually fetched, and tag up to three bytes in the first word fetched with an "invalid" tag. The sample channel unpacker 1632a is later able to discard these invalid bytes rather than load them into the internal sample FIFO 1632b.

Other parts of the bus interface 1610 include a buffer memory 1616 for equalizing data rates, a card controller 1618 handling low level SBus card functions, and a decoder 1615 handling SBus request address mapping and decoding. One important function of decoder 1615 is to provide an interface to a serial port in IOT 170 which is able to send and receive status information.

Figure 7:
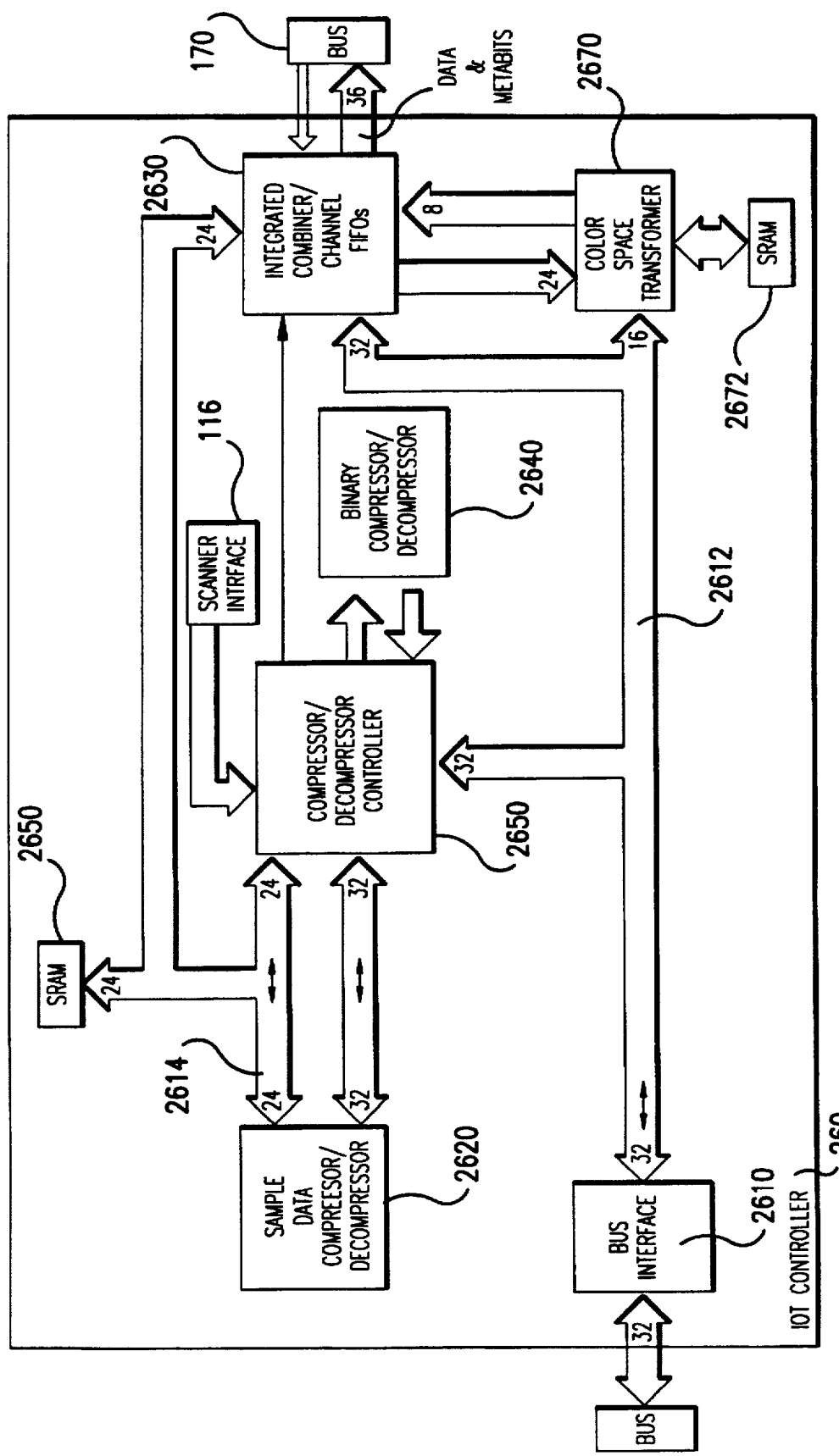
FIG. 7 shows a second preferred embodiment of the IOT controller.

FIG. 7 shows a second embodiment of the IOT controller 260. As shown in FIG. 7, the bus interface 2610, which is similar in its essential operations and configuration to the bus interface 1610, receives 4-byte bursts from the bus 114 and outputs the 32 bit data stream to the compressor/decompressor controller 2650 and the integrated combiner/channel FIFO 2630. The integrated combiner/channel FIFO 2630 integrates the multichannel combiner 1630 with the data channel FIFOs 1620–1628. The compressor/decompressor controller 2650 allows for the use of compressed data when transferring data from the memory 150 to the IOT controller 260 and is controlled by metabit information also transferred from the memory 150. The compressor/decompressor controller 2650 thus allows for the metabit information to indicate which type of compression has been applied to a received block of data.

Accordingly, it is possible to optimize the data compression based on the object type (i.e., whether the data is color image data which is optimally compressed using "JPEG" (Joint Photographic Expert Group) techniques or black/white bitmap data and other types of data which can be optimally compressed using binary compression techniques such as run length encoding or CCITT). Accordingly, based on the object type of the data input to the compressor/decompressor controller 2650, the data will be output to the sample data compressor/decompressor 2620 or the binary compressor/decompressor 2640. In addition, a scanner interface 116 (which can alternately be an interface to other devices, such as digital camera) can be attached to the compressor/decompressor controller 2650 so that on-the-fly scan data from the scanner can be obtained, compressed, transmitted to the compressor/decompressor controller 2650, decompressed and input to the appropriate channel of the integrated combiner/channel FIFOs 2630 in real time. This would allow on-the-fly insertion of image portions through a scanner or other equivalent device, such as the scanner of a copier or an integrated copier/printer, such that on-the-fly data can be incorporated into the page image under control of the metabit channel without having to change the PDL description of the page image.

Once the sample or binary data is decompressed, it is input to the integrated combiner/channel FIFOs 2630, which operates substantially as described above with respect to FIGS. 3, 4 and 5.

In addition, because the IOT controller 260 also includes a color space transformer 2670, the sample color data and the constant color data can be placed in the optimal color space prior to it being stored or transmitted. As shown in FIG. 7, the integrated combiner/channel FIFOs 2630 can output a 24-bit word (3-colors by 8-bits per color) to the color space transformer 2670, which transforms the 24-bit 3-color data into 4 bytes of color data which is then output back to the integrated combiner/channel FIFOs 2630 as four bytes representing the C, Y, M and K color separation layers. Alternately, the color data can be input directly to the color space transformer 2670 from the bus interface 2610. In both cases, the metabit data can be used to control the color space transformer 2670 to select the optimal color space transformation for the particular object type the current data relates to. As part of the object optimized color space transformation, the optimal tone reproduction curve (TRC) can be selected using the metabits. Then, the integrated combiner/channel FIFOs 2630, operating as described above with respect to FIGS. 3–5, outputs the output color data and the metabits to the IOT 170. According to the capacity and speed of the IOT 170, the final data can be output as slow as 8 bits per output cycle plus 1–4 metabits or as fast as 32 bits per output cycle plus 1–4 metabits.

Figure 8:
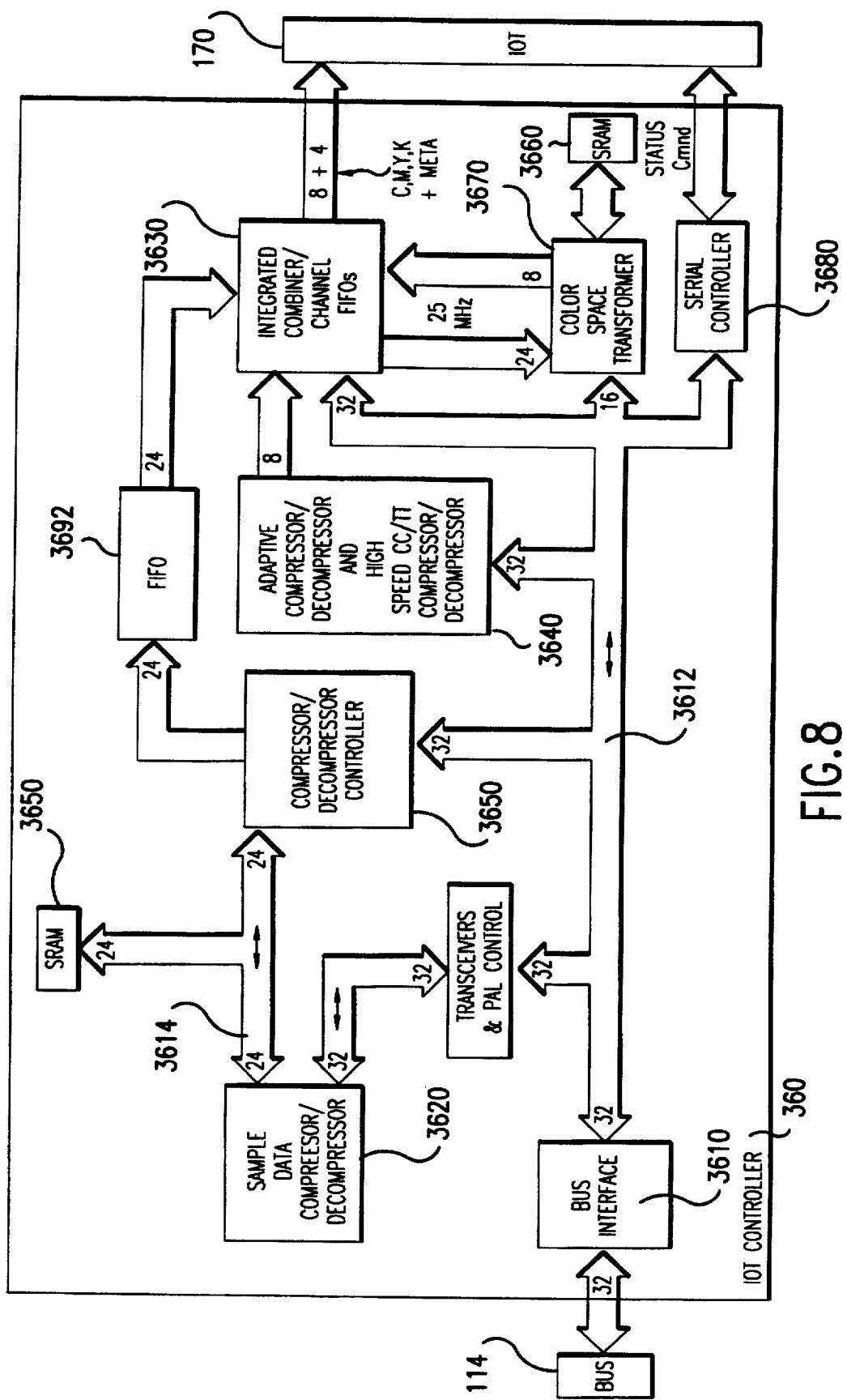
FIG. 8 shows a third preferred embodiment of the IOT controller.

In a third preferred embodiment of the IOT controller shown in FIG. 8, the compressor/decompressor controller 3650 is used only to control the sample data compressor/decompressor 3620. The binary compressor/decompressor 2640 of FIG. 7 has been replaced with a more advanced embodiment. In this embodiment, the binary compressor/decompressor 3640 is either an adaptive compressor/decompressor or a high speed CCITT compressor/decompressor. However, the third embodiment of the IOT controller 360 generally operates as described above with respect to the first and second preferred embodiments of the IOT controller.

Figure 9:
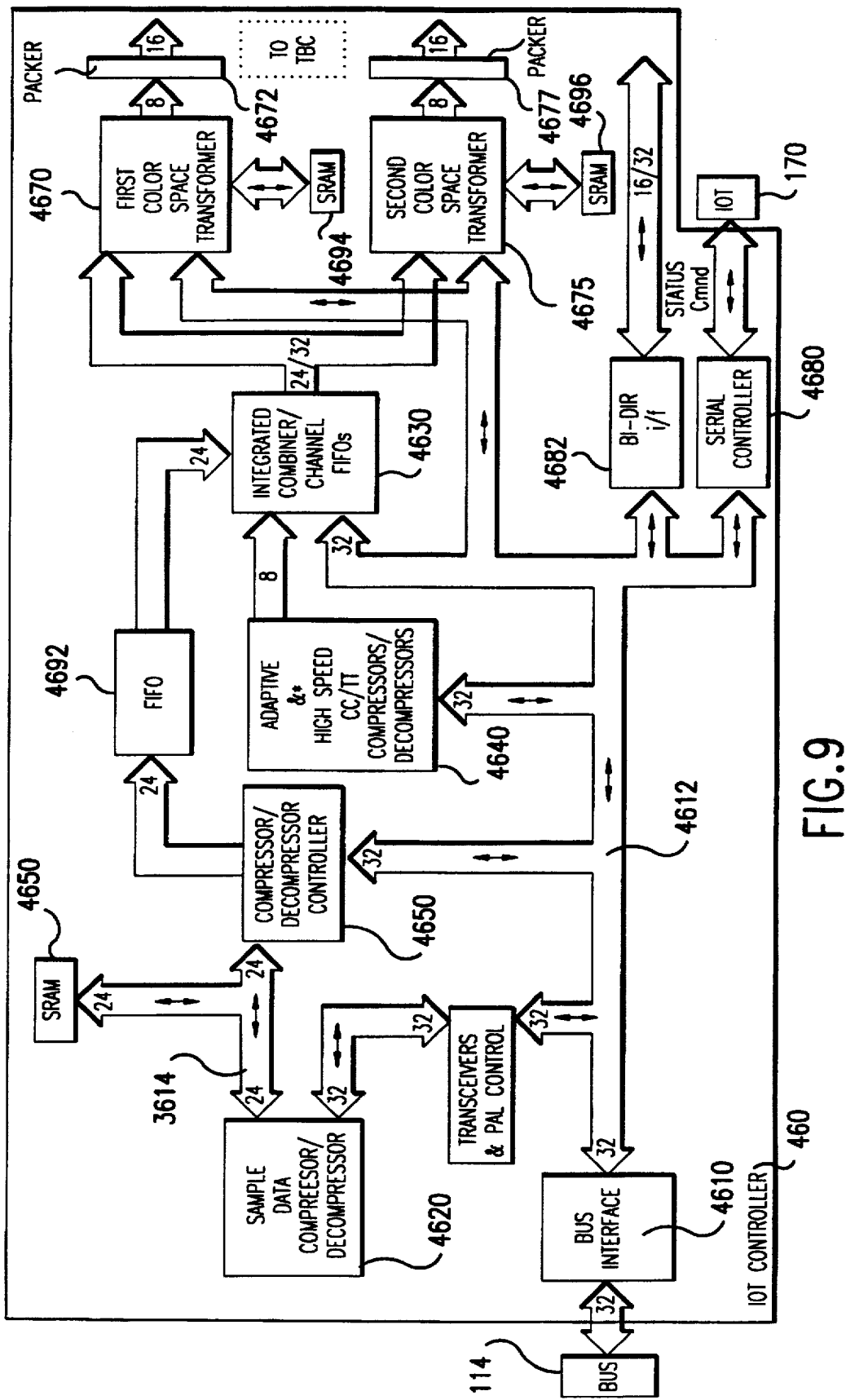
FIG. 9 shows a fourth preferred embodiment of the IOT controller.

Finally, FIG. 9 shows a fourth preferred embodiment of the IOT controller 460. In this fourth preferred embodiment, the integrated combiner and channel FIFOs 4630 outputs either 3-color (24-bit words) or 4-color (32-bit words) to a first color space transformer 4670 and a second color space transformer 4675. Each of the first color space transformer 4670 and the second color space transformer 4675 is used to generate two of the 4 color separation layers to be output to the IOT 170. In general each of the color space transformers operates at a speed twice that of the integrated combiner and channel FIFOs 4630 and the packers 4672 and 4677.

For example, the first color space transformer 4670 outputs, in a first clock cycle, an 8-bit C color separation data byte and outputs, in a second clock cycle, an 8-bit M color separation layer byte. Likewise, in the first clock cycle, the second color space transformer 4675 outputs the 8-bit Y color separation layer byte and, in the second clock cycle, outputs the 8-bit K color separation layer byte.

In the first clock cycle, the first color space transformer 4670 outputs the 8-bit C data to the packer 4672 while the second color space transformer 4675 outputs the 8-bit Y data to the packer 4677. Likewise, in the second clock cycle, the first color space transformer 4670 outputs the 8-bit M data to the packer 4672, while the second color space transformer 4675 outputs the 8-bit K data to the packer 4677. Since the packers 4672 and 4677 operate at one-half the speed of the color space transformers 4670 and 4675, they then output the combined 16-bit data from the first and second color space transformers 4670 and 4675 in parallel to the IOT 170 to provide all 4 color separation layers, as 4 8-bit words, simultaneously. In this way, a broader range of IOTs 170 can be used with this system, including 1-pass, 4-color copiers/printers which use four different print drums to form all four color separation layers C, M, Y, K on a single pass of the copy sheet through the IOT.

Figure 10:
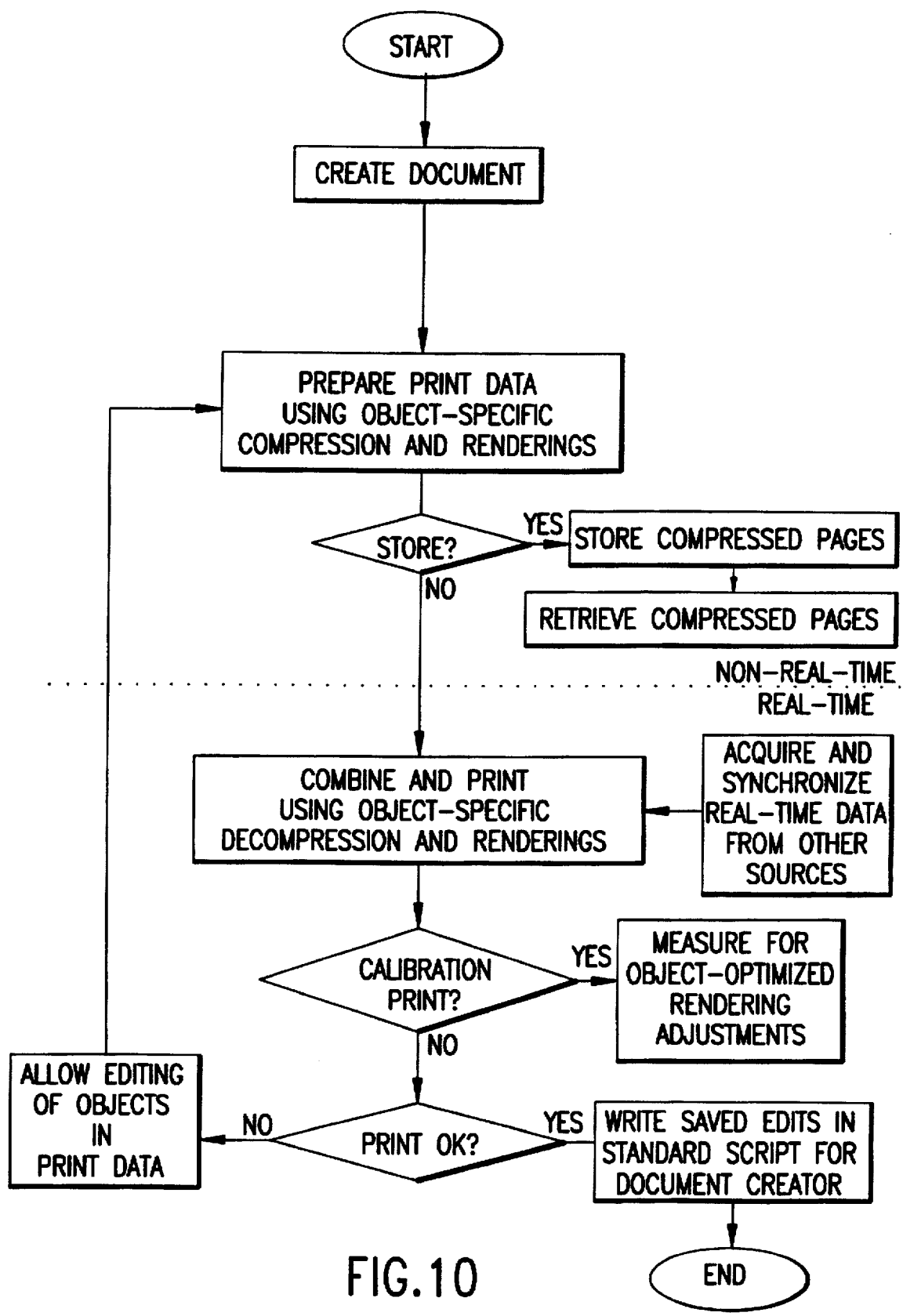
FIG. 10 shows a flowchart for the overall object optimized processing method.

The following figures show the operation of the PDL decomposition means 130, the IOT data and command instruction generating means 140 and the data structures stored in the memory 150. The memory 150 comprises a RAM portion 151 and a non-volatile portion 152. The non-volatile portion 152 can comprise any one of a hard disk, a removable tape, floppy disks, an optical disk, a flash memory, or any other equivalent memory device which provides for long term, non-volatile data storage. As shown in FIG. 10, after starting in step S10, a document is created in step S20 by a document creator such as a graphical artist or other skilled operator of a desktop publishing program.

Once the creator has finished creating the document in step S20, in step S30 the print data for the IOT is prepared using object-specific or object optimized compression and rendering techniques. The preparation of the print data in step S30 is performed by the PDL decomposition means 130 and the IOT data and command instruction generating means 140. As the print data is prepared, it is stored in the RAM portion 151 of the memory 150 using the data structure shown in FIGS. 29-32.

Then, after the print data has been prepared in step S30, it is determined, in step S40, whether the data structures in the RAM portion 151 of the memory 150 should be stored to the non-volatile portion 152 of the memory 150. Either the document creator may specify the storage step S50 or the printing system may require the storage step S50 to conserve resources for a large or complicated document. If it is determined that the data structure stored in the RAM portion 151 of the memory 150 should be stored, the compressed pages are stored in the non-volatile memory portion 152 in step S50. This necessarily requires that the creator or the printing system, after determining the compressed pages for this document stored in S50 should be printed, retrieves the compressed pages as in step S60 by copying them from the non-volatile portion 152 of the memory 150 into the RAM portion 151. Thus, the print data prepared in step S30, whether it has been stored in steps S50 and recalled in steps S60, or sent directly by step S40, is output to step S70.

It should also be appreciated that steps S20-S50, steps S110-S130, and their substeps described below, do not have to be performed in real time, as the IOT 170 is not being actively driven and therefore no real time constraints limit these steps. In contrast, it should be appreciated that steps S70-S100 are to be performed in real time, as the IOT 170 is being actively driven. Therefore, any failure to process and provide the data to the IOT 170 in real time will cause the pages printed by the IOT to be incorrect. Depending on the type and capacity of the non-volatile memory portion 152, step S60 may or may not be performed in real-time.

In step S70, the print data prepared in step S30 is combined and printed using the object-specific, or object optimized, decompression and rendering techniques. At the same time, in step S80, real time data may be acquired and synchronized to the print data prepared in step S30. The real time data in step S80 is acquired from other sources, such as a scanner, the scanner portion of a copier, a digital camera, a remote computer, or any other device which is able to generate and transmit data to the IOT controller 160 in real time.

Next, in step S90, the creator or the printing system determines whether this printing operation is a calibration print. If, the creator or the automatic calibration process of the IOT 170 determines that, in step S90, this print is to be a calibration print, the printed page is measured automatically in real-time in step S100 to determine if any object optimized rendering adjustments are necessary to correct the rendering of any of the objects of the document. For example, during one particular type of calibration test, the IOT controller 160 outputs a predetermined test document to the IOT 170. This test document contains test patches, rendered to simulate a particular type of object, such as a pictorial (sampled) object. After the IOT 170 prints the test document, sensors in or attached to the IOT 170 measure various colors of the test document and provide measurement data to the IOT controller 160. The IOT controller 160 compares the actual colors printed as indicated by the measurement data to the colors intended to be printed on the test document for that type of object, and makes adjustments. In this way, for example, the tone reproduction curve drift of the IOT 170, caused by changes in temperature, humidity or other environmental factors, can be corrected for on an object optimized basis by altering the tone reproduction curves for different types of objects, such as constant color objects, sample image data objects, or color text objects. Thus, after the calibration print is measured and object optimized rendering adjustments are made in step S110, control returns to steps S70 for printing the actual document.

However, if in step S90, this print is not to be a calibration print, control flows to step S110, now no longer real time, in which the creator determines if the printed document is okay. If the printed document is not okay, control flows to step S120, which permits the editing of objects in the print data by the creator, thus returning to step S30. In step S30, the objects, prior to flattening (which generally causes the object type to be lost) can be adjusted through an operator interface of the object optimized ESS 100. By allowing the operator or creator to make minor adjustments in the color space transform(s), the tone reproduction curve(s), and/or other factors, without having to return to the original, undecomposed, PDL document file, most of the processing required to prepare the print data using object optimized compression and rendering does not have to be repeated. In addition, since the object type is retained at this point, these types of corrections can be made once to an object, rather than repeatedly to each different scan line.

This editing step S120, which uses the information available in the object optimized ESS 100, differs from the prior art in that when dealing with rendering-related changes to the document, the creator is able to avoid the time consuming steps of returning to the workstation, recalling the entire document onto the workstation display, which is required even if only a small part needs to be changed, modifying the document, creating a new PDL version of the document, retransmitting the document to the printer, and waiting for the document to go through decomposition process before viewing a new print. Instead, rendering changes to individual objects on a page, such as modifications to the midtone cyan separation of a particular pictorial object on a page, may be entered at the printer and only the last sub-steps of the prepare print data process step S30 need to be redone within the object optimized ESS 100 before a creator is able to view a new print. Because the finalization phase of document creation is often a highly iterative process, the time saved can be considerable.

Further, because the rendering controls available to the document creator on a workstation are often different than the direct controls which can be provided by the object optimized ESS 100, and because a workstation display shows colors differently than a color printer will print them, the document creator is likely to more quickly converge on the desired colors for the objects in the document by using the rapid reprint-with-editing step S120 than by editing at the workstation, as in the prior art.

However, if the print is okay, control flows from step S110 to step S130, where any changes made in step S120 are saved in a standard format for automatic incorporation into the document by the object optimizing ESS 100 or by the document creation software. Then, control flows to step S140 where the process ends.

Figure 11:
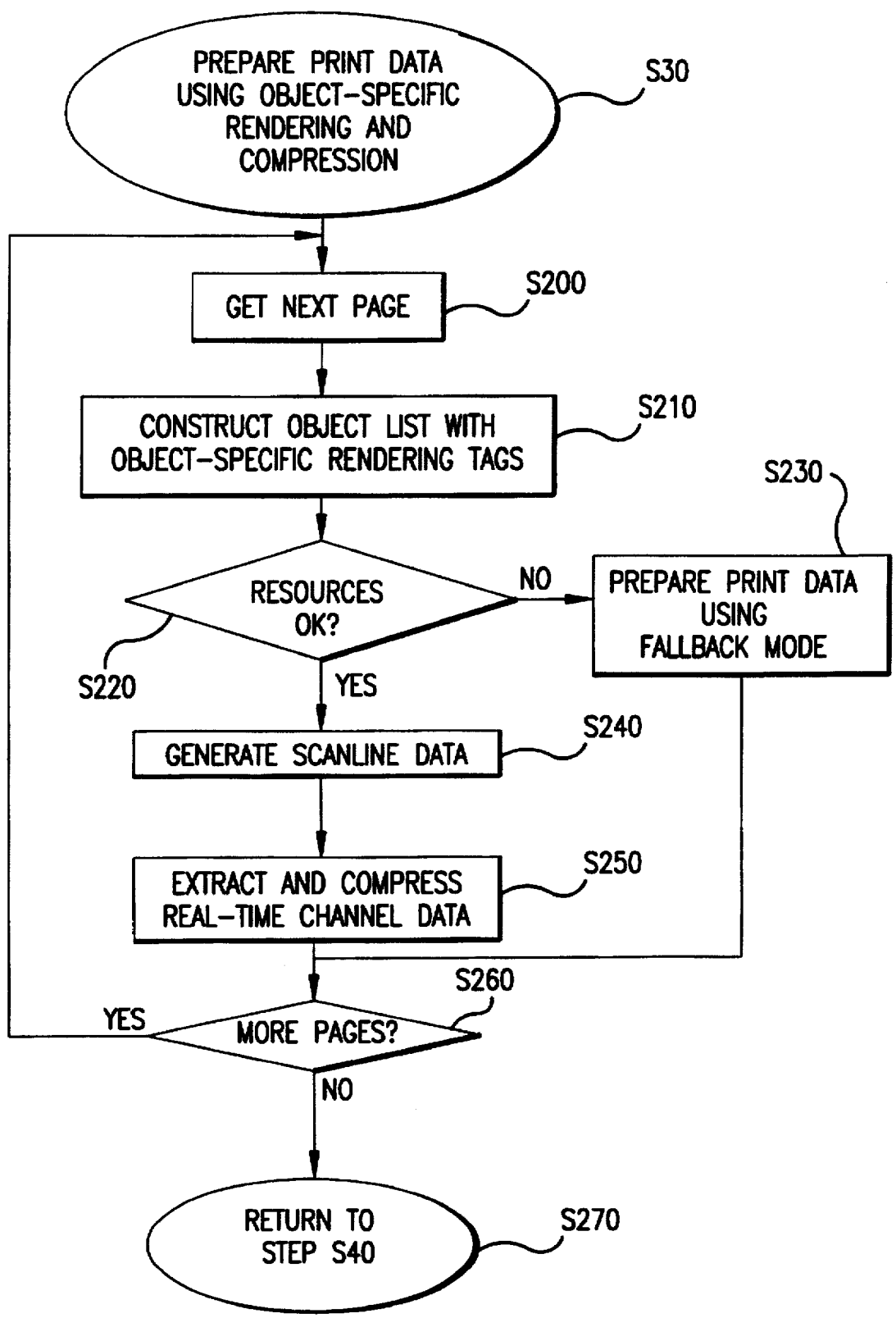
FIG. 11 shows a flowchart for preparing print data using object optimized rendering and compression.

FIG. 11 shows in greater detail the process for preparing the print data using object optimized compression and rendering techniques of step S30 of FIG. 10. As shown in FIG. 11, the print data preparing process of step S30 starts in step S200. In step S200, the next (or first) page in the document created in step S20 is obtained as the current page, either from the internal PDL file source means 110 or their remote PDL file source means 112.

Next, in step S210, the object list for the current page is constructed, and incorporates the object optimized rendering tags associated with the particular objects for this page. In the preferred embodiment of step S210, the object optimized rendering tags are generated automatically by the PDL decomposition means 130 and/or the IOT data and command instruction generating means 140 from the determined object type for each object. In a second preferred embodiment of step S210, while the automatic process for generating the object optimized rendering tags is used as a default mode, the document creator can, when preparing the document in step S20, explicitly include object optimized rendering hints when specifying an object using the PDL. These creator-inserted rendering hints include explicitly defining the object type, explicitly defining a color space transform or tone reproduction curve, explicitly setting the halftone screen frequency and/or angle, indicating preferences for gamut mapping, and/or any other desired object optimized rendering parameters which would otherwise normally be set automatically by the PDL decomposition means 130 and/or the IOT data and command instruction generating means 140.

As the object list, including the object optimized rendering tags, is being generated in step S210 for the current page, in step S220, the system resources, such as available memory, are monitored to ensure they have not been exhausted. It should be appreciated that very complex pages, having, for example, a complicated clipping region with a sweep set at an angle to the orthogonal directions of the page, can require so many objects in the object list that the memory resources in RAM portion 151 of the memory 150 are insufficient. That is, in effect, this page has a negative compression problem.

Thus, a fallback mode is provided which does not use separate memory for each additional object. In the fallback mode, the current page is rendered into the sample channel and, depending on the system resources, may be rendered at a reduced resolution. If step S220 determines that the resources are not sufficient, control flows to step S230, which prepares the print data for the current page using the fallback mode. In general, the fallback mode resorts to creating the conventional bitmap/bytemap used in conventional IOTs 170. In this case, while the page is not printed such that the print parameters for each object are optimized, at least the pages can be printed. In addition, since some PDLs define the print parameters for current page by referring to a previous page (i.e., the pages are not independent), handling resource overflow by defaulting to the conventional bitmap/bytemap, as in step S230, it is possible that the faulty page makes such a reference to previously defined parameters.

Two preferred embodiments of the fallback mode are contemplated. In a first embodiment of step S230, when a page is reached that exhausts the available resources, a conventional PDL decomposition process is started from the first page of the current document. All of the state and graphical operator parameters are reset to zero. The graphical operators from the first page are processed only so far as to maintain the graphical state correctly. That is, the bitmap or bytemap is not written into.

This continues until the last independent page before the faulty page is encountered. From that point, both the graphical operators and the image data are processed, but the image data is not output to the IOT. Once the faulty page is reached, the processed image data is output to the IOT. Processing of the subsequent pages and outputting them to the IOT is continued until the first independent page after the faulty page is encountered.

From this point, the object optimizing PDL decomposition means 130 and the IOT data and command instruction generating means 140 also restart at the first page of the current document, resetting all the data fields and graphical operators to zero. The object optimizing ESS 100 continues the object optimizing processing without generating the image data until the first independent page after the faulty page is discovered. From that point until the next faulty page, the PDL decomposition means 130 and the IOT data and command instruction generating means 140 operate as set forth above. This process is then repeated for each faulty page until the entire document has been printed.

In a second preferred embodiment, two parallel processing operators are initialized for the current document. The first processing operator is the object optimizing process of this invention. The second is a conventional bytemap/bitmap processor. The object optimizing processor of this invention continues until the first faulty page is discovered.

At that point, the second processor begins operating without generating image data until the last independent page before the faulty page is discovered. From this point up to the faulty page, image data is generated, but is not output to the IOT 170. Then, the faulty page and all subsequent pages, until the first independent page after the faulty page, are generated and output to the IOT 170 by the conventional processor. When the first independent page after the faulty page is encountered, the object optimizing processor begins analyzing the graphical operators, without outputting the print data to the IOT, from the faulty page until the first independent page after the faulty page.

From this point, the object optimizing processor again generates and outputs the object optimized data to the IOT 170 and continues to do so until the next faulty page is encountered. At this point, the graphical state of the conventional processor is updated from the first independent page after the first faulty page until the last independent page before the second faulty page. Then, the process described above is repeated until the last page of the current document is printed.

However, if step S220 determines that the memory resources are sufficient, control flows to step S240, where the scanline data and commands are generated on a scanline-by-scanline basis. Then, in step S250, the real time channel data is extracted and stored in the memory 150.

Both steps S230 and S250 continue to step S260, which determines if any further pages of the current document require processing. If so, control flows back to step S200. However, if no further pages require processing, flow continues to step S270, which returns control to step S40.

Figure 12:
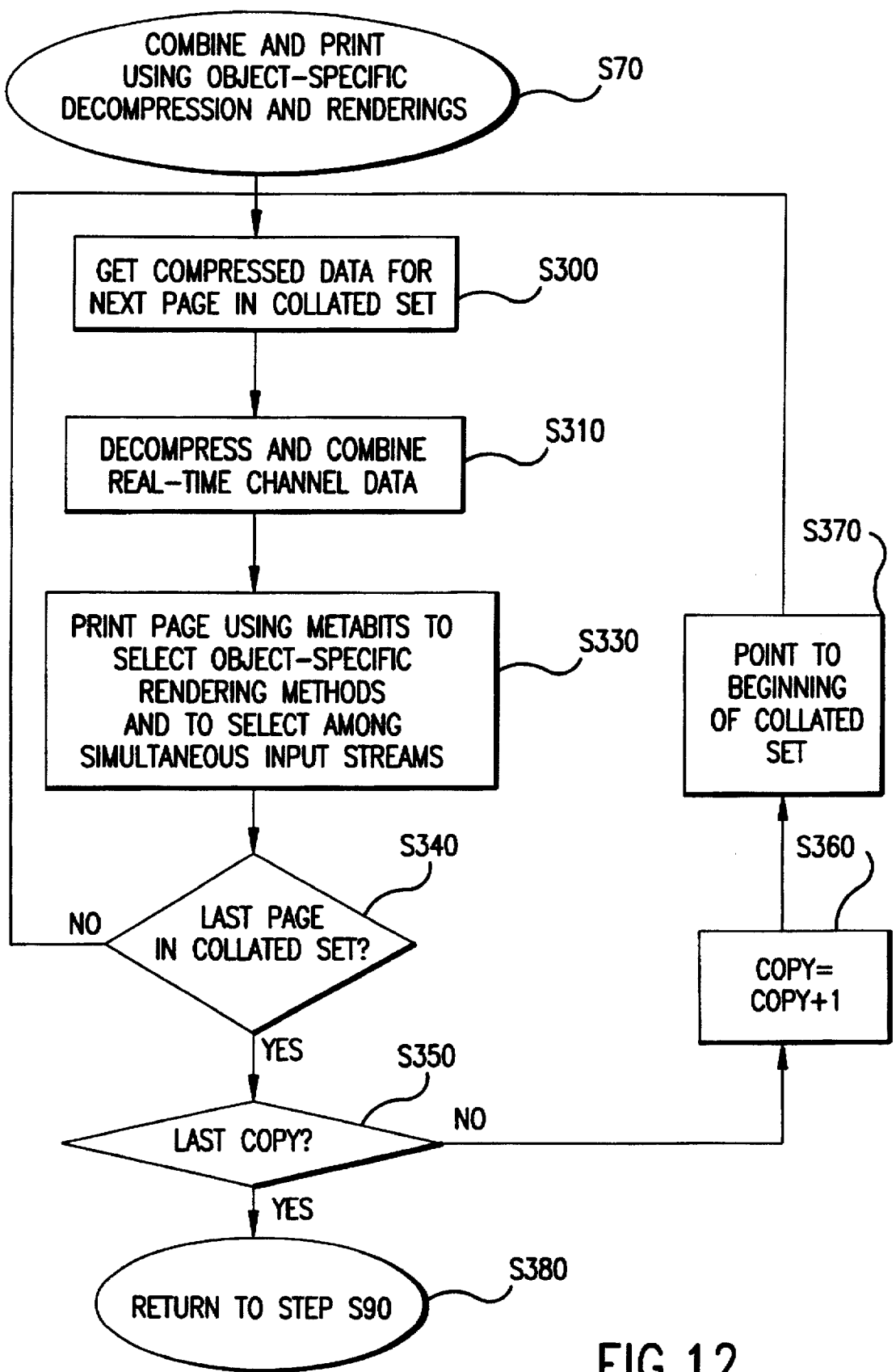
FIG. 12 shows a flowchart for combining and printing using object optimized decompression and rendering.

FIG. 12 shows in greater detail the process for combining and printing using object optimized decompression and rendering of step S70 of FIG. 10. As shown in FIG. 12, the combining and printing process of step S70 begins in step S300. In step S300, the compressed data for the next (or first) page in the collated set of pages (i.e. the pages of the current document) is obtained. In one preferred embodiment, the compressed data for the next page is obtained by the bus interface 1610 from the RAM portion 151 of the memory 150 through the bus 114.

In a second preferred embodiment, the compressed data is stored to the non-volatile memory portion 152 of memory 150. This is useful in cases where the creator wishes to be able to reprint copies of the document pages without the need for repeating the process for preparing print data using object specific compression and rendering of step S30. Note that the compressed data contains the metabit data used to control object-optimized rendering functions, so that the object optimizing capability is not lost.

Next, in step S310, the compressed data for the current page is decompressed and combined using the multichannel combiner 1630. Next, in step S330, the metabit information provided to the IOT controller 160 is used to select object optimized rendering methods and to select among simultaneous input streams in order to optimize the page printed by the IOT 170.

That is, in a first embodiment, the multichannel combiner 1630 uses the metabit information to determine parameters, such as color space transformation, tone reproduction curves, halftone generator frequencies and screen angles and/or other information on an object-by-object basis. The optimal data is determined and output to the IOT 170 based on these different types of processing to be applied to the data under control of the metabits.

In a second embodiment, some of the metabit information is used by the multichannel combiner 1630 to generate the object-optimized data, while other metabit information is output by the multichannel combiner 1630 to the IOT 170. These metabits output the IOT 170 control subsystems on the IOT 170, including color space transformation, tone reproduction curves, and/or halftone generator frequencies and screen angles, to further optimize the print data. In a third embodiment, all of the metabit information is transmitted by the IOT controller 160, along with the print data, to the subsystems of the IOT 170.

Finally, in a fourth preferred embodiment, certain aspects of the object-optimized rendering, such as color transformation, tone reproduction and the like, are applied during the process for preparing print data using object-specific rendering and compression of step S30, while the metabits control other aspects, whether in the multichannel combiner 1630 or in the IOT 170.

Once the current page is printed in step S330, by the IOT 170 in an object-optimized form, control flows to steps S340 which determines if the last page in the current copy has been printed. If the last page has not been printed, control flows back to step S300. However, if the last page of the current copy has been printed, control flows to step S350 which determines if all of the desired copies have been printed. If not, control flows to step S360 where the number of copies is incremented by 1, then to step S370 where the current page pointer is reset to the first page of the current document, and finally back to step S300. However, if step S350 determines the last copy has been printed, control flows to step S380, which returns control to step S90.

Figure 13:
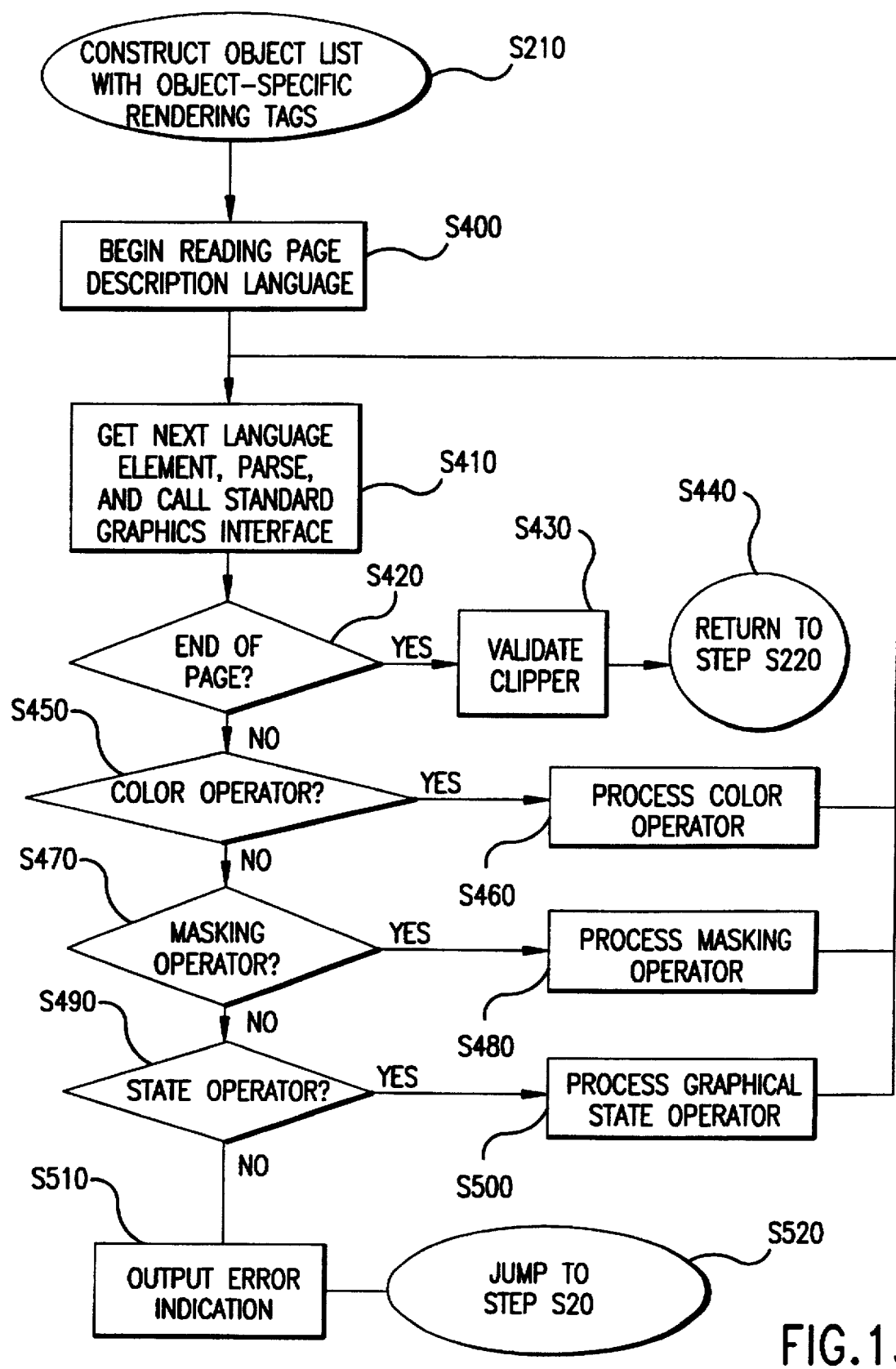
FIG. 13 shows a flowchart for constructing an object list with object optimized rendering tags.

FIG. 13 shows in greater detail the process for constructing the object list with object optimizing rendering tags of step S210 of FIG. 11. As shown in FIG. 13, constructing the object list begins by reading, in step S400, the PDL document file. Then, in step S410, the next (or first) language element is obtained as the current language element and parsed. After the current language element is parsed, the standard graphics interface is called. The parsing of a PDL and other operations leading up to calling the standard graphics interface varies from one PDL to another. These processes are well known in the art.

Next, in step S420, the current language element is analyzed to determine if it indicates the end of the current page. If the current language element indicates the end of the current page, control flows to step S430 where the clipper region of the current page is validated. The clipper validation process will be described in further detail with respect to steps S1140–1160 shown in FIG. 18. Once the clipper region for the current page is validated in step S430, control flows to step S440 where control is returned to step S220.

If the current language element does not indicate the end of the current page in step S420, control flows to step S450. In step S450, the current language element is checked to see if it is a color operator. If so, control flows to step S460 where the color operator process is performed.

However, if in step S450 the current language element is determined not to be a color operator, control flows to step S470, where the current language element is checked to see if it is a masking operator. If so, control flows to step S480, where the masking operator process is performed.

However, if in step S470, the current language element is not a masking operator, control flows to step S490, where the next language element is checked to see if it is a state operator. If so, control flows to step S500, which performs the graphical state operator process. All of steps S460, S480, and S500 return to step S410.

Finally, if the current language element is determined not to be a state operator in step S490, control flows to step S510, where an error indication is output by the object optimizing ESS 100, to indicate the current language cannot be properly parsed. Then, from step S510, control flows through step S520 back to step S20.

It should be appreciated that the color operators checked for in step S450 include such operators as "setcolor", "image", "colorimage", and equivalent commands. Of course, the actual commands depend upon the PDL language. Likewise, the masking operator commands checked for in step S470 include such commands as "fill", "stroke", "character", and other such commands. Again, the actual commands will depend upon the PDL language. Finally, the state operators checked for in state S490 include such commands as "setclipper", "setstrokewidth", "setrenderhint", and other such state operators. Again, it should be appreciated that the actual command will depend upon the PDL language used.

Figure 14:
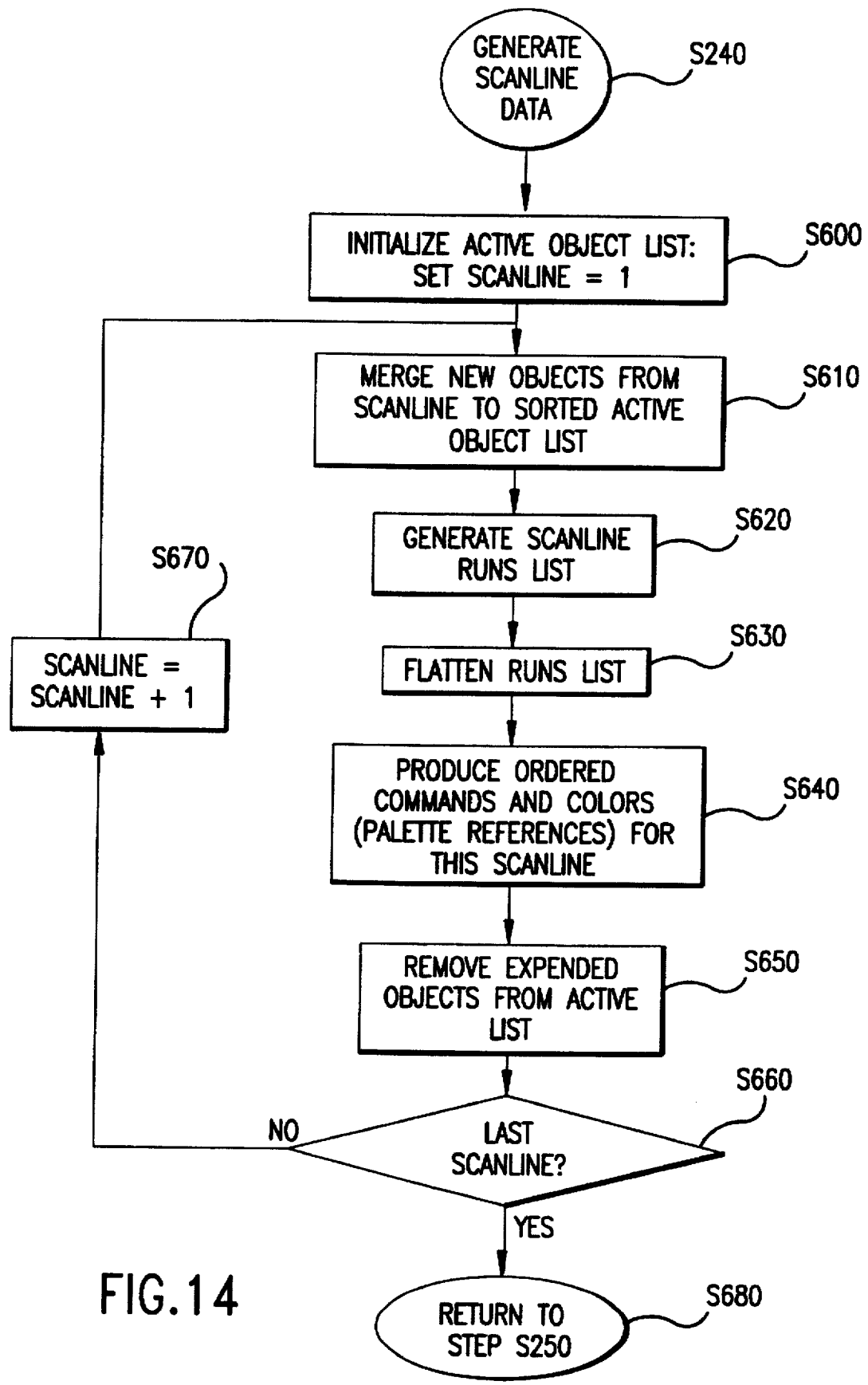
FIG. 14 shows a flowchart for generating scanline data.

FIG. 14 shows in greater detail the process for generating scanline data of step S240 of FIG. 11. As shown in FIG. 14, the process for generating the scanline data begins by initializing the active object list and setting the scanline equal to 1 in step S600.

Figure 29:
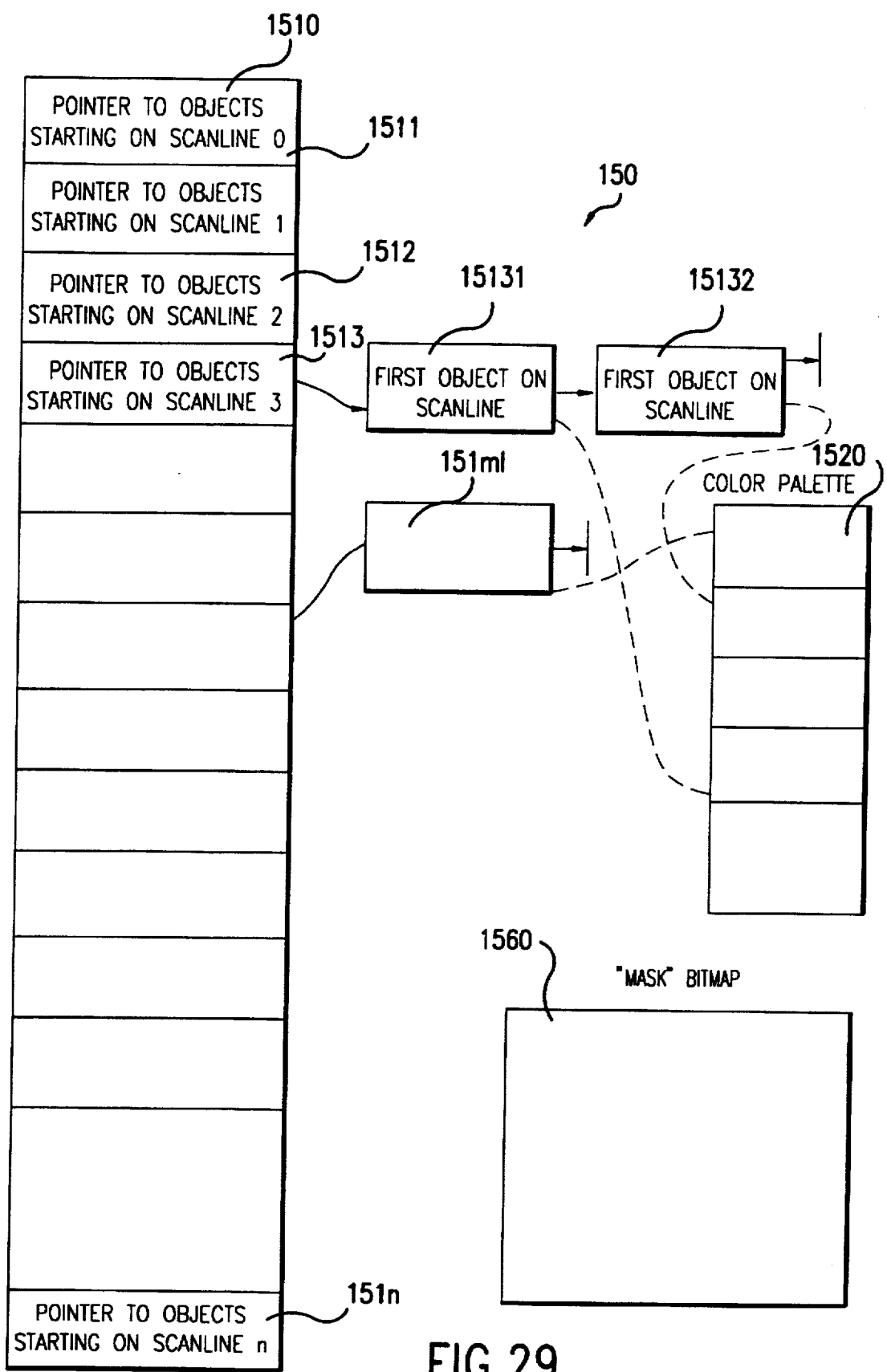
FIG. 29 shows a diagram of the data structures stored in the memory 150.

Next, in step S610, each new object from the current scanline is merged onto the sorted active object list. FIG. 29 shows a generalized form of the scanline object list data structures generated during construction of the object list with object-specific tags in step S210. As shown in FIG. 29, a pointer to the objects starting on the third scanline 1513, for example, points to the first object 15131 on the third scanline 1513, which in turn points to a second object 15132 on the scanline 1513. In this structure, the object list, such as [15131, 15132], contains objects which are positioned in the list according to the relative order of the corresponding PDL language elements that produced them.

However, the sorted active object list is sorted by the beginning position of the object and on a left-to-right basis. Thus, the first object on the sorted active object list is the active object having the leftmost starting position. Likewise, the last object on each scanline is the object having the rightmost starting position. When processing a given scanline, each object that begins on that scanline is merged into the active object list such that this left-to-right ordering is maintained. In general, the active object list contains objects which began on scanlines prior to the current scanline and which are still active.

Once the new objects are merged onto the sorted active object list in step S610, control flows to step S620. In step S620, the run list for the current scanline is generated from the sorted active object list. Then, control flows to step S630, where the runs list for the current scanline is flattened by determining, at each point along the scanline, which run of the runs list is "on top," that is, determining the run which does not underly any other run at that point.

Once the runs list is flattened in step control flows to step S640. In step S640, the ordered list of commands and colors for the current scanline is produced. The commands are generated to ensure that the proper colors are available in the color registers, that the mask data is properly enabled or disabled, that the sampled image data, if required, is available, and the metabits are properly set up to optimize the hardware processing, such as decompression, color space transformation, tone reproduction curve processing or the like performed by the IOT controller 160 or IOT 170. The colors, in the form of palette references, are generated to ensure the correct color and rendering tag information is read from the palette for each instruction.

After step S640, control flows to step S650 where expended items are removed from the sorted active objects list. Objects become expended when the current scanline is the last scanline the object appears upon. Next, in step S660, the scanline number is checked to determine if the current scanline number is the last scanline of the page. If it is not, control flows to step S670 where the scanline number is incremented by 1. From step S670, flow returns to step S610. However, if the current scanline is the last scanline, control is returned to step S250 through step S680.

Figure 15:
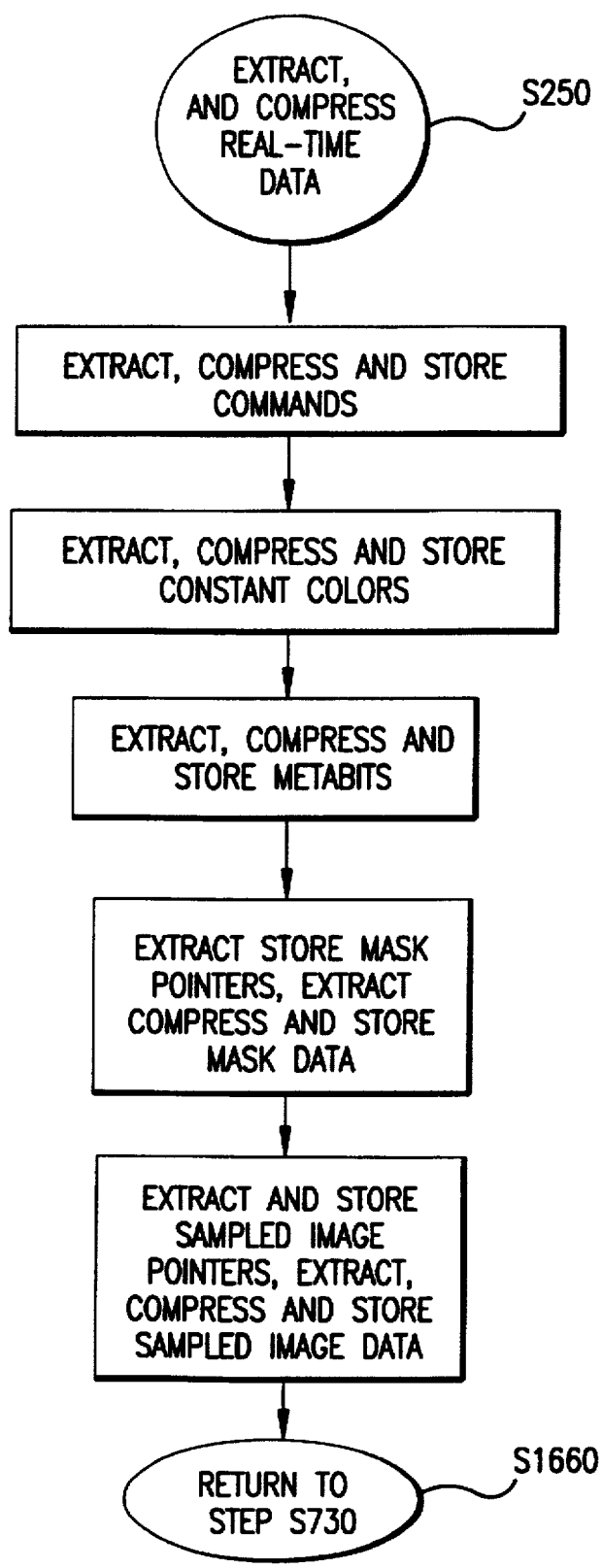
FIG. 15 shows a flowchart for loading and compressing real time data.

After the scanline data is generated in step S240, control flows to step S250. FIG. 15 shows step S250 in greater detail. The process begins in step S700 by extracting, compressing and storing the command data. Because of the characteristics of the command data, conventional compression techniques, such as Lempel-Ziv (LZ) are used to compress the command data. The command data is extracted on a scanline-by-scanline basis from the flattened runs. The command data is stored to the command channel data portion of the RAM portion 151, as shown in FIG. 32.

Next, in step S710, the constant color data is extracted, compressed and stored as described in more detail below. Then, in step S720, the metabit data is extracted, compressed and stored. In step S730, the mask pointers are extracted and stored and the mask data the mask pointers point to is extracted, compressed and stored. As with the command data, conventional techniques such as LZ compression are used to compress the constant color and metabit data. As with the above steps, the constant color data, the metabit data and the mask pointers are extracted from the flattened runs list and stored, respectively, to the constant color channel portion, the metabit channel portion and the mask data channel portion of the RAM portion 151 on a scanline-by-scanline basis. The mask data is likewise extracted and then is compressed using known one bit compression techniques such as run length encoding, CCITT Group 4 and other comparable systems. Once compressed, the mask data is also stored to the mask data channel portion of the RAM portion 151.

Then, in step S740, the sampled image pointers are extracted and stored and the sampled image data is extracted, compressed and stored to the sample data channel portion of the RAM portion 151. The processes of steps S710–S740 are very similar. However, different compression techniques appropriate for each type of data, such as those defined by the Joint Photographic Expert Group (JPEG) of the International Standards Organization, are used. Once all of the different data portions and types are extracted, (possibly) compressed and stored in steps S710–S740, control returns through step S750 to step S260.

Figure 16:
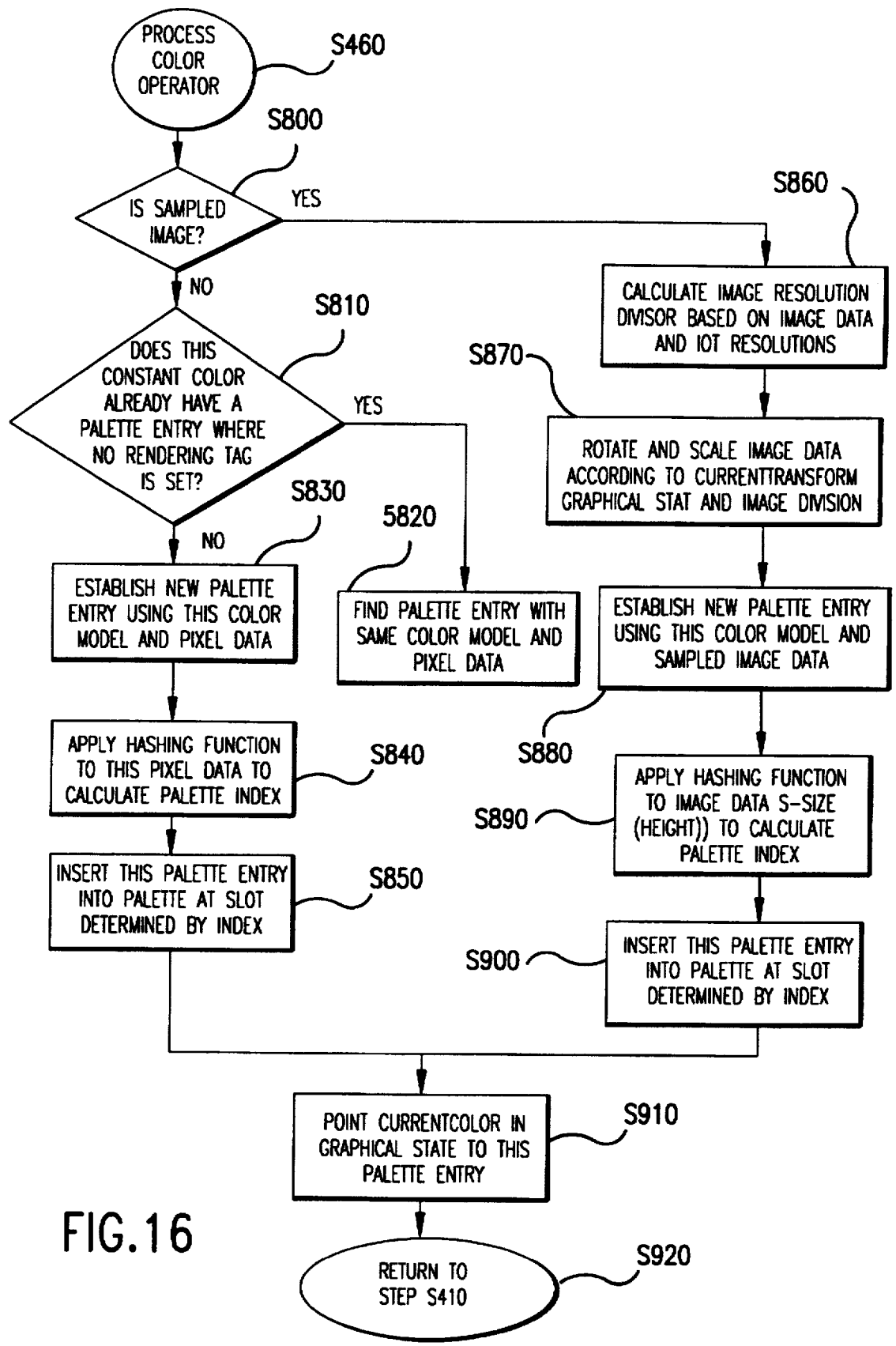
FIG. 16 shows a flowchart for processing the color operators.

FIG. 16 shows in greater detail the method for processing the color operator, of step S460 of FIG. 13. The color operator processing begins by determining in step S800 if the color-operator provides a sampled image. If it is not a sampled image, control flows to step S810. In step S810, the color palette is checked to determine if the constant color indicated by the current language element already has an identical entry in the color palette. When a palette entry is first established, its rendering tag field is set to a default value. So long as the rendering tag remains the default value, when checking to see if an identical palette entry exists, the answer will be yes. If so, control flows to step S820 where the palette entry with the same color model and pixel data as indicated by the current next language element is located.

Figure 17:
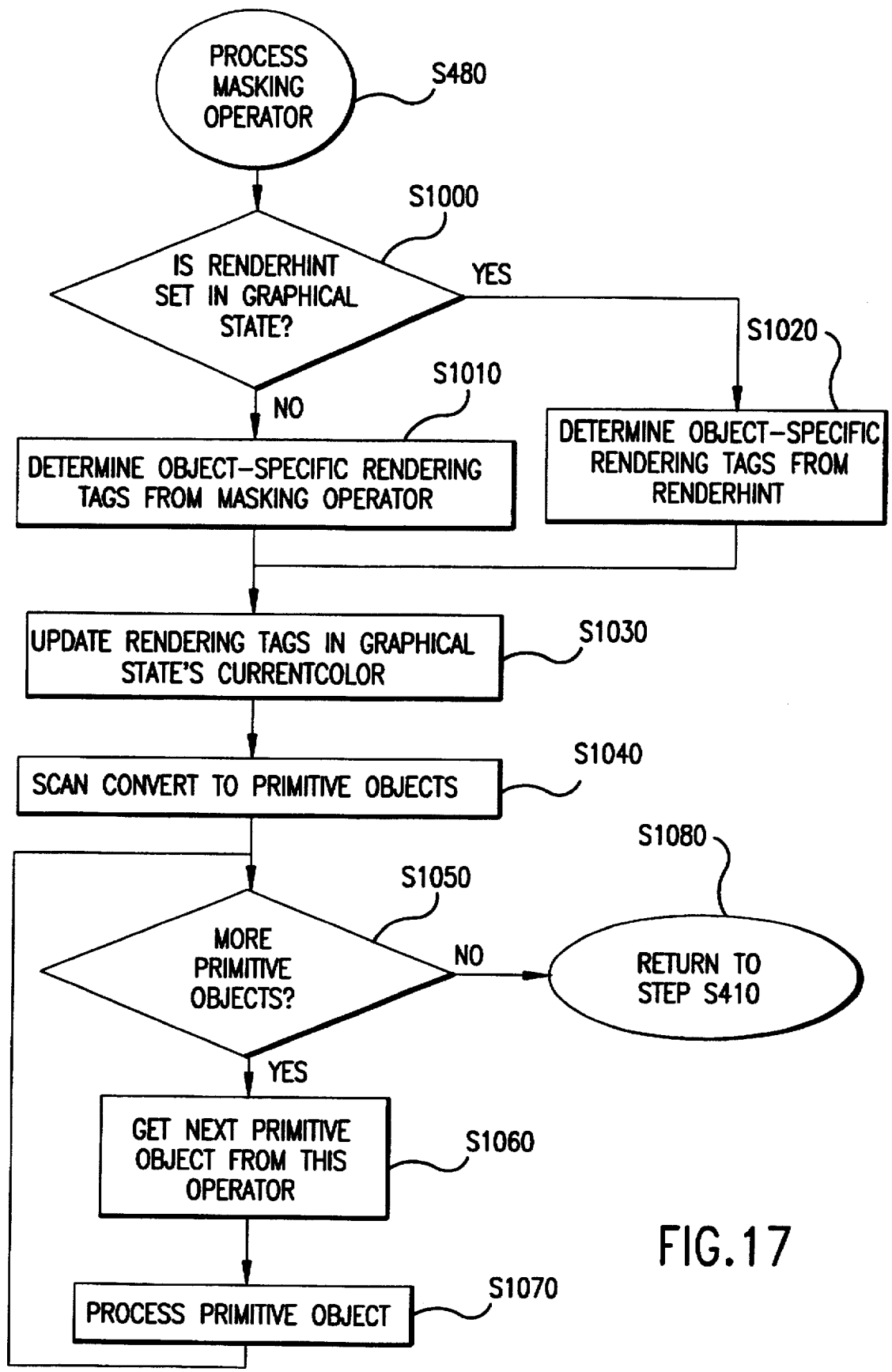
FIG. 17 shows a flowchart for processing the masking operators.
Figure 31:
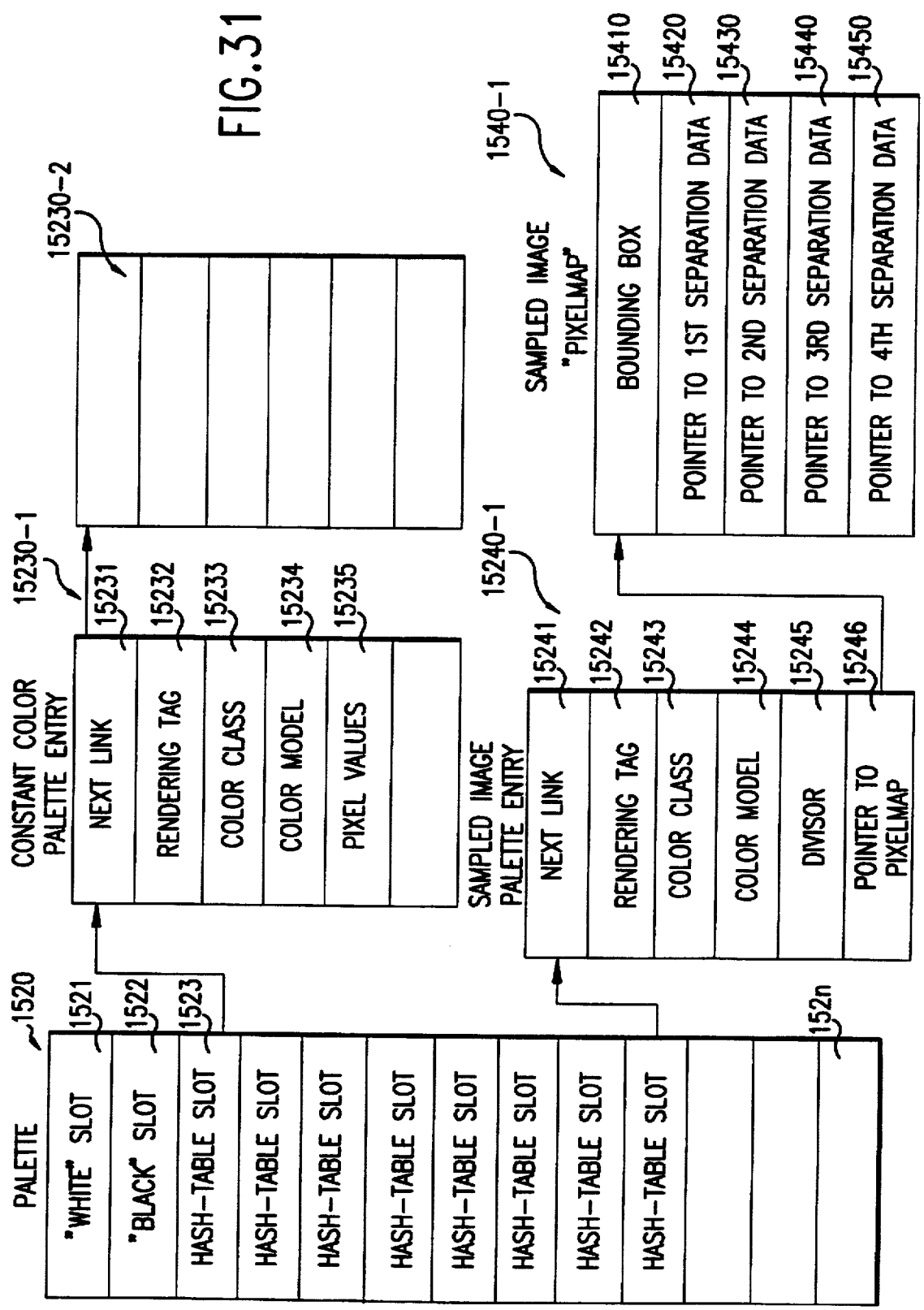
FIG. 31 shows the generic structure for the color palette.

However, if the rendering tag has been altered, for example, by step S1050 of FIG. 17, then the answer will be no, and a new palette entry will need to be created. Thus, if the answer in step S810 is no, control flows to step S830, where a new palette entry is established in the color palette, using the color model and pixel data indicated by the current language element. Then, in step S840, a hashing function is applied to the pixel data indicated by the current language element to determine the proper palette index. As shown in FIG. 31, the palette comprises a plurality of index slots 1521–1152n. Each hash table in the palette 1520 has a number of palette entries, each of which can be either a constant color entry or a sampled entry. The palette will be described in further detail below. Then, in step S850, the current palette entry is inserted into the palette at the hash table slot determined by the palette index.

In a second preferred embodiment, instead setting up a new palette entry, the current constant color can be stored off to the side, until step S1050 needs to set the rendering tag for this current constant color. In this case, only at this point will the new palette entry be formed with the rendering tag field already reset from the default value.

However, if step S800 determines that the color-operator provided a sampled image, control flows to step S860. In step S860, the image resolution divisor is calculated based on the image data and the available IOT resolutions. As described above with reference to bits 6 and 7 of Table 4, the image resolution deviser indicates how many clock cycles each pixel of the sampled image must be repeated to generate an obtainable resolution for the IOT.

Then, in step S870, the current image data is rotated and/or scaled according to the image resolution divisor determined in step S860 as well as according to the most recent "currenttransform" command evaluated by the graphical state operator process. Then, in step S880, a new color palette entry is established in the color palette using the current color model and the current sampled image data.

Next, in step S890, the palette index is calculated by applying a hashing function to the image data height or "S-Size". Then, in step S900, the current palette entry is inserted into the color palette at the hashing table slot determined by the palette index.

Then, from any one of steps S820, S850 or S900, the control flows to step S900 where the "currentcolor" pointer generated in the graphical state operator processing is set to the current palette entry determined in steps S820, S850 or S900. Then, control flows through step S920 to step S410.

FIG. 17 shows in greater detail the method for processing the masking operator of step S480 of FIG. 13. Processing the masking operator begins in step S1000 by determining if the parameter "renderhint" has been set by the graphical state operator process. If not, control flows to step S1010, where the object optimized rendering tags are automatically determined. However, if "renderhint" is set, control flows to step S1020 where the object optimized rendering tags are derived from the "renderhint" parameter(s).

That is, if the parameter "renderhint" is not set, the object optimized rendering tags are determined by first analyzing the object type for the current language element, depending on the determined object type of the current language element and the number of levels of distinctions that are provided for between different types of objects. If only a single level of distinction is enabled, the object optimized rendering tags determined in step S1010 will, for example, distinguish an image object from a non-image object. If additional levels of distinction were enabled, additional rendering tags will be generated such that the same object types might be provided with different color space transforms, different tone reproduction curves, different saturation levels, and the like.

When the "renderhint" parameter is set, in step S1020 the automatically determined values, which otherwise would have been determined in step S1010, are overridden by an explicit instruction from the document creator. Thus, the document creator can override the rendering hints which would have otherwise been set in step S1010. Thus, the "renderhint" parameter may, but need not, specify what the object type is. It may be an independent type of hint indicating regardless of what object type this object is, this is what the document creator wants to capture the observer's eye. Or the "renderhint" may indicate this object is to be in the background of the page and should not catch the observer's eye. The "renderhint" may indicate the edges of an object should not be sharpened. The "renderhint" may indicate the defined colors of this object should be preserved rather than the saturation boosted.

Alternately, the "renderhint" may explicitly define an object type, with the rest of the analysis continuing in the default mode based upon the defined object type and the undefined subparameters.

Then, from either step S1010 or step S1020, control flows to step S1030, where the rendering tags in the "currentcolor" state set by the graphical state operator process is updated. In the first preferred embodiment shown in FIGS. 13, 16 and 17, if the "currentcolor" tag is not the default tag and disagrees with the rendering tag for the palette entry indicated by the "currentcolor", that palette entry must be duplicated, the rendering tag of the new palette entry updated, and the "currentcolor" pointer updated to the new palette entry.

In a second preferred embodiment, where the new palette entry is not created during the process color operator step S460, the color data is held off to one side rather than inserted into the palette. In this case, the new palette entry is created in this step S1030, and its color values set to those held off to the side. The rendering tag of this new palette entry is set to the value determined in either step S1010 or step S1020. This new palette entry is entered into the palette at this time by performing step S840, S850 and S910 as part of step S1050.

Next, in step S1040, the current object is scan converted to generate one or more primitive objects, such as boxes, bitmaps and the like. Scan converting is a process well known in the art. Then, in step S1050, a determination is made whether all of the primitive objects have been processed. If any primitive objects remain, control flows from step S1050 to step S1060 where the next (or first) primitive object is obtained from the masking operator as the current primitive object. Then, in step S1070, the primitive masking object process is performed on the current primitive object. Then flow returns to step S1050. This loop continues until step S1050 determines there are no more primitive objects to be processed. In this case, control flows through step S1080 to return to step S410.

Figure 18:
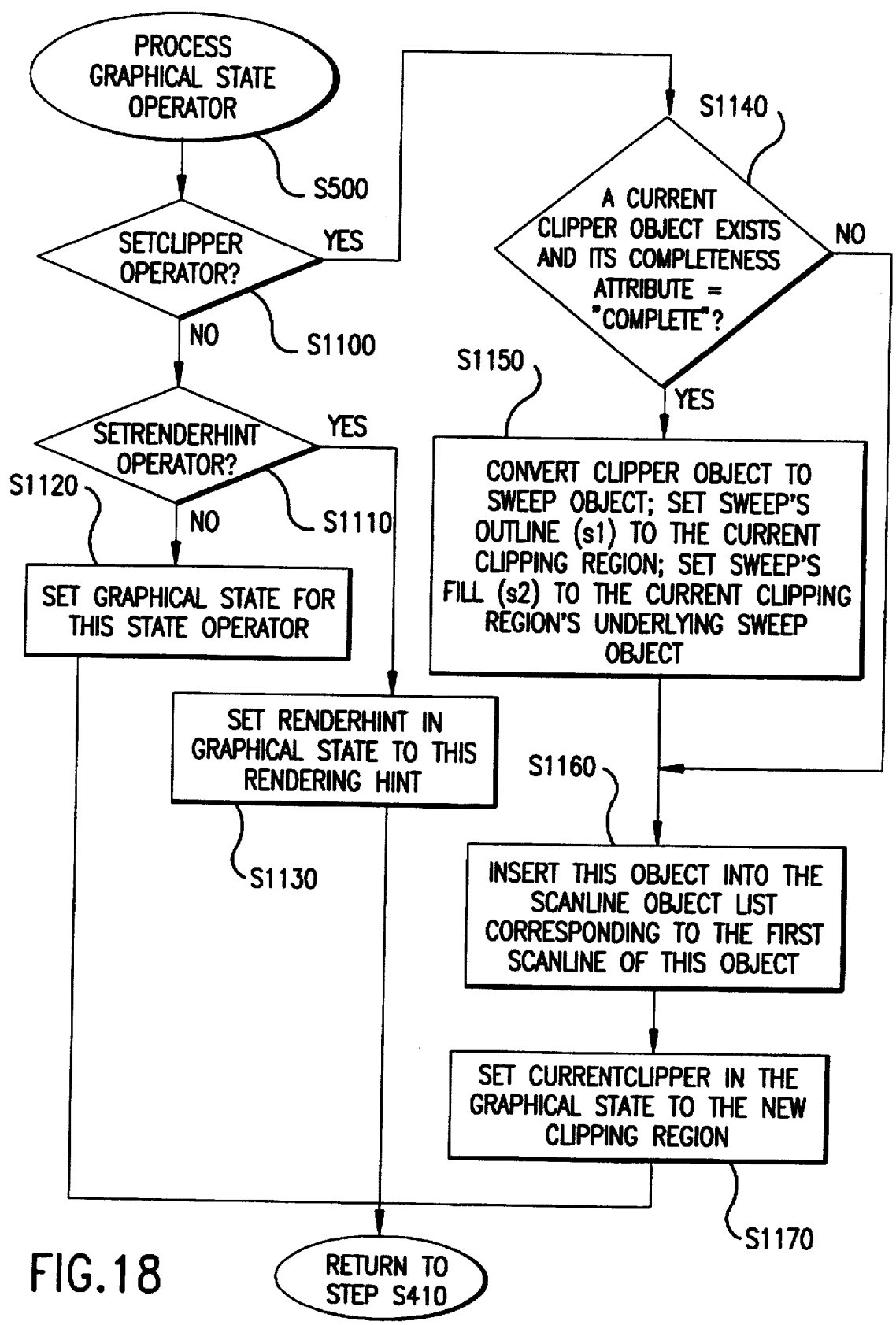
FIG. 18 shows a flowchart for processing graphical state operators.

FIG. 18 shows a more detailed version of the graphical state operator process set forth in step S500 of FIG. 13. In FIG. 18, the graphical state operator process of step S500 begins by determining in step S1100 if the "setclipper" operator is set.

If the "setclipper" operator is not set, control flows to step S1110, which determines if the "setrenderhint" operator has been set. If not, control flows to step S1120 which sets the graphical state for this state operator, and then flows to step S1180. However, if the "setrenderhint" operator is set in step S1110, control flows to step S1130 where the "renderhint" parameter in the graphical state is set to the rendering hint indicated by the "setrenderhint" operator. From step S1130, control flows again to step S1180.

However, if in step S1100 the "setclipper" operator is set, control flows to step S1140 where the existence of a current clipper object is determined as well as whether its completeness attribute is "complete." If so, control flows to step S1150, where the current complete clipper object is converted into a sweep object. Then, the sweep's outline, designated as region s1, is set to the current clipping region. At the same time the sweep's fill region, indicated as s2, is set to the current clipping region's complete underlying sweep object. However, if no current clipper object exists or none of the current existing clipper object does not have a completeness attribute of complete, control flows from step S1140 directly to step S1160.

In step S1160, this object is inserted into the scanline sorted active objects list as the first scanline of the object. Steps S1140 through S1160 form the "validate clipper" process S430 shown in FIG. 13 and described above. Then control flows to step S1170 where the "currentclipper" command in the graphical region is set to the new clipping region. Then, as in steps and S1130, control flows to step S1180, which returns control to step S410.

Figure 19:
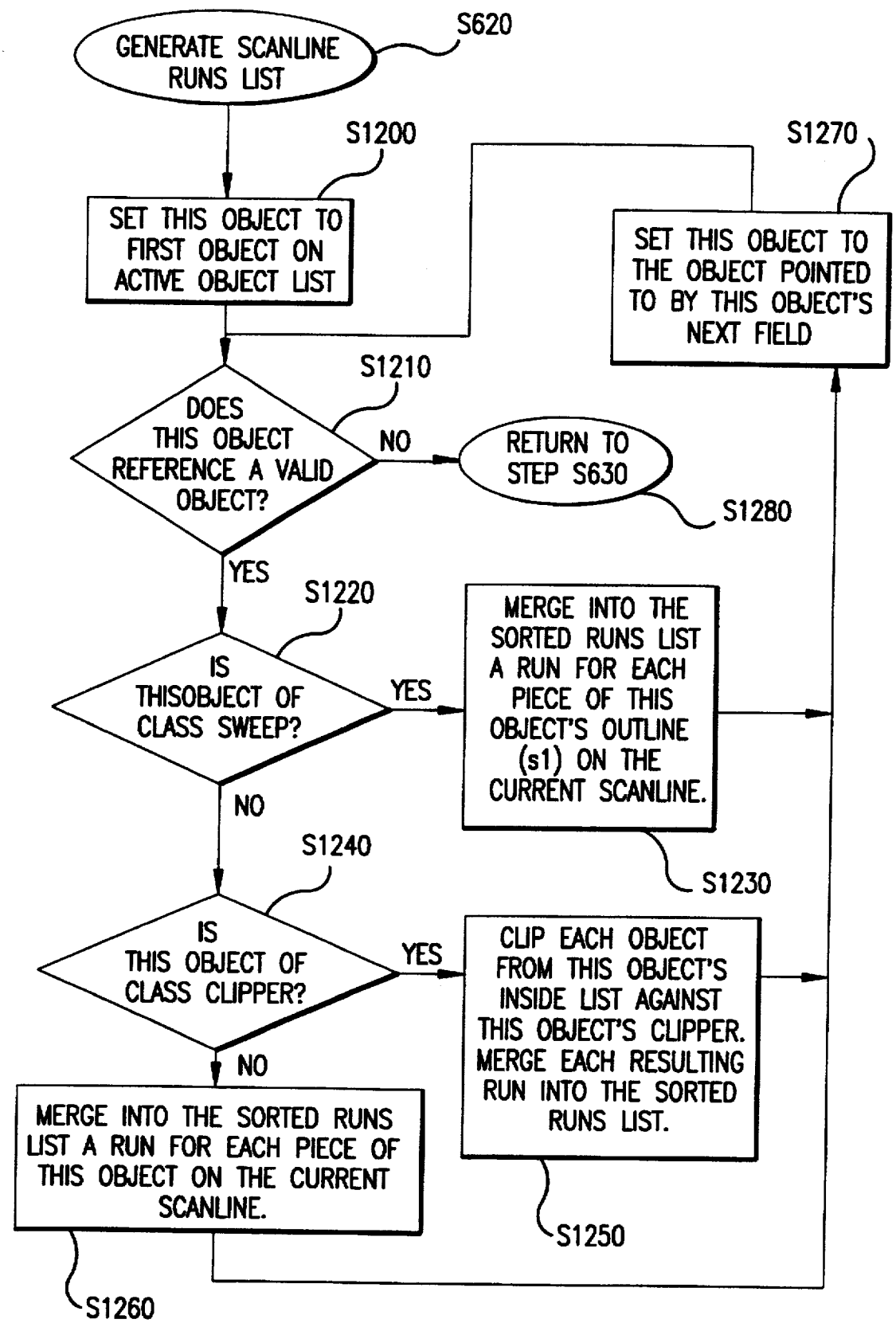
FIG. 19 shows a flowchart for generating scanline runs lists.

A more detailed description of the process for generating a scanline runs list, as set forth in step S620 of FIG. 14, is shown in FIG. 19. The process for generating the scanline runs list starts in step S1200, by setting the variable "thisobject" to the first object on the active object list of the current scanline.

Next, in step S1210, the variable "thisobject" is tested to determine if it references a valid object. If "thisobject" does not reference a valid object, control flows through step S1280 back to step S630. However, if "thisobject" does reference a valid object, as will always be true immediately after "thisobject" is set to the first object, control flows to step S1220.

In step S1220, "thisobject" is checked to see if it is a sweep-type object. If so, control flows to step S1230. In step S1230, one run for each piece of the s1 outline of "thisobject" of the current scanline is merged into the sorted runs list. Each of the merged runs will consist of a start position and an end position along the scanline. Each run will also consist of a pointer to the underlying sweep object s2 of "thisobject", so that the layer and color data may be extracted. As set forth above, the s1 region was set to the clipping region in effect at the time the sweep was created. While the region has been set to the all clipping region's underlying sweep object. After performing the merging process of step S1230, control flows to step S1270.

If, in step S1220, the class of "thisobject" is not sweep, control flows to step S1240 where "thisobject" is checked to see if it is a clipper-type object. If so, the control flows to step S1250. In step S1250, each object from "thisobject's" inside list is clipped against the clipper of "thisobject". The inside list is the list of objects which were collected and attached to this list for this clipping object during the primitive masking object processing of steps S1740–S1770, shown in FIG. 24 and described in more detail below. That is, each inside list of objects is associated to the corresponding clipping object for the period the corresponding clipping object was in effect as the current clipping region. The clipper of "thisobject" was set to the clipping region that was in effect at the time this clipper object was created, in a manner similar to that described above in connection with the s1 sweep outline. The objects are clipped by removing any part of the object which lies outside the clipper of the clipping region.

After the objects are clipped, each resulting run is merged into the sorted runs list. As in step S1220, each run consists of a start position and an end position along the scanline. However, in step S1250, each run also consists of a pointer to the clipped object from the inside list of "thisobject" to the layer and color data. As in step S1230, once the process is completed, control flows to step S1270.

If, in step S1240, the class of "thisobject" is not clipper, control flows to step S1260. In step S1260, a run for each piece of "thisobject" on the current scanline is merged into the sorted runs list. As with steps S1230 and S1250, each run consists of a start position and an end position along the scanline. However, in this case each run also consists of a pointer to "thisobject" for the layer and color data. As with steps S1230 and S1250, once the processing in step S1260 is finished, control flows to step S1270.

In step S1270, the variable "thisobject" is set to the object pointed to by the "next" field of the current "thisobject". Accordingly, the next "thisobject" becomes the current "thisobject". From step S1270, control flows back to step S1210.

Figure 20:
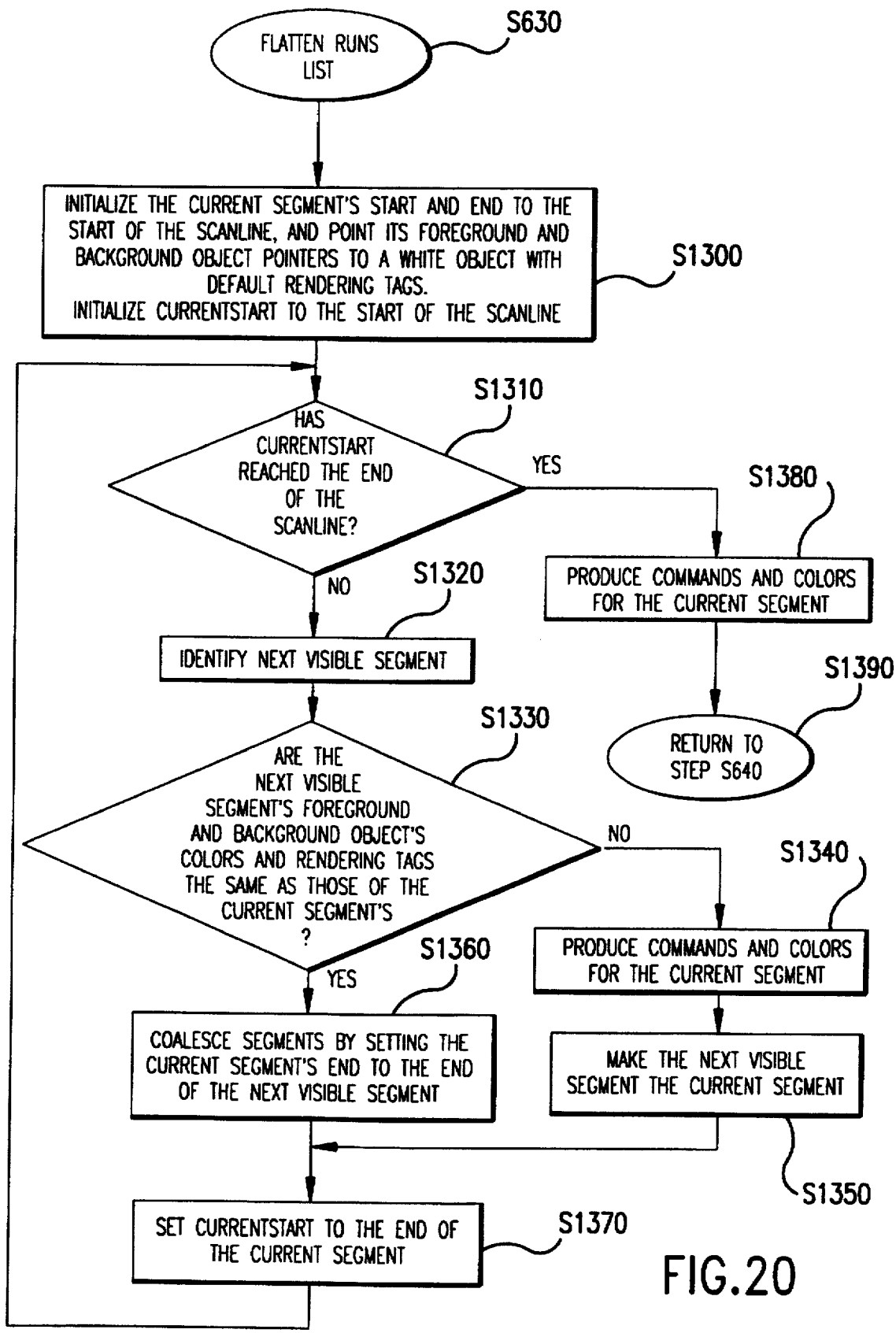
FIG. 20 shows a flowchart for flattening runs lists.

FIG. 20 shows in greater detail the process for flattening the runs list of step S360 of FIG. 14. As shown in FIG. 20, the process of flattening the runs lists begins in step S1300. In step S1300, the current run's foreground and background objects are initialized to a white object with default rendering tags. The start position and the end position are initialized to the start of the current scanline. Finally, the variable "currentstart" is initialized to the start of the scanline.

Next, in step S1310, the variable "currentstart" is checked to determine if it has reached the end of the scanline. If not, control flows through step S1320, where the next visible run is identified.

Control then flows to step S1330, where the foreground and background object colors and rendering tags of the next visible run are checked to determine if they are the same as the foreground and background object colors and rendering tags of the object of the current run. If this is true, control flows to step S1360, where the runs are combined by setting the end position of the current run to the end position of the next visible run.

However, if this is not true, control flows to step S1340, where the commands and colors for the current run are produced. Then in step S1350, the next visible run becomes the current run.

Both steps S1350 and S1360 continue to step S1370 where "currentstart" is set to the end position of the current run. Control from step S1370 then flows back to step S1310. If in step S1310, "currentstart" has now reached the end of the scanline, control flows to step S1380 where the last set of commands and colors are produced for the current run. From step S1380, control flows through step S1390 back to step S640.

Figure 21:
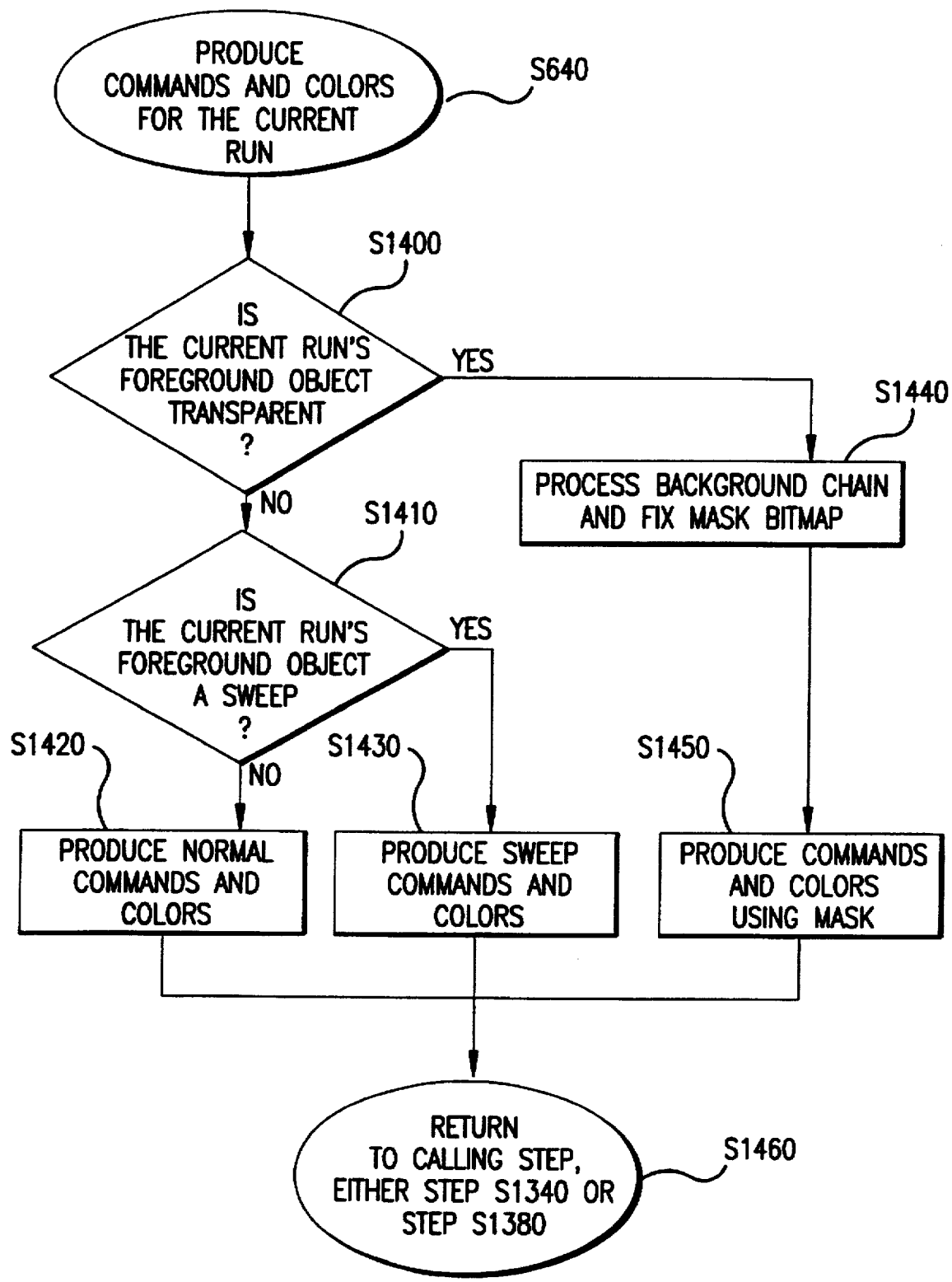
FIG. 21 shows a flowchart for producing commands and colors for the current run.

FIG. 21 shows in greater detail the process for producing commands and colors for the current run of the current scanline of either step S1340 or step S1380 of FIG. 20. In step S1400, the foreground object of the current run is examined to determine if that object is transparent. That is, is the object a bitmap class-type object 15570, with a clear field 15574 of true. If not, control passes to step S1410. In step S1410, the current run's foreground object is examined to see if the object is a class sweep-type object 15580. If not, control passes to step S1420, which produces normal commands and colors. Control then flows to step S1460.

If in step S1410, the foreground objected is determined to be a sweep class-type object 15590, control passes to step S1430, which produces sweep commands and colors. Control then again flows to step S1460. If, however, in step S1400, the current run's foreground object is determined to be a class bitmap-type object, with clear field of true, control passes to S1440, which processes the background chain and fixes the mask bitmap. Then, control passes to step S1450, which produces the commands and colors using the mask. Control then again flows to step S1460.

This procedure is unusual in that it can be called by two steps. Thus, step S1460 determines which step, S1340 or S1380, called this procedure, and returns control to the appropriate following step, step S1350 or step S1370. That is, if producing the commands and colors for the current run procedure was called by step S1340, flow continues to step S1350. Likewise, if producing the commands and colors for the current run procedure was called by step S1380, flow continues to step S1390, which in turn returns control to step S640.

As discussed above, step S1400 operates such that, if the current run's foreground object is transparent, (i.e., a bitmap-class object), the object pointed to by its background field determines the color of the "0" bits of the mask in this run, while the current run's object color determines the foreground color. But the background object may itself be a transparent bitmap, with either the same or a different foreground colors. If the foreground colors are the same, as is the case with black character bitmaps, the two adjacent transparent layers can be combined by applying a logical OR function to their bitmaps. Since the original writing of the mask channel map in this area overwrote the underneath bits, the underneath bitmap object's bitmap is OR-ed into the map in this step. This OR-ing and combining a transparent background with the object above it can continue until a transparent background layer using a color for its "1" bits different than the on-top object is reached. At this point, a conflict in the desired use of the mask channel has been found. It is resolved by converting the groups of spatially adjacent "1" bits in the conflicting background bitmap into runs and applying the "flatten" process recursively. In this way, the conflicting transparent background object is converted into a set of objects which are not transparent. This process continues down the background chain until an opaque object or the layer 0 white paper is found.

Figure 22:
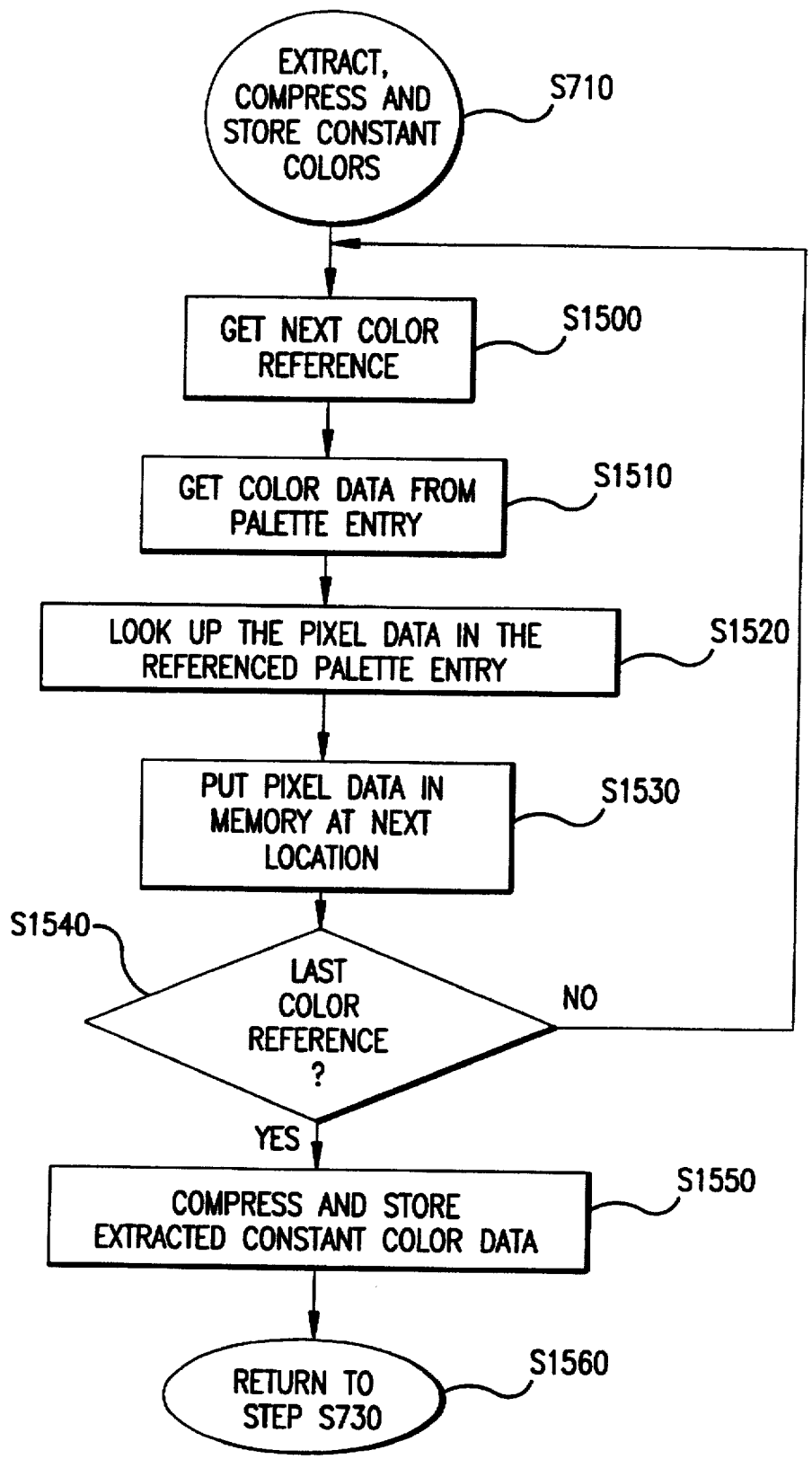
FIG. 22 shows a flowchart for extracting, compressing and storing constant color data.

FIG. 22 shows a more detailed description of the constant colors extracting, compressing and storing process of step S710 of FIG. 15. The extracting, compressing and storing constant colors process begins with step S1500. In step S1500, the next (or first) color reference is obtained as the current color reference. The current color reference is a pointer to one of the palette entries of the palette data structure shown in FIG. 31.

Next, in step S1510, the color data from the current palette entry is obtained. As shown in FIG. 31, each constant color type palette entry 15230 comprises a next link 15231 which points to the next palette entry of this hash table slot, a rendering tag field 15232 which provides data on how this palette entry is to be rendered, a color class field 15233 which indicates whether this is a constant color palette entry, a sampled image palette entry or some other type of palette entry. The color model field 15234 indicates what type of color model the pixel data uses (for example, RGB, CMYK, CIELab or the like) and may also indicate the preferred color space transform for converting this color model into CMYK in conjunction with the rendering tag field. Finally, the pixel values field 15235 stores the actual color data.

Next, in step S1520, the pixel data in the current palette entry is read from the pixel values data field 15235. Then, in step S1530, the just read pixel color data is stored into the channel data structure of the RAM 151, as shown in FIG. 32, at the next available location of the constant color channel.

In a first preferred embodiment, pixel data consisting of a mixture of color models is thus stored in the channel data structure. It is transformed to CMYK (or other IOT-specific) data under the control of the metabits in either the IOT 170 or the multichannel combiner 1630, as described above. In a second preferred embodiment, a color transform, determined by the color model and rendering tag fields, is applied to the pixel data, converting it to CMYK, as a part of step S1520.

Then, in step S1540, the palette is checked to determine if the current color reference is the last color reference. If it is not, control flows back to step S1500 and the next color reference is again selected as the current color reference. However, if the current color reference is the last color reference, control flows to step S1550.

In step S1550, the color data in the constant color channel data structure is read from memory, compressed and re-stored in compressed form. By compressing the constant color data stored in the constant color channel field as with other channel data, the data transfer over the bus 114 is minimized.

Once the constant color data is compressed and stored in step S1550, control flows through step S1560 and returns to step S720.

Figure 23:
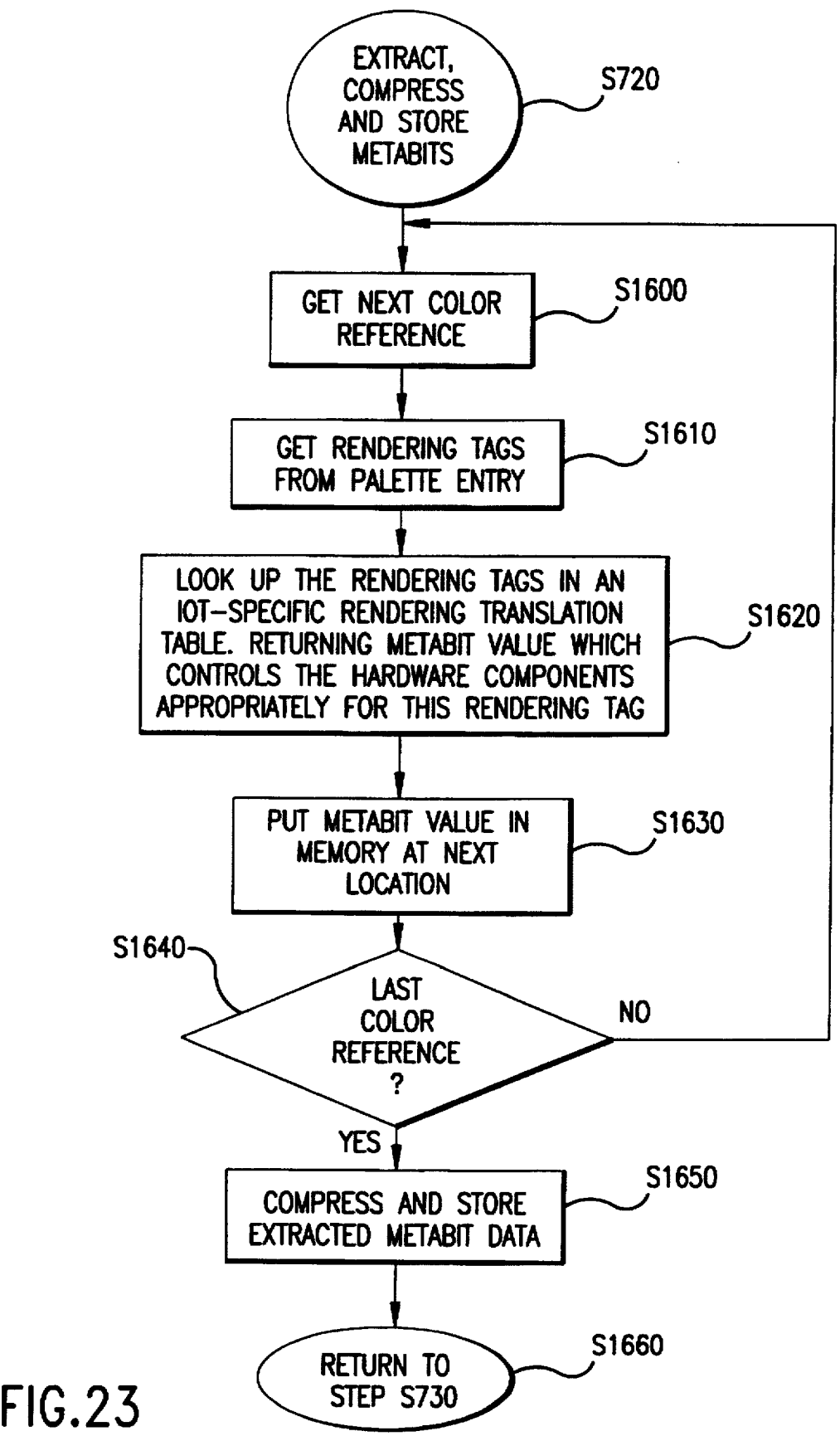
FIG. 23 shows a flowchart for extracting, compressing and storing metabit data.

FIG. 23 shows a more detailed description of the metabits extracting, compressing and storing process of step S720 of FIG. 15. As shown in FIG. 23, the process for extracting, compressing and storing the metabits begins in step S1600.

In step S1600, as in step S1500 of FIG. 22, the next (or first) color reference (which is a printer to a palette entry) is obtained as the current color reference. Likewise, as in step S1510, in step S1610 the rendering tags are obtained from the rendering tag field 15232 of the current palette entry 15230 or 15240. It should be appreciated that since both the constant color palette entries 15230 and the sampled image palette entries 15240 both include rendering tags, this process is not limited to the constant color palette entries, as in the flowchart of FIG. 22.

Once the rendering tags are obtained in step S1610, control flows to step S1620. In step S1620, the rendering tags are looked up in a translation table which provides specific translation between the printer independent rendering tags and the IOT specific metabits. Thus, the lookup process in step S1620 returns the IOT specific metabit values which provide the appropriate hardware and/or software process control that is appropriate for the specific IOT 170 based on the rendering tags of the current palette entry.

After the metabit values are obtained in step S1620, control flows to step S1630, where the metabit values for the current palette entry are stored into the next available location of the metabit channel of the channel data structure shown in FIG. 32.

Then, in step S1640, the current color reference is checked to see if it is the last color reference. If not, control flows back to step S1600, where the next color reference is again selected as the current color reference. However, if the current color reference is the last color reference, control flows to step S1650.

In step S1560, the metabit data stored in the metabit channel is compressed and restored to the metabit channel of the channel data structure. Then, control flows through step S1660 back to step S730.

Figure 24:
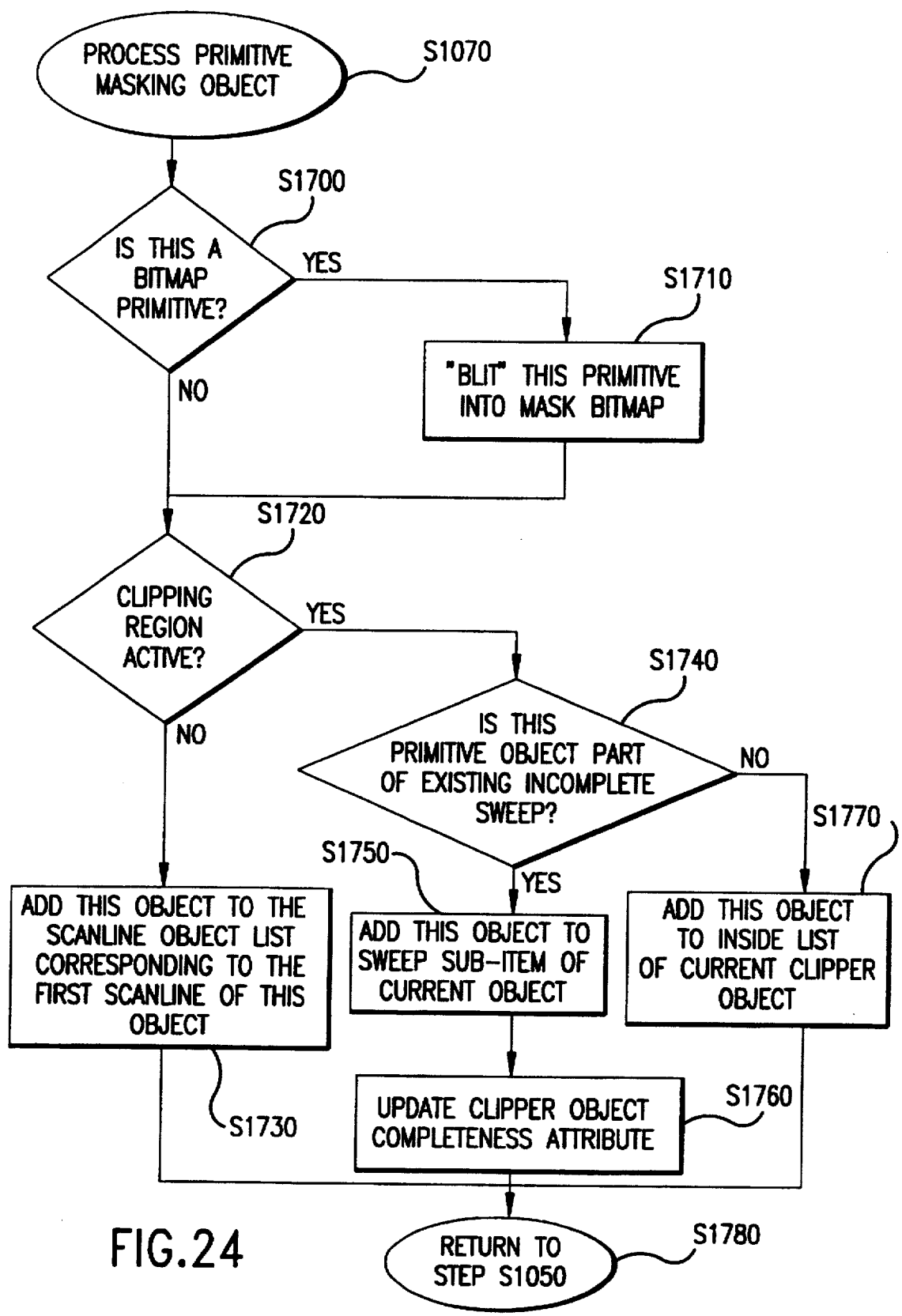
FIG. 24 shows a flowchart for processing primitive masking objects.

FIG. 24 shows a more detailed description of the primitive masking object process of step S1070 of FIG. 17. As shown in FIG. 24, the primitive masking object process starts in step S1700. In step S1700, the current primitive masking object is checked to determine if it is a bitmap primitive. As describe above, a primitive object is a box, a bitmap or the like. If so, control flows to step S1710, where this bitmap primitive is blitted into the mask bitmap, overwriting the data previously stored at the locations this bitmap primitive is blitted into. "Blitting" refers to the "bit-level block transfer" or "BITBLT" process, a conventional technique that allows modification of memory blocks on bit boundaries, rather than byte or word boundaries. Then, control flows from step S1710 to step S1720. If the current primitive masking object is not a bitmap primitive, control flows directly from step S1700 to step S1720.

In step S1720, the current primitive masking object is checked to determine if a clipping object more restrictive than the page bounding box is in effect. If no such clipping region is active, control flows to step S1730, where this object is added to the scanline object list corresponding to the first scanline for this object. That is, this object is added only to the scanline object list for the scanline for which it first appears. Then, from step S1730, control flows to step S1780.

However, if a clipping region other than the page bounding box is in effect, control flows from step S1720 to step S1740. In step S1740, the current primitive masking object is checked to determine if it is part of an existing but incomplete sweep. If so, control flows from step S1740 to step S1750. In step S1750, the current primitive masking object is added to the sweep sub-item of the current clipper object. It should be noted that one type of existing, but incomplete sweep is a simple primitive object such as a box. If the current primitive masking object is found to be adjacent to the existing primitive object, a new sweep object is created, the existing and current primitive objects linked to the sweeps s2 field, and this new incomplete sweep object becomes the clippers sub item. Then control flows to step S1760 where the completeness attribute of the current clipper object is updated. The completeness attribute of the current clipper object indicates whether sufficient primitive masking objects have been added to the sweep sub-item corresponding to the current clipper object to completely fill the clipper object's bounding box. From step S1760, control again flows to step S1780.

If the current primitive masking object is not part of an existing but incomplete sweep, control flows from step S1740 to step S1770 where the current primitive masking object is added to the items list of the current clipper object. From step S1770, control again flows to step S1780. In step S1780, control is returned to step S1050.

Figure 25:
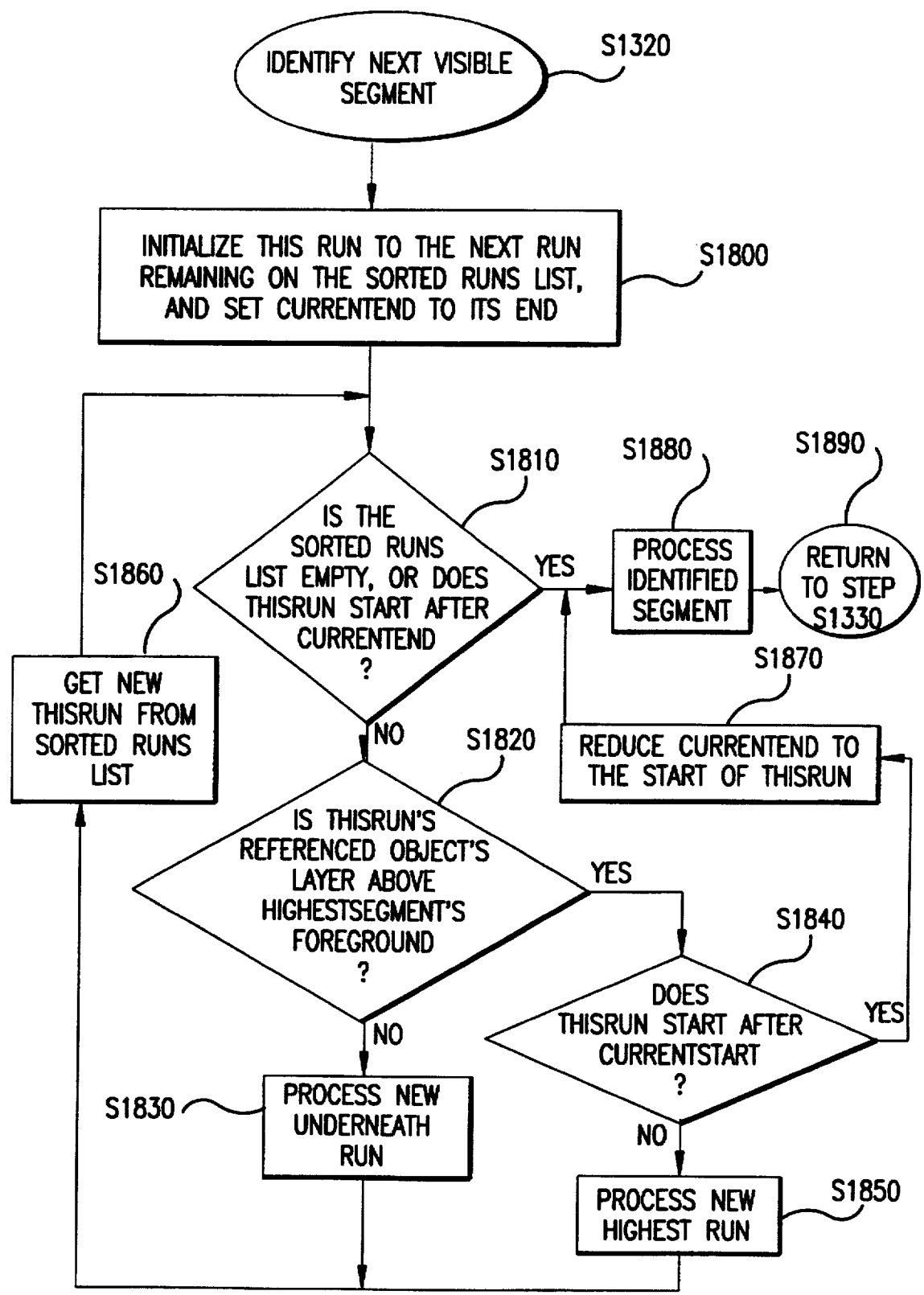
FIG. 25 shows a flowchart for identifying next visible runs.

FIG. 25 shows a more complete description of the next visible run identifying process of step S1320 of FIG. 20. As shown in FIG. 25, the process for identifying the next visible run begins in step S1800. In step S1800, the variable "thisrun" is initialized to the next run which remains on the sorted runs list. The variable "currentend" is set to the end of the next run.

From step S1800, control flows to step S1810. In step S1810, the sorted runs list is checked to see if it is empty and "thisrun" is checked to see if it starts after the variable "currentend". If both of these are false, control flows to step S1820, where the run referenced by "thisrun" is checked to see if the object referenced by it has a layer which is above the layer for the run segment indicated by the variable "highestrun". That is, "highestrun" indicates a run segment, or portion of a run, which has a start position, an end position, a foreground object and a list of potentially chained background objects. If the layer for the object referenced by "thisrun" is not above the foreground layer for the run segment referenced by "highestrun", then the object referenced by "thisrun" lies underneath the foreground of the run segment referenced by "highestrun". In this case, control flows to step S1830, where "thisrun" and its related object are processed as a new underneath run. From step S1830, control flows to step S1860.

However, if the layer of the object referenced by "thisrun" is above the foreground layer of "highestrun", control flows to step S1840. In step S1840, the start position for "thisrun" is checked to see if it begins after the start position indicated by "currentstart".

If this is not true, control flows to step S1850, where the run "thisrun" is processed to become the new highest run. From step S1850, control flows to step S1860. In step S1860, a new "thisrun" is obtained from the sorted runs list. Then, control flows from step S1860 back to step S1810.

However, in step S1840, if "thisrun" does start after "currentstart", control flows from step S1840 to step S1870. In step S1870, the end position indicated by the variable "currentend" is set equal to the start position of "thisrun". Then, control flows from step S1870 to step S1880.

Likewise, if, in step S1810, either of the tests are true, control also flows to step S1880. In step S1880, the identified run is processed. Then, from step S1880, control flows through step S1890 to return to step S1330.

At the beginning of the Flatten Runs List process, a list of runs active on the current scanline exists. The last is sorted from left to right on the basis of their leftmost point. The Flatten Runs List process produces a stream of commands that exactly describes, in left-to-right order, each portion or segment of each run visible on the scanline. The crucial part of the process is to identify, beginning at the left edge of the paper, the longest next portion of a run which will be entirely visible. This is accomplished by the identify next visible segment process of step S1320. The basic approach is relatively simple. Since the runs are sorted by their start position, they can be added to an "active runs list," a list of runs currently being considered as active at this point along the scanline. Since the runs are sorted by their starting position along the scanline, they can be added to the active runs list when their start position is reached and discarded when the position along the scanline has advanced past their end position. Then, the run with the highest target value is identified as "on-top." However, two key factors complicate the process, a performance and a transparent bitmap objects factor.

Certain graphical constructs are prominent in PDLs that make this simple type of processing difficult. One example is what is known as a radial sweep. A radial sweep consists of a large object at the lowest layer, and progressively smaller objects on top of the lower ones, such that any upper object is completely or substantially inside all such lower objects. Each such sweep on a page can have hundreds of layers. One problem is that at or near the top of the stack of objects, there are very many objects to be looked through in the active runs list. The preferred embodiment represented here almost completely alleviates this problem by introducing the underneath chaining process of step S1830 of FIG. 25. Underneath chaining removes the currently highest-layer run from the active runs list, at the time that it is obscured by a yet higher-layer run, by linking it to the obscuring run, so long as the lower layer run re-emerges after the now-higher run ends. If the lower run ends before the higher, the lower can be completely discarded at the point that it is obscured. Thus, the active runs list is kept quite short, since temporarily obscured objects are chained instead of being put on the active runs list. Thus, every run of the radial sweep would be in a long chain underneath the current top run. When an upper run ends, the first run on that run's underneath chain is then added to the active runs list. When a new run is encountered on the sorted runs list which is not on top at that point, it is added to the underneath chain at the appropriate layer. That is, it is added above runs with a lower layer than itself, and below those with a higher layer.

Furthermore, runs are removed from the underneath chain and discarded as soon as it becomes known that they lie beneath the newly inserted run and end before it does, which means they no longer become visible at some point to the right.

The second complication is caused by transparent bitmap objects. Bitmap objects may have a transparent property, in which "1" bits are colored but "0" bits are clear. That is, the color of the object underneath the bitmap object shows through. This both complicates underneath chaining and can lead to conflicting use of the mask channel. The latter difficulty is handled by techniques described later as part of the identified run processing steps S1350 and S1380 of FIG. 20. The chaining difficulty is handled in the preferred embodiment by emptying the underneath chain back onto the activer runs list whenever the top run is transparent, and rebuilding the underneath chain again once all of the transparent runs are removed from the active runs list.

Figure 30:
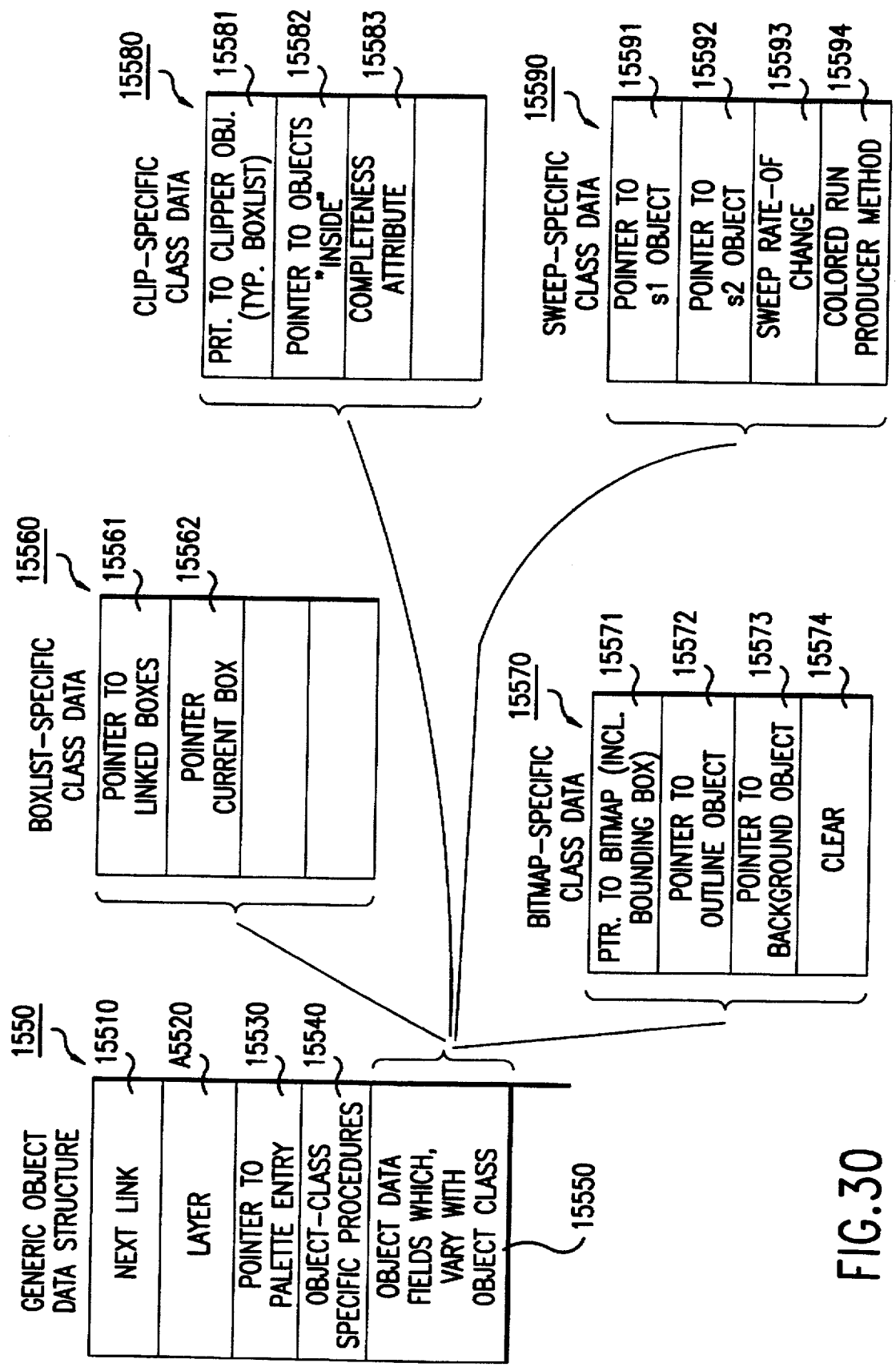
FIG. 30 shows the generic data structure for each object on a scanline.

FIG. 30 shows a generalized representation of the generic object data structures 1550 stored in the memory 150. The generic object data structure 1550 comprises a next link field 15510, a layer field 15520, a palette entry pointer field 15530, an object class specific procedure field 15540, which are fixed fields, and object data fields 15550, the number and type of which vary with the object class. More specifically, the next link field 15510 is used to form a list of objects by pointing to the next link field 15510 of another object. By this mechanism, the scanline object list 1510 shown in FIG. 29 is formed.

The layer field 15520 is used to encode the relative height of objects along the Z axis extending perpendicularly from the page. That is, a PDL file describing a page image is constructed such that graphical objects in the page image which are defined earlier in the PDL file are obscured by those objects defined later in the file. The early defined objects can be described as being lower along the Z axis in the stack of objects forming the page image. Similarly, objects appearing later in the PDL file can be described as being higher along the Z axis. The layer field 15520 encodes this relative height of the object in the stack. Each new object is given a sequentially higher level value during the process primitive masking object step S1070 of FIG. 17.

The palette entry pointer field 15530 is a pointer to an entry in the palette data structure 1520 in the memory 150. The referenced palette entry is not restricted to constant color data or sampled image data, and may be an initial entry like white 1521 or black 1522, or may be a palette entry created as a result of the process color operator step S460 shown on FIG. 16. The object-class specific procedures field 15540 is a pointer to a collection of procedures that vary in their detailed operation from one object class to another. The object-class specific procedures field 15540 of all objects having the same type or class will thus refer to the same procedures. The procedures for a specific object class are able to correctly access data specific to that object class.

Figure 33A:
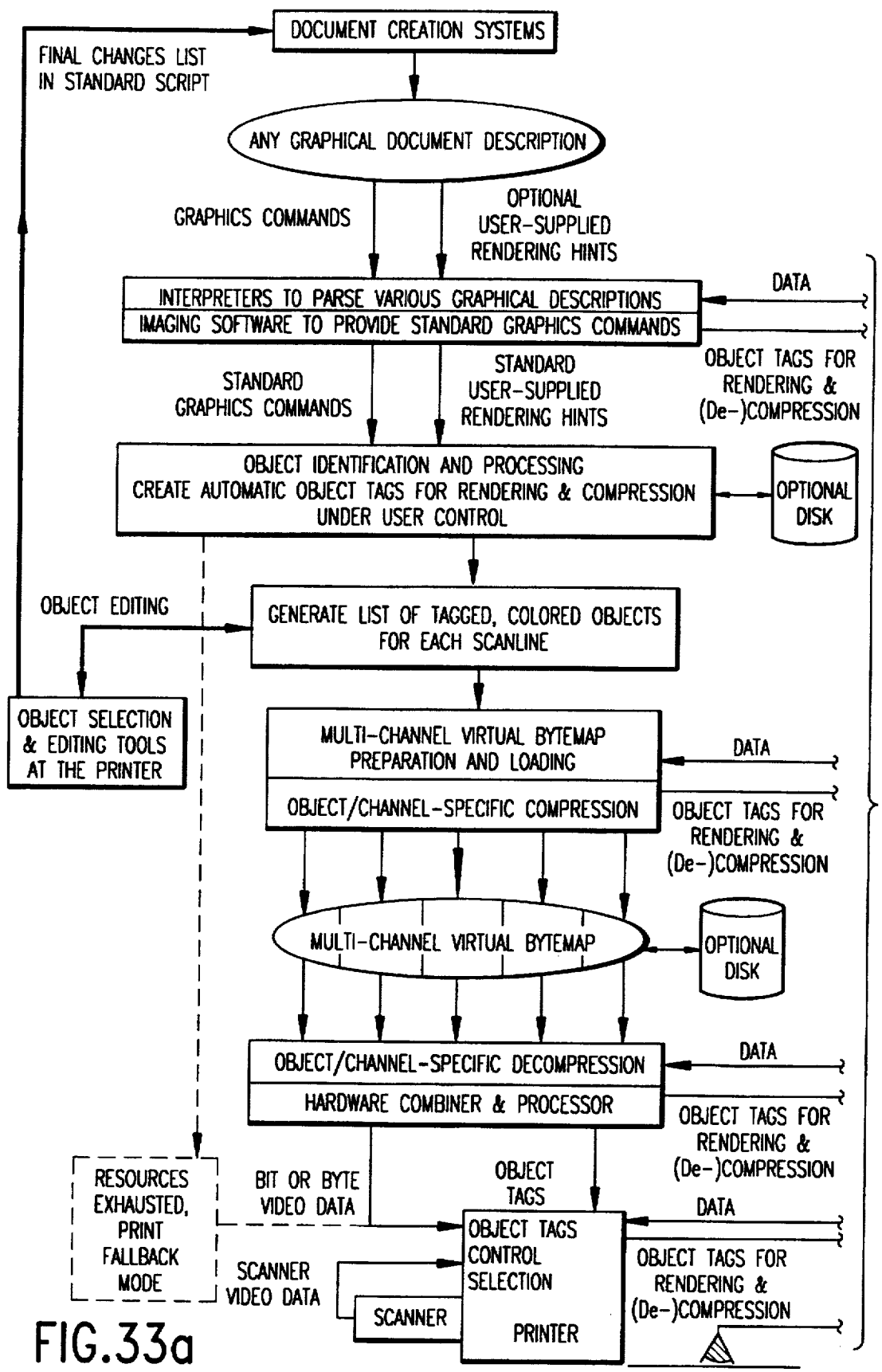
FIG. 33 shows a system flowchart and resource diagram.
Figure 33B:
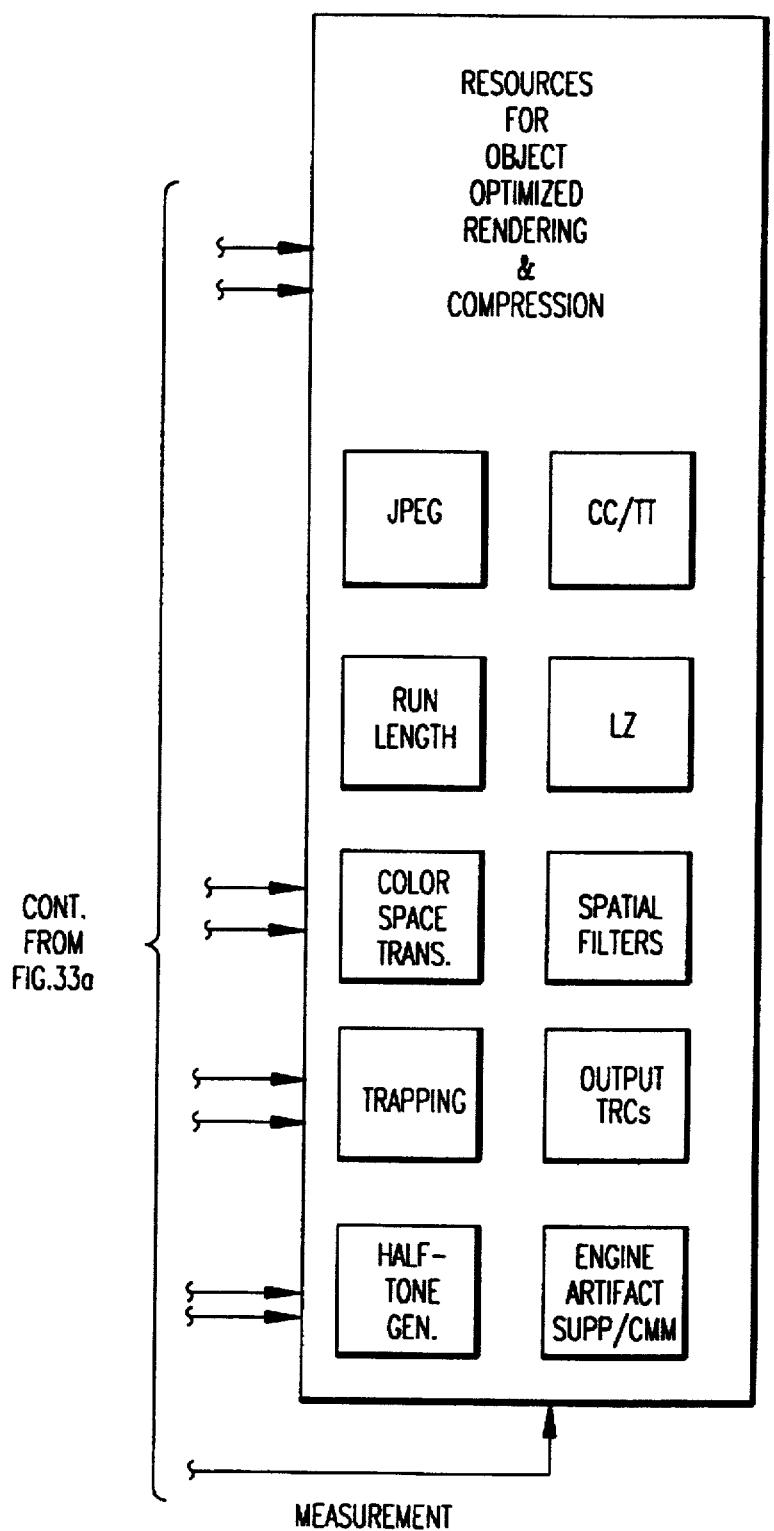

The object-specific class data fields for the box list class data field 15560, also shown in FIG. 33, comprise a linked boxes pointer field 15561 and a current box pointer field 15562. The linked boxes pointer field 15561 points to a sequence of boxes which together form the object. Each box of this sequence of boxes comprises a link to the next box of the sequence and the locations of the lower left and upper right corners of this box. Certain techniques known in the art place useful constraints on the boxes that can be represented in such a sequence of boxes. Certain constraints are useful for increasing the performance of clipping procedures acting on clipping regions described by such sequences of boxes. The current box pointer field 15562 of the boxlist class 15562 is thus provided as a convenience for clipping and other procedures.

The bitmap-specific class data field 15570 comprises a bitmap object pointer field 15571, the bitmap having its own bounding box data. Data bits with a value of 1 in the bitmap indicate that the object at the point represented by that bit should be printed with the color referenced by the palette entry pointer 15530. Data bits with a value of 0 take one of two alternate meanings, depending on the value of the clear field 15574. If the clear field 15574 is zero, representing false, the data bits of 0 in the map represent white. If the clear field 15574 is non-zero, representing true, the data bits of 0 in the map represent that the bitmap is transparent at those points, and the color is determined by objects under the bitmap object.

The outline object pointer field 15572 represents the outline or boundary of the bitmap object 15570. The outline object referenced is generally a boxlist class object. In this manner, a complex shape can be represented while still allowing the bitmap 15570 itself to be rectangular. The background object pointer field 15573 is used during the flattening process if the bitmap is transparent, as indicated by the clear field 15574.

The clip specific class object data field 15580 comprises a clipper object pointer 15581, an objects inside the clipper region painter 15582 and a completeness attribute 15583. The clipper object pointer 15581 points to a boxlist class object to specify the shape of the clipping region, as set by the "setclip" operator step S1170 on FIG. 18. The objects inside pointer 15582 is used to collect objects that are processed in the process primitive masking object step S1770, as shown in FIG. 24, when the clipping region represented by this clip-class object is the current clipping region. The completeness attribute field 15583 is used to encode how completely and in what way a partially complete sweep being collected while the current clip-class object represents the clipping region fills the clipping region's bounding box.

The sweep-specific object class data field 15590 comprises an s1 object pointer field 15591, s2 object pointer field 15592, a sweep rate-of-change field 15593, and a colored-run-producer method field 15594. The s1 object pointer field 15591 is used primarily to point to the outline object of a sweep, a boxlist class object representing the clipping region in effect as the objects comprising the sweep were being collected. The s2 object pointer field 15592 points to a second object of class sweep whose s1 and s2 objects point to the two ends of a linked list of simple objects representing the varying colored slices of the sweep. The sweep rate-of-change field 15593 is calculated at the time the clip class object used to collect the objects inside the clipping region is converted into a sweep-class object, as shown in the graphical state operator processing step 81150, as shown in FIG. 18. It is used to determine whether the sweep is changing color frequently enough to warrant the use of the "slow sampled channel" mode of the operation described above.

The colored-run-producer method 15594 is a procedure which is specific to the type of sweep that has been collected. Vertically changing sweeps, horizontally changing sweeps and sweeps having various other characteristics have different color-run-producer methods.

Figure 26:
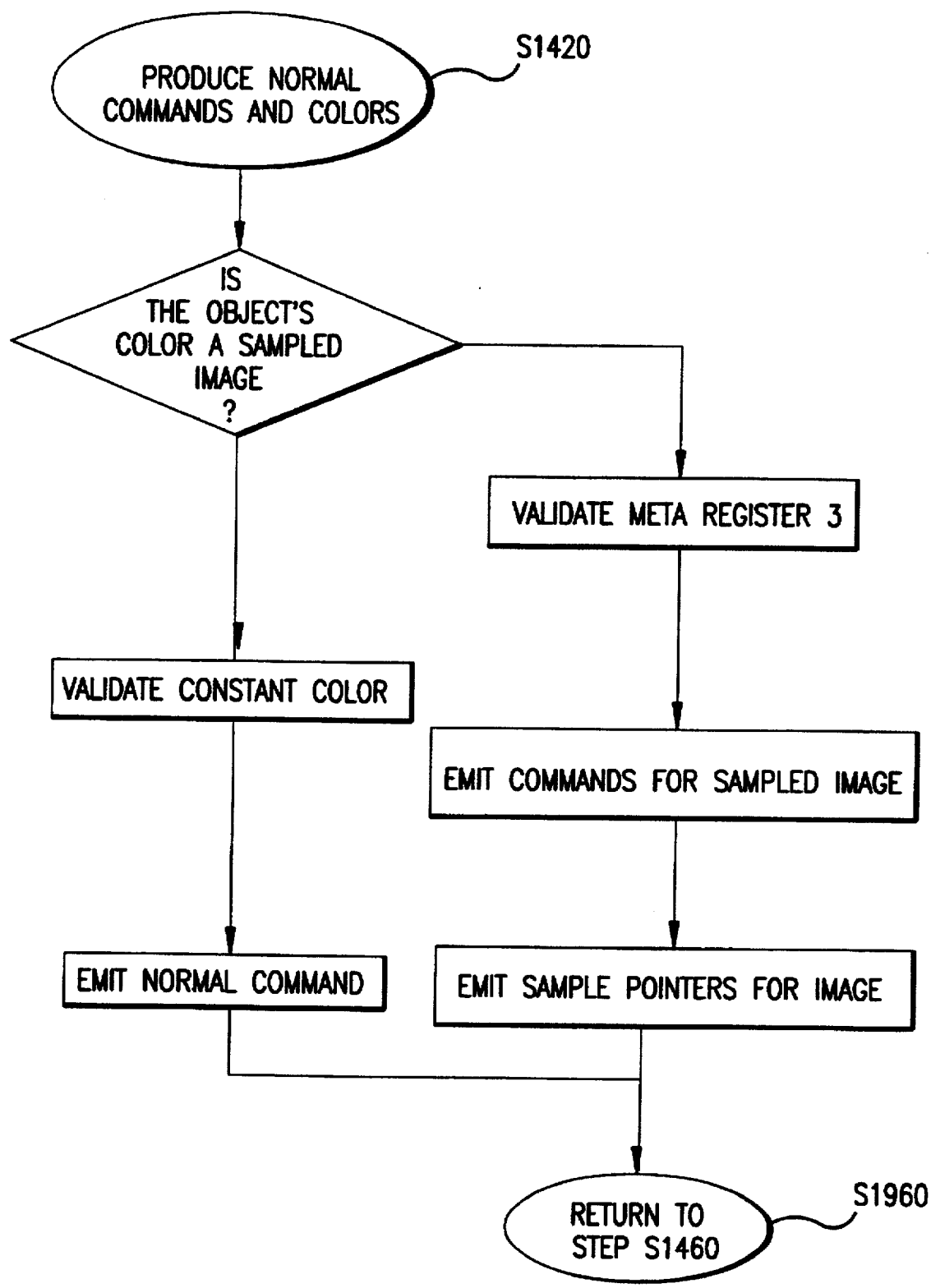
FIG. 26 shows a flowchart for producing normal commands and colors.

FIG. 26 shows a more detailed description of the normal commands and colors-producing process of step S1420 of FIG. 21. The normal commands and colors producing process begins in step S1900, where the object's color class is checked to determine if the object has a sampled image as its color. If not, control flows to step S1910 which ensures that one of the color registers is loaded with the proper color data and metabit values for this run. The palette reference for this run's foreground is compared against the palette reference being held in each of the shadow registers for the color/metabit registers 0–2, to determine if the color referenced by the object has previously been loaded into one of the color registers. If this is not the case, one of the color/metabit registers 0–2 is selected to be loaded with the color data by the command generated in the following step. This selection can use any conventional process such as a "least recently used" process or any other similar or equivalent process. Finally, a reference to the palette corresponding to this run is output to the next available location in the constant color channel data structure.

Control then flows to step S1920, where a normal command with a proper bit values for color register select value A, load color and the particular color register selected by the color register select value A is issued based on the values determined in step S1910. In addition, as many "repeat" commands are generated as necessary to extend the run beyond the 64 pixel length limit in a normal command.

From step S1920, control flows to step S1960 where control is return to step S1460.

If, in step s1900, the object's color is a sampled image, control flows to step S1930, which ensures that the metabit value corresponding to the sample image is loaded into the metabit register 3 at the time the image pixels are displayed. A shadow register is kept in the RAM portion 151 of the memory 150 during the entire command and color palette reference generating process, so that the current contents of the color registers can be determined. In this case, the color register 3 values are irrelevant. Only the metabit register 3 values will be used, with the color pixel data supplied by the sample channel. If, based on the contents of the shadow register, it is determined that the metabit register prevalue needs to be loaded, a color palette reference is inserted into the next available location of the constant color channel to reference the palette entry with the correct rendering tags and an irrelevant color value.

After the metabit register 3 value is validated in step S1930, control flows to step S1940, where a command that displays the sample channel data, sets up the proper sample devisor, and loads the metabit register determined in step S1930 into the next available location of the command in channel memory portion. As in step S1920, "repeat" commands are generated as needed to extend the run length beyond the 64 pixel limit of the normal command.

Then, from step S1940, control flows to step S1950, where the address and length of the sample image data to be supplied for the just-generated command is loaded into the next available location in the sample pointer channel data structure. In addition to the use of the address and length data by the DMA controller, the extract and store sample image pointers process and the extract, compress and store sampled image data process of step S740 of FIG. 15 uses the address and length to find and extract the needed portions of the sample images.

Then, from step S1950, control flows through step S1960 back to step S1460.

Figure 27:
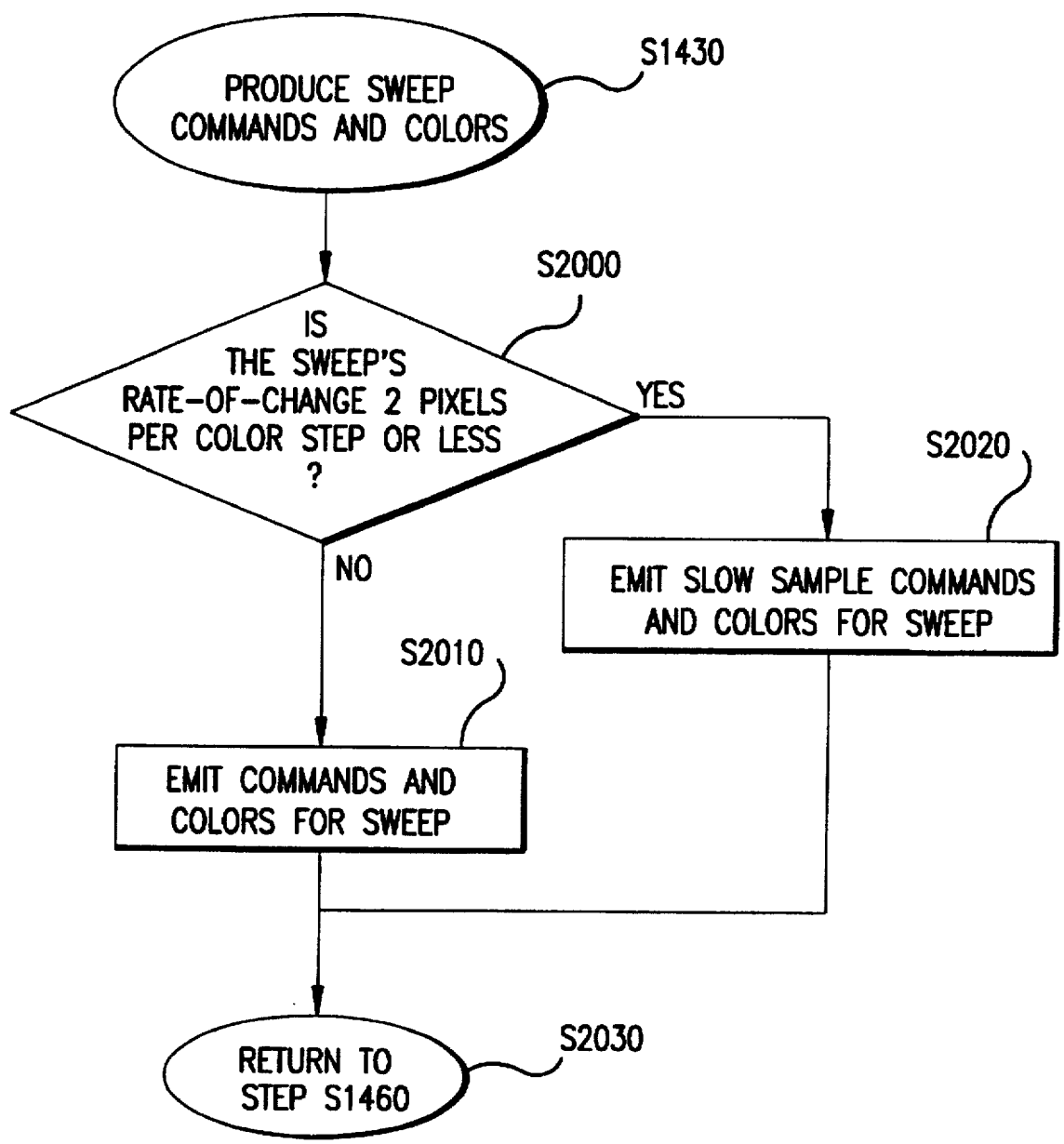
FIG. 27 shows a flowchart for producing sweep commands and colors.

FIG. 27 shows a more detailed description of the sweep commands and colors producing process of step S1430 of FIG. 21. The process for producing the sweep commands and colors instructions starts in step S2000, where the sweeps rate of change is checked to see if it is two pixels per color step or less. To produce the actual commands and colors, the sweeps color run producer method found in the sweep specific data of the object data structure, is called. This method will differ from one type of sweep to another, and is used to extract the sweep's background slices and to provide the palette entry and start/end positions for each sub-run within the sweep object. For example, a sweep where the color varies only from one scanline to the next would have a color run producer method that only finds the one slice appropriate for each scanline and notifies the command generation processor only once. The command generation processor would then generate a command and a color reference for the entire run's length. In contrast, a sweep which steps from color to color along the scanline must have one command and one color reference for each slice of the object along the scanline. The sweeps rate of change is calculated during the clipper validation process once the sweep has been converted from a clipper object. This field indicates the average number of pixels used per color step in the sweep. If the rate of change is two pixels per color step or less, control flows to step S2020, which generates a single command which uses the color register select B value to select the color/metabit register 3. As described above, when using the color/metabit registers 3 with the color register select B value, one color will be read in from the constant color channel each clock cycle. By using this slow sample channel, only a single command is required, along with only one color palette reference for each color slice. The command bits for setting up the IOT controller and the color palette references are output to the next available location in the command channel memory and the constant color channel memory.

Control then flows from step S2020 through step S2030 back to step S1460.

However, if the sweeps rate of change is greater than two pixels, control flows to step S2010. In step S2010, a command, as well as a color palette reference, must be generated and loaded to the command channel memory and the constant color channel memory. As in step S2020, control flows from step S2010 through step S2030 to step S1460.

Figure 28:
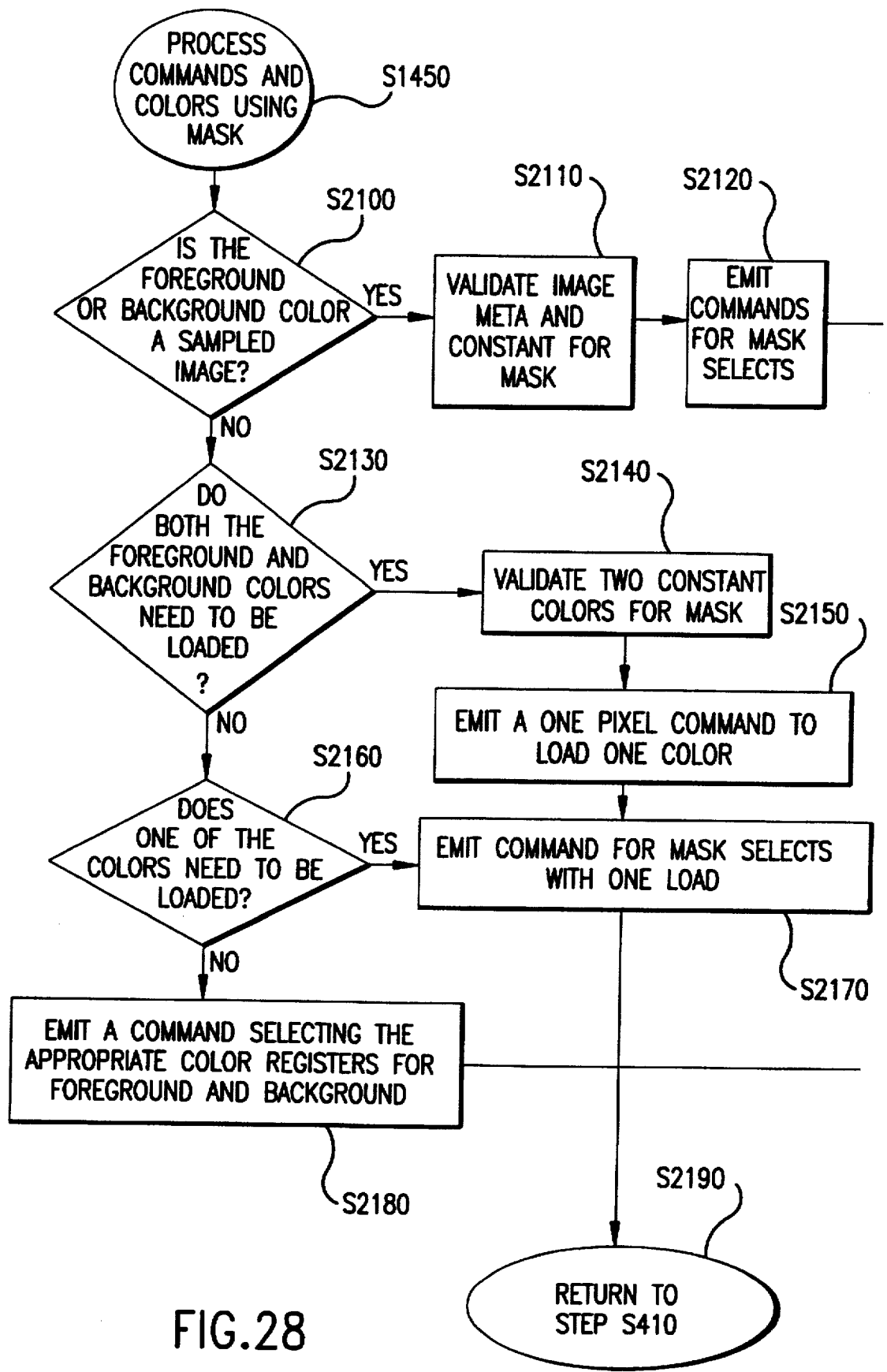
FIG. 28 shows a flowchart for producing commands and colors using the mask data.

FIG. 28 shows a more detailed description of the commands and colors production using the mask process of step S1450. This process determines if any of the special cases exist in which commands of length 1 must be issued in order to establish conditions which allow the combiner to run normally. Such conditions include the need to load both colors of a transparent sweep, or load both the meta value and constant color when using the mask to switch between an image foreground and a constant color foreground or vice versa. In some of these cases, the first bit of the mask data itself must be examined to determine the order the color registers are loaded, such that the color being selected by the first pixel of the mask data selects the color register that was loaded by the command issuing that pixel. That first command has a length of 1 pixel in order to be able to issue a second command to load the other needed color/metabit register on the second pixel clock. In some cases, the mask data needs to be treated as inverted. This will happen, for example, in order to use the mask to select a constant color above an image. Since the sample channel can only be selected by the color register select A value, the mask selects between SrcB and SrcB field in the command must be specified in order to place the constant color which in this case must be selected by the color register select B value in this example, in the foreground.

The process starts in step S20100, where the foreground and background colors are checked to see if either is a sampled image color. If either is, control flows to step S2110, where the image metabits and constant colors are validated for the mask. That is, the load order for the color registers and metabits is determined to ensure the process will operate correctly. This determination is made by interrogating the initial bit of the mask data by determining the presence or absence of the needed constant color in any of the color registers, and by determining whether or not the metabit value in metabit register 3 needs to be loaded explicitly. Then, the number of 1-pixel commands determined here to be needed to properly initialize the hardware to the proper state is deducted from the total run length and this reduced value is used to generate the commands in a subsequent step.

Control then flows from step S2110 to step S2120 to actually generate the command using the data determined in step S2110.

Then, control flows from step S2120 through step S2190 back to step S1460.

However, if in step S2100, neither the foreground or background color is a sampled image color, control flows to step S2130, where the shadow registers are checked to determine if both the foreground and background colors need to be loaded. If so, control flows from step S2130 to step S2140 which determines which of the two colors that need to be loaded is to loaded first. Again, as above, this is done by examining the first bit of the mask data. Once the color which needs to be loaded first is determined in step S2140, control flows to step S2150 where a 1 pixel length command is generated and loaded into the first available location of the command channel memory to load the first color. Of course, the first color is loaded into the next available location of the constant color channel.

Then, control flows to step S2170 where the color which was determined to be loaded second is loaded by generating a command for the rest of the run length with the mask selecting appropriately between the two colors. Thus, a second command is loaded into the next available location of the command channel memory and the second palette reference is loaded into the next available location of the constant color channel.

If, however, in step S2130, both the foreground and background colors don't need to be loaded, control flows to step S2160 where the shadow registers are checked to determine if one of the foreground or background colors need to be loaded. If so, control flows to step S2160 to step S2170. If not, control flows to step S2180 where a command is generated and loaded into the next available location of the command channel memory. However, since both colors are already loaded into registers in the IOT controller, no additional reference to the palette needs to be generated or loaded into the constant color channel memory. Then, from step S2180, control again flows through step S2190 back to step S1460.

FIG. 32 shows a symbolic diagram of the RAM portion 151 of the memory 150. The RAM portion 151 contains the color palette 1530, the mask bit map 1560, the palette 1520, the scanline pointer stack 1510, the command channel memory 153, the constant color channel memory 154, the sample color channel 155, the mask channel 156, and the metabit channel 157.

FIG. 33 shows a symbolic diagram of the entire object optimized system, with the IOT controller 160, the decomposition system 130 and the command instruction and data generating system 140 integrated into a single system, with the data flow and processing procedure ordered from start to finish. The object optimizing resources available to the IOT controller 160, the IOT 170 and/or the decomposition system 130 are also shown.

What is claimed is:

1. A printer controller for generating at least one of printer data and printer control commands based on document data, the document data defining a document having at least one page and comprising print data, render control commands and printer controller commands, the printer controller outputting the printer data and the printer control commands to a printer for printing the at least one page of the document in response to the printer control commands and the printer data output by the print controller, the printer controller comprising:

input means for inputting the print data, the printer controller commands and the render control commands;

print data storage means for storing the print data, the print data comprising a plurality of separate channels, each channel stored separately in the print data storage means;

render control command storage means for storing the render control commands corresponding to the print data stored in the print data storage means;

printer controller command storage means for storing the printer controller commands corresponding to the print data stored in the print data storage means;

a multichannel combiner for combining the separate channels of the print data based on the printer controller commands to form the printer data;

output storage means for storing the printer data and the render control commands corresponding to the combined print data as the printer control commands; and output means for outputting to the printer the printer data and render control commands stored in the output storage means.

2. The printer controller of claim 1, further comprising input means for inputting at least one of printer status data and feedback data from the printer, the printer controller modifying the printer data based on the at least one of the printer status data and the feedback data.

3. The printer controller of claim 1, wherein:

the print data comprises color data and binary mask data, the print data storage means comprising color data storage means for storing the color data and binary mask data storage means for storing the binary mask data corresponding to the color data stored in the color data storage means; and the multichannel combiner combines separate channels of the color data based on the printer controller commands and the binary mask data to form the printer data.

4. The printer controller of claim 3, wherein the printer controller commands comprise combiner commands, and the color data comprises constant color channel data and sample color channel data, the multichannel combiner comprising:

a plurality of color storage means for storing the constant color channel data and corresponding ones of the render control commands;

sample color storage means for storing the sample color channel data;

first selection means for selectively outputting the constant color data and the corresponding render control commands from one of the plurality of color storage means;

second selection means for selectively outputting one of the output from the first selection means and the sample color data output from the sample color storage means; and control means for controlling the first and second selection means, the plurality of color storage means and the sample color storage means based on the combiner commands and the binary mask data.

5. The printer controller of claim 1, wherein the print data storage means comprises at least one first-in, first-out memory.

6. The printer controller of claim 1, wherein the output means comprises:

printer data storage means for storing the printer data; and a printer data driver for generating one of parallel and serial data to be output to the printer from the printer data storage means.

7. The printer controller of claim 6, wherein the output means further comprises:

render control command storage means for storing the render control commands; and a printer driver for generating one of parallel and serial printer control commands to be output to the printer based on the render control commands.

8. The printer controller of claim 1, the print data storage means comprising a constant color channel storage portion storing constant color channel data, a sample color channel storage portion storing sample color channel data and a mask data channel storage portion storing mask channel data, wherein the multichannel combiner comprises:

a plurality of color storage registers, each color register storing a single constant color data portion of the constant color channel data and corresponding ones of the render control commands supplied from the constant color channel storage portion of the print data storage means and the render control command storage means, respectively;

sample data storage means for storing sample color channel data from the sample color channel storage portion of the print data storage means;

a color multiplexer for selectively multiplexing data output from one of the plurality of color storage registers;

a constant/sampled multiplexer for selectively multiplexing the data output from the color multiplexer and the sampled color data stored in the sample data storage means to the output means; and printer controller command data processing means for processing the printer controller command data and the mask channel data and for controlling the plurality of color registers, the sample data storage means, the color multiplexer and the constant/sampled multiplexer based on the printer controller command data and the mask channel data.

9. The printer controller of claim 8, wherein the printer controller command data processing means comprises:

first configuration register;

a previous command register connected to the printer controller command storage means and storing command data;

a command/mask controller connected to the mask data channel storage portion of the print data storage means and the printer controller command storage means;

a color register load selector for selectively loading one of the plurality of color registers with one of the constant color data portions and the corresponding render control commands stored in the print data storage means and the render control command storage means in response to commands from the command/mask controller;

a color multiplexer controller for controlling the color multiplexer in response to the command data stored in the previous command data register and the configuration register;

an output multiplexer controller for controlling the constant/sampled multiplexer; and a white/transparent color generator for generating white color commands in response to the command data stored in the previous command register.

10. The printer controller of claim 1, further comprising a bus interface means for connecting the printer controller to a data generator, the data generator generating the document data, wherein the bus interface means comprises:

burst first-in, first-out memory;

slow channel controller;

a decoder;

a channel arbitration logic circuit;

a sample channel controller;

a plurality of registers;

a buffer memory; and a card controller.

11. A printer controller generating pixel data based on document data defining at least one page of a document, the document data comprising printer controller commands, render control commands and print data and outputting at least one of the pixel data and the render control commands to a printer, the printer printing the pixel data based on the render control commands to form an object optimized page of the document described by the document data, the printer controller comprising:

mask data storage means for storing mask channel print data of the printer data;

constant color data storage means for storing constant color channel print data of the print data;

sample color data storage means for storing sampled color channel print data of the print data;

render control command storage means for storing the render control commands;

printer controller command data storage means for storing the printer controller commands;

channel combining means for generating the pixel data from the constant color channel print data and the sampled color channel print data, based on the printer controller commands and the mask channel print data; and output means for outputting at least one of the pixel data and the render control commands to the printer.

12. The printer controller of claim 11, further comprising input means for inputting at least one of printer status data and feedback data from the printer, the printer controller modifying the pixel data based on the at least one of the printer status data and the feedback data.

13. The printer controller of claim 12, wherein each of the storage means comprises at least one first-in, first-out memory.

14. The printer controller of claim 12, wherein the output means comprises:

pixel data storage means for storing the pixel data; and a pixel data driver for generating from the pixel data one of parallel and serial data to be output to the printer.

15. The printer controller of claim 14, wherein the output means further comprises:
   render control command storage means for storing the render control commands; and
   a printer driver for generating one of parallel and serial data to be output to the printer based on the render control commands.

16. The printer controller of claim 12, wherein the channel combining means comprises:
   a plurality of color storage registers, each color register storing a single constant color data portion of the constant color channel print data and corresponding ones of the render control commands supplied from the constant color channel data storage means and the render control command storage means, respectively;
   sample data storage means for storing sample color channel print data from the sample color data storage means;
   a color multiplexer for selectively multiplexing data output from one of the plurality of color storage registers;
   a constant/sampled multiplexer for selectively multiplexing the data output from the color multiplexer and the sampled color data stored in the sample data storage means to the output means; and
   printer controller command data processing means for processing the printer controller command data and the mask channel print data and for controlling the plurality of color storage registers, the sample data storage means, the color multiplexer and the constant/sampled multiplexer based on the printer controller command data and the mask channel print data.

17. The printer controller of claim 16, wherein the printer controller command data processing means comprises:
   first configuration register;
   a previous command register connected to the printer controller command data storage means and storing command data;
   a command/mask controller connected to the mask data storage means and the printer controller command data storage means;
   a color register load selector for selectively loading one of the plurality of color registers with one of the constant color data portions and the corresponding render control commands stored in the color data storage means and the render control command storage means in response to commands from the command/mask controller;
   a color multiplexer controller for controlling the color multiplexer in response to the command data stored in the previous command data register and the configuration register;
   an output multiplexer controller for controlling the constant/sampled multiplexer; and
   a white/transparent color generator for generating white color commands in response to the command data stored in the previous command register.

18. The printer controller of claim 12, further comprising a bus interface means for connecting the printer controller to a data generator for generating the document data, wherein the bus interface means comprises:
   a burst first-in, first-out memory;
   a slow channel controller;
   a decoder;
   a channel arbitration logic circuit;
   a sample channel controller;
   a plurality of registers;
   a buffer memory; and
   a card controller.

19. A printer controller for outputting at least one of printer data and render control commands to a printer based on at least one of print data, printer controller commands and the render control commands, the print data comprising at least one of constant color channel print data, sampled color channel print data and mask channel print data, the printer forming a document image based on the printer data and the render control commands, the printer controller comprising:
   a mask data storage device storing the mask channel print data;
   a constant color data storage device storing the constant color channel print data;
   a sample color data storage device storing the sampled color channel print data;
   a render control command storage device storing the render control commands;
   a printer controller command data storage device storing the printer controller commands;
   a multichannel combiner generating the printer data from the constant color channel print data and the sampled color channel print data based on the printer controller commands and the mask channel print data; and
   an output device outputting at least one of the printer data and the render control commands to the printer.

20. The printer controller of claim 19, wherein the printer controller further comprises an input device for inputting at least one of printer status data and feedback data from the printer, the printer controller modifying the printer data based on the at least one of the printer status data and the feedback data.

21. The printer controller of claim 20, wherein each of the mask data storage device, the constant color storage device, the sample color data storage device, the render control command storage device, and the printer controller command data storage device comprises at least one first-in, first-out memory.

22. The printer controller of claim 20, wherein the output device comprises:
   a printer data storage device storing the printer data; and
   a printer data driver for generating one of parallel and serial data to be output to the printer from the printer data.

23. The printer controller of claim 22, wherein the output device further comprises:
   a second render control command storage device storing the render control commands corresponding to the printer data stored in the printer data storage device; and
   a printer driver for generating one of parallel and serial data to be output to the printer based on the render control commands stored on the second render control command storage device.

24. The printer controller of claim 20, wherein the multichannel combiner comprises:
   a plurality of color storage registers, each color register storing a single constant color data portion of the constant color channel print data and corresponding ones of the render control commands supplied from the constant color channel data storage device and the render control command storage device, respectively;

a sample data storage device storing sample color channel print data from the sample color data storage device;

a color multiplexer for selectively multiplexing data output from one of the plurality of color storage registers;

a constant/sampled multiplexer for selectively multiplexing the data output from the color multiplexer and the sampled color data stored in the sample data storage device to the output device; and a printer controller command data processor processing the printer controller command data and the mask channel print data and controlling the plurality of color storage registers, the sample data storage device, the color multiplexer and the constant/sampled multiplexer based on the printer controller command data and the mask channel print data.

25. The printer controller of claim 24, wherein the printer controller command data processor comprises:

first configuration register;

a previous command register connected to the printer controller command data storage device and storing command data;

a command/mask controller connected to the mask data storage device and the printer controller command data storage device;

a color register load selector for selectively loading one of the plurality of color registers with one of the constant color data portions and the corresponding render control commands stored in the constant color data storage device and the render control command storage device, respectively, in response to commands from the command/mask controller;

a color multiplexer controller for controlling the color multiplexer in response to the command data stored in the previous command data register and the configuration register;

an output multiplexer controller for controlling the constant/sampled multiplexer; and a white/transparent color generator for generating white color commands in response to the command data stored in the previous command register.

26. The printer controller of claim 20, further comprising a bus interface connecting the printer controller to a data generator for generating the document data, wherein the bus interface comprises:

a burst first-in, first-out memory;

a slow channel controller;

a decoder;

a channel arbitration logic circuit;

a sample channel controller;

a plurality of registers;

a buffer memory; and a card controller.

* * * * *